(12) United States Patent
Shin et al.

(10) Patent No.: US 9,069,425 B2
(45) Date of Patent: Jun. 30, 2015

(54) TOUCH SENSING DEVICE

(75) Inventors: Myungho Shin, Paju-si (KR); Jonggu Heo, Seoul (KR); Suwon Lee, Ansan-si (KR); Yoonnara Jang, Jeonbuk (KR); Younggyu Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 282 days.

(21) Appl. No.: 13/590,385

(22) Filed: Aug. 21, 2012

(65) Prior Publication Data

US 2013/0050116 A1  Feb. 28, 2013

(30) Foreign Application Priority Data

Aug. 26, 2011 (KR) .......................... 10-2011-0085790
Nov. 10, 2011 (KR) .......................... 10-2011-0117130
Dec. 2, 2011 (KR) .......................... 10-2011-0128197
Dec. 6, 2011 (KR) .......................... 10-2011-0129559

(51) Int. Cl.
G06F 3/044 (2006.01)
G06F 3/041 (2006.01)

(52) U.S. Cl.
CPC .............. *G06F 3/044* (2013.01); *G06F 3/0416* (2013.01); *G06F 2203/04104* (2013.01)

(58) Field of Classification Search
USPC ................................................. 345/173–174
See application file for complete search history.

(56) References Cited

U.S. PATENT DOCUMENTS

2008/0158167 A1*  7/2008  Hotelling et al. ............. 345/173
2009/0309851 A1* 12/2009  Bernstein ...................... 345/174
2010/0149110 A1    6/2010  Gray
2010/0200310 A1*  8/2010  Yeh et al. .................... 178/18.03
2011/0042152 A1    2/2011  Wu
2011/0267312 A1* 11/2011  Lin et al. ....................... 345/174
2012/0050216 A1*  3/2012  Kremin et al. ................ 345/174
2012/0261199 A1* 10/2012  Kuo et al. .................... 178/18.06

FOREIGN PATENT DOCUMENTS

| JP | 2009-289235 | 12/2009 |
| JP | 2010-049608 A | 3/2010 |
| TW | 201015395 A | 4/2010 |
| WO | 2011/015827 | 2/2011 |

OTHER PUBLICATIONS

Extended European Search Report dated Nov. 15, 2012 for European Patent Application No. 12177823.7.
Japanese Office Action dated Oct. 22, 2013 for corresponding Patent Application No. 2012-183978.
(Continued)

*Primary Examiner* — Kumar Patel
*Assistant Examiner* — Amy C Onyekaba
(74) *Attorney, Agent, or Firm* — Morgan, Lewis & Bockius LLP

(57) ABSTRACT

A touch sensing device includes a touch screen including Tx lines, Rx lines crossing the Tx lines, and touch sensors formed between the Tx lines and the Rx lines, and a touch screen driving circuit which senses all the touch sensors of the touch screen in a first sensing step to detect the presence or absence of a touch input, and then again senses the touch sensors, in which the touch input is detected as a first sensing result, in a second sensing step to detect a position of the touch input. When there is no touch sensor, in which the touch input is detected as the first sensing result, the touch screen driving circuit repeats the first sensing step.

22 Claims, 53 Drawing Sheets

(56) References Cited

OTHER PUBLICATIONS

Korean Office Action dated Dec. 23, 2013 for corresponding Patent Application No. 10-2012-0115954.

Office Action issued in counterpart Japanese Patent Application No. 2012-183978 dated Mar. 18, 2014.

Office Action dated Jul. 9, 2014 from the Taiwan Advance Patent & Trademark Office in counterpart Taiwanese Patent Application No. 101130915.

* cited by examiner

FIG. 22
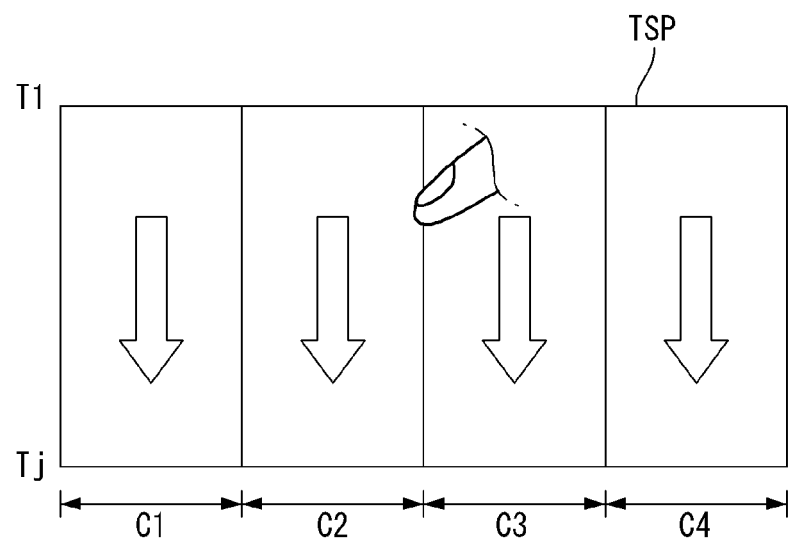
Block sensing
↓ Touch input
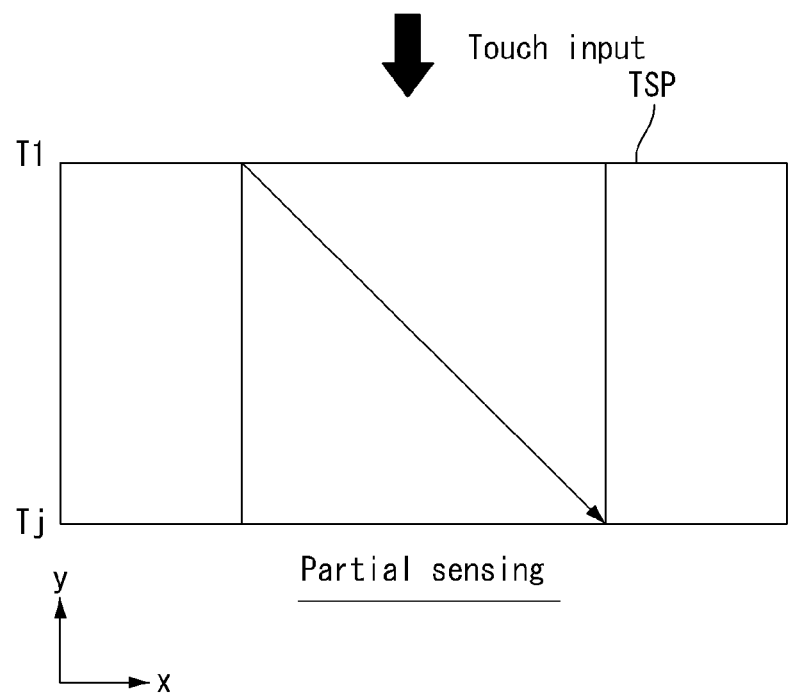
Partial sensing

TOUCH SENSING DEVICE

This application claims the benefit of Korean Patent Application No. 10-2011-0085790 filed on Aug. 26, 2011, Korean Patent Application No. 10-2011-0117130 filed on Nov. 10, 2011, Korean Patent Application No. 10-2011-0128197 filed on Dec. 2, 2011, and Korean Patent Application No. 10-2011-0129559 filed on Dec. 6, 2011, the entire contents of which are incorporated herein by reference for all purposes as if fully set forth herein.

BACKGROUND OF THE INVENTION

1. Field of the Invention

Embodiments of the invention relate to a touch sensing device.

2. Discussion of the Related Art

As home appliances or portable information devices are becoming more lightweight and slimmer, user input means is being switched from a button switch to a touch screen. A touch screen includes a plurality of touch sensors.

US Publication No. 2010/0200310 (published on Aug. 12, 2010) discloses a touch screen (hereinafter, referred to as "a self capacitance touch screen") including capacitive touch sensors at crossings of X lines and Y lines crossing each other. The self capacitance touch screen scans the X lines and converts a signal received from the X lines into digital data through an analog-to-digital conversion (hereinafter, referred to as "ADC") process. Further, the self capacitance touch screen scans the Y lines and converts a signal received from the Y lines into digital data through the ADC process. The self capacitance touch screen recognizes a touch sensor, which is positioned at a crossing of an X line and a Y line having a large change in capacitance before and after a touch operation, as a touch position. The self capacitance touch screen analyzes digital data obtained by sensing each of an X line and a Y line and converting them through the ADC process to thereby detect the touch position. Therefore, the self capacitance touch screen may wrongly recognize a ghost point present at the same X and Y lines as an actual touch position as the touch position. Accordingly, the self capacitance touch screen has the drawbacks that it has low multi-touch sensitivity and the complicated ghost detection and a removal algorithm has to be additionally applied.

The self capacitance touch screen disclosed in US Publication No. 2010/0200310 senses the X lines and the Y lines on a group basis in a pre-scan process. Next, the self capacitance touch screen disclosed in US Publication No. 2010/0200310 performs a re-scan process and a touch position detection process after the ADC process and a touch position detection process, thereby improving the accuracy of touch recognition. Moreover, the self capacitance touch screen disclosed in US Publication No. 2010/0200310 simultaneously scans the X lines (or the Y lines) of a group in the pre-scan process, and thus may reduce a touch sensing time, as compared to a method for sequentially sensing all the X lines and Y lines each time a touch position is detected. However, the self capacitance touch screen disclosed in US Publication No. 2010/0200310 has limitation in the reduction in the touch sensing time because it has to sequentially perform the pre-scan, the ADC, the execution of the touch recognition algorithm, the re-scan, the ADC, and the execution of the touch recognition algorithm each time the touch position is detected.

A touch report rate is a frequency at which coordinate data obtained by sensing all of the touch sensors present in the touch screen is transmitted to the outside. The higher the touch report rate, the higher the continuity of touch input traces and the higher the touch sensitivity a user feels. The touch report rate is inversely proportional to total sensing time required to sense all of the touch sensors of the touch screen. That is, the longer the total sensing time, the lower the touch report rate. Accordingly, the self capacitance touch screen disclosed in US Publication No. 2010/0200310 cannot sufficiently increase the touch report rate.

The related art touch screen has the low sensing sensitivity, for example, the wrong recognition of the ghost point as the touch position and the input of a momentarily generated noise as a touch input when the momentarily generated noise is synchronized with a sensing timing. The performance improvement of the touch screen including the increase of the touch report rate, the improvement of the sensing sensitivity, etc. has to be achieved, so as to improve the touch sensitivity the user feels. For example, linearity of the related art touch screen is reduced when a line drawing or a dragging is performed on the related art touch screen.

Because the related art touch screen repeatedly senses all of the touch sensors irrespective of the presence or absence of a touch (or proximity) input, it is difficult to reduce power consumption of the related art touch screen.

SUMMARY OF THE INVENTION

Embodiments of the invention provide a touch sensing device capable of improving a performance of a touch screen.

In one aspect, there is a touch sensing device including a touch screen including Tx lines, Rx lines crossing the Tx lines, and touch sensors formed between the Tx lines and the Rx lines, and a touch screen driving circuit which senses all the touch sensors of the touch screen in a first sensing step to detect the presence or absence of a touch input, and then again senses the touch sensors, in which the touch input is detected as a first sensing result, in a second sensing step to detect a position of the touch input.

When there is no touch sensor, in which the touch input is detected as the first sensing result, the touch screen driving circuit repeats the first sensing step.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 18 to 22 illustrate a block sensing method and a partial sensing method when a touch screen is driven in a state being divided into two or more Rx blocks;

FIG. 26 is an equivalent circuit diagram of a sampling circuit when switches S11, S12, S11', and S12' shown in FIG. 25 are turned on;

FIG. 27 is an equivalent circuit diagram of a sampling circuit when switches S21, S22, S21', and S22' shown in FIG. 25 are turned on;

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

A mutual capacitance touch screen includes Tx lines, Rx lines crossing the Tx lines, and touch sensors formed between the Tx lines and the Rx lines. Each of the touch sensors has a mutual capacitance formed between the Tx line and the Rx line. A touch sensing device senses changes in a voltage charged to the touch sensors before and after a touch (or proximity) operation and detects the presence or absence of a touch (or proximity) of a conductive material and a position thereof. The mutual capacitance touch screen supplies a driving signal to the Tx lines and individually senses changes in the capacitance of each of the touch sensors through the Rx lines in synchronization with the driving signal. In the mutual capacitance touch screen, the Tx lines, to which the driving signal is supplied, are separated from the Rx lines sensing the touch sensors. The driving signal has been illustrated as taking the form of a driving signal for ease of description, but not limited thereto. For example, the driving signal may be generated in various forms including a square wave pulse, a sine wave pulse, a triangle wave pulse, etc. The mutual capacitance touch screen is able to sense the voltage change before and after the touch operation in each of the touch sensors through this sensing method, thereby accurately recognizing each touch (or proximity) input without detecting a ghost point in case of a multi-touch input.

Figure 1:
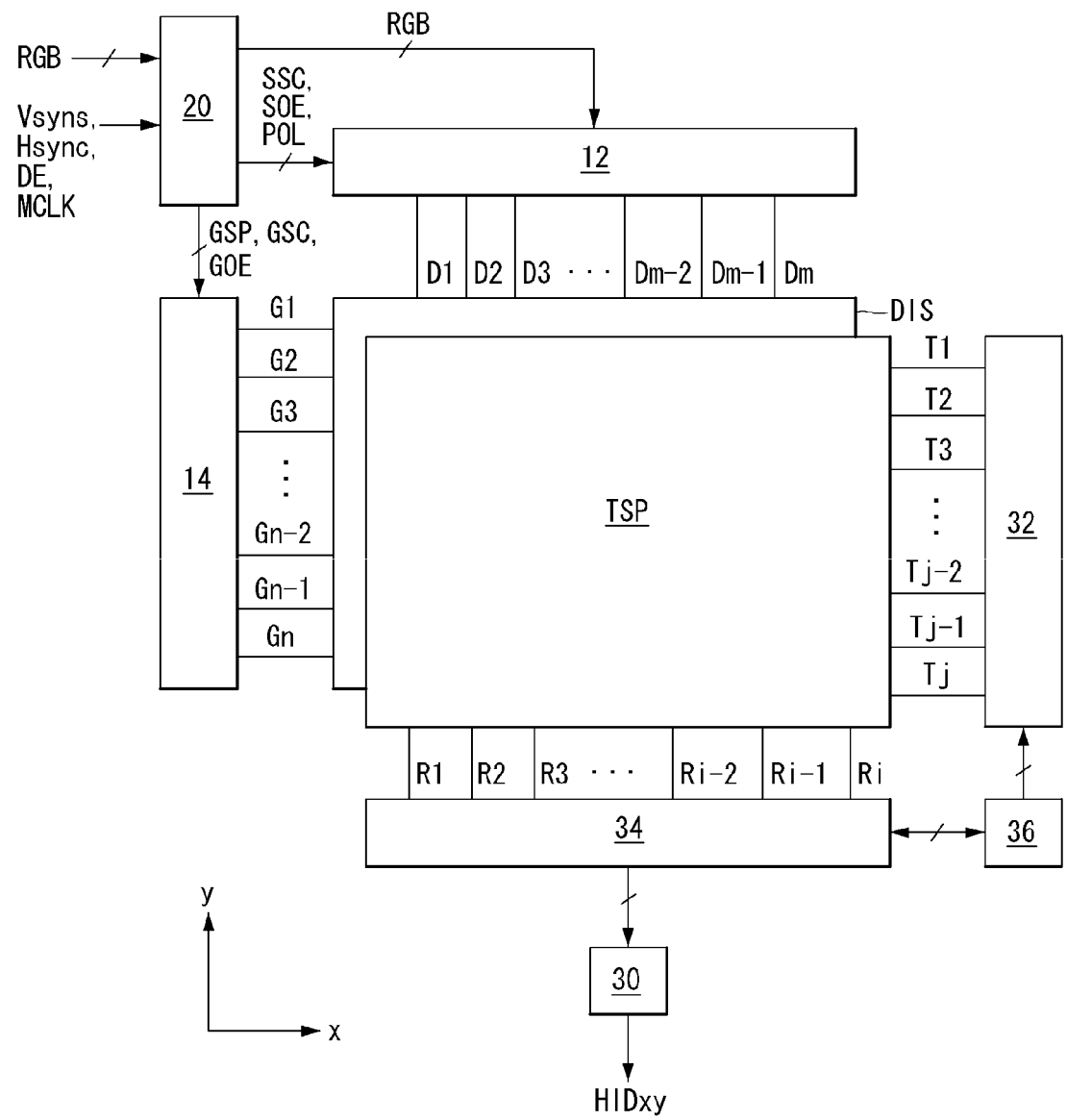
FIG. 1 is a block diagram of a display device according to an example embodiment of the invention.
Figure 2:
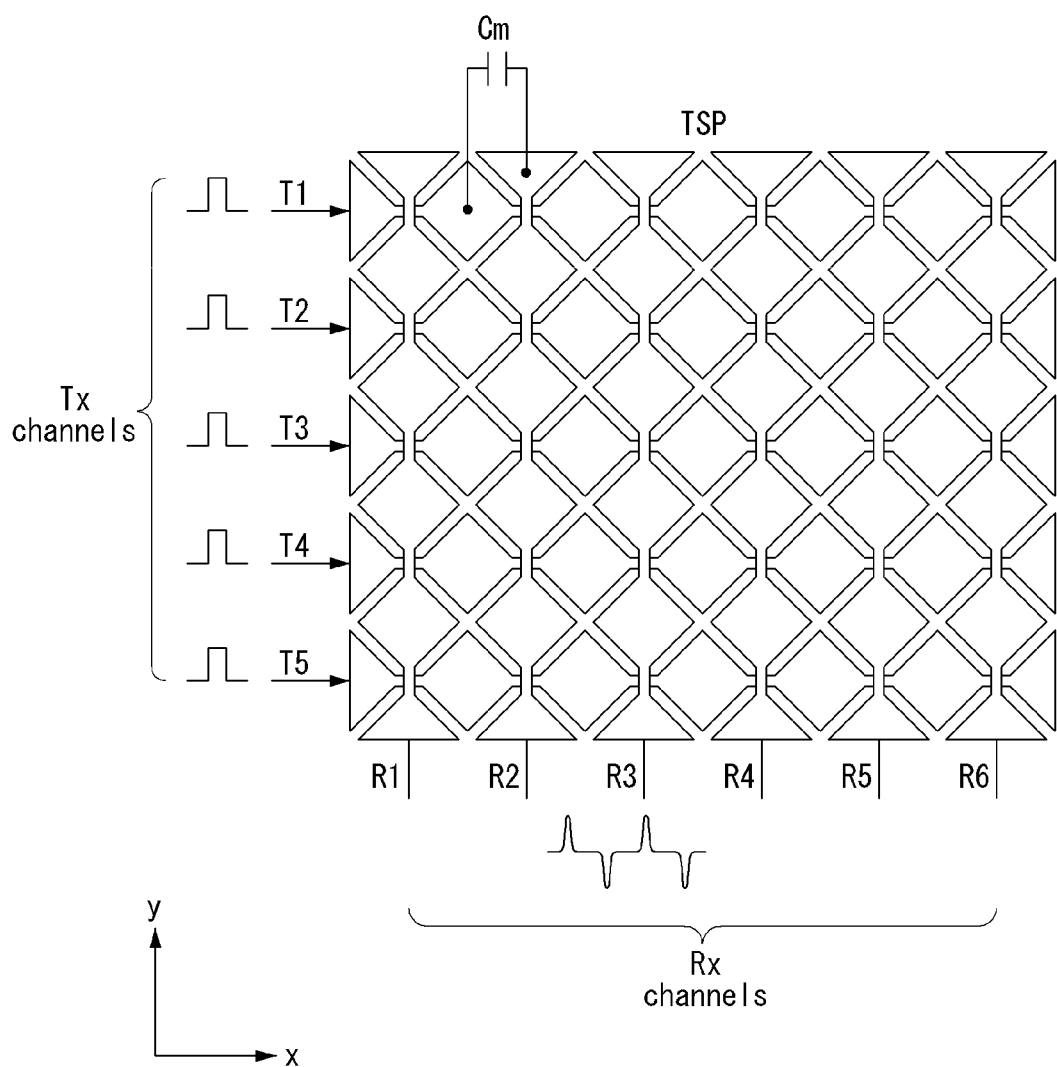
FIG. 2 is a plane view illustrating in detail an electrode pattern of a touch screen shown in FIG. 1.

As shown in FIGS. 1 and 2, a display device according to an example embodiment of the invention includes a display panel DIS, a display driving circuit, and a touch sensing device. The touch sensing device includes a touch screen TSP and a touch screen driving circuit. All components of the display device are operatively coupled and configured.

The display device according to the embodiment of the invention may be implemented based on a flat panel display, such as a liquid crystal display (LCD), a field emission display (FED), a plasma display panel (PDP), an organic light emitting diode (OLED) display, and an electrophoresis display (EPD). In the following description, the embodiment of the invention will be described using the liquid crystal display as an example of the flat panel display. Other flat panel displays may be used.

The display panel DIS includes a lower glass substrate GLS2, an upper glass substrate GLS1, and a liquid crystal layer formed between the lower glass substrate GLS2 and the upper glass substrate GLS1. The lower glass substrate GLS2 of the display panel DIS includes a plurality of data lines D1 to Dm, where m is a positive integer, a plurality of gate lines (or scan lines) G1 to Gn crossing the data lines D1 to Dm, where n is a positive integer, a plurality of thin film transistors (TFTs) formed at crossings of the data lines D1 to Dm and the gate lines G1 to Gn, a plurality of pixel electrodes for charging liquid crystal cells to a data voltage, a plurality of storage capacitors, each of which is connected to the pixel electrode and holds a voltage of the liquid crystal cell, etc. The display panel DIS may use any known display panel structure.

Pixels of the display panel DIS are respectively formed in pixel areas defined by the data lines D1 to Dm and the gate lines G1 to Gn to form a matrix structure. The liquid crystal cell of each pixel is driven by an electric field generated depending on a voltage difference between the data voltage supplied to the pixel electrode and a common voltage supplied to a common electrode, thereby adjusting an amount of light transmitted by the liquid crystal cell. The TFTs are turned on in response to a gate pulse (or a scan pulse) from the gate lines G1 to Gn, thereby supplying the voltage from the data lines D1 to Dm to the pixel electrodes of the liquid crystal cells.

The upper glass substrate GLS1 of the display panel DIS may include black matrixes, color filters, etc. The lower glass substrate GLS2 of the display panel DIS may be configured in a color filter on TFT (COT) structure. In this instance, the black matrixes and the color filters may be formed on the lower glass substrate GLS2 of the display panel DIS.

Polarizing plates POL1 and POL2 are respectively attached to the upper and lower glass substrates GLS1 and GLS2 of the display panel DIS. Alignment layers for setting a pre-tilt angle of liquid crystals are respectively formed on the inner surfaces contacting the liquid crystals in the upper and lower glass substrates GLS1 and GLS2 of the display panel DIS. A column spacer may be formed between the upper and lower glass substrates GLS1 and GLS2 of the display panel DIS to keep cell gaps of the liquid crystal cells constant.

A backlight unit may be disposed in the rear of the display panel DIS. The backlight unit may be configured as one of an edge type backlight unit and a direct type backlight unit to provide light to the display panel DIS. The display panel DIS may be implemented in any known mode including a twisted nematic (TN) mode, a vertical alignment (VA) mode, an in-plane switching (IPS) mode, a fringe field switching (FFS) mode, etc.

The display driving circuit includes a data driving circuit 12, a scan driving circuit 14, a timing controller 20, etc. The display driving circuit writes video data of an input image to the pixels of the display panel DIS.

The data driving circuit 12 converts digital video data RGB received from the timing controller 20 into positive and negative analog gamma compensation voltages and outputs the data voltage. The data driving circuit 12 supplies the data voltage to the data lines D1 to Dm. The scan driving circuit 14 sequentially supplies the gate pulse synchronized with the data voltage to the gate lines G1 to Gn and selects lines of the display panel DIS to which the video data will be written.

The timing controller 20 receives timing signals, such as a vertical sync signal Vsync, a horizontal sync signal Hsync, a data enable DE, and a main clock MCLK, from an external host system. The timing controller 20 generates a data timing control signal and a scan timing control signal for respectively controlling operation timings of the data driving circuit 12 and the scan driving circuit 14 using the timing signals. The data timing control signal includes a source sampling clock SSC, a source output enable SOE, a polarity control signal POL, etc. The scan timing control signal includes a gate start pulse GSP, a gate shift clock GSC, a gate output enable GOE, etc.

Figure 3:
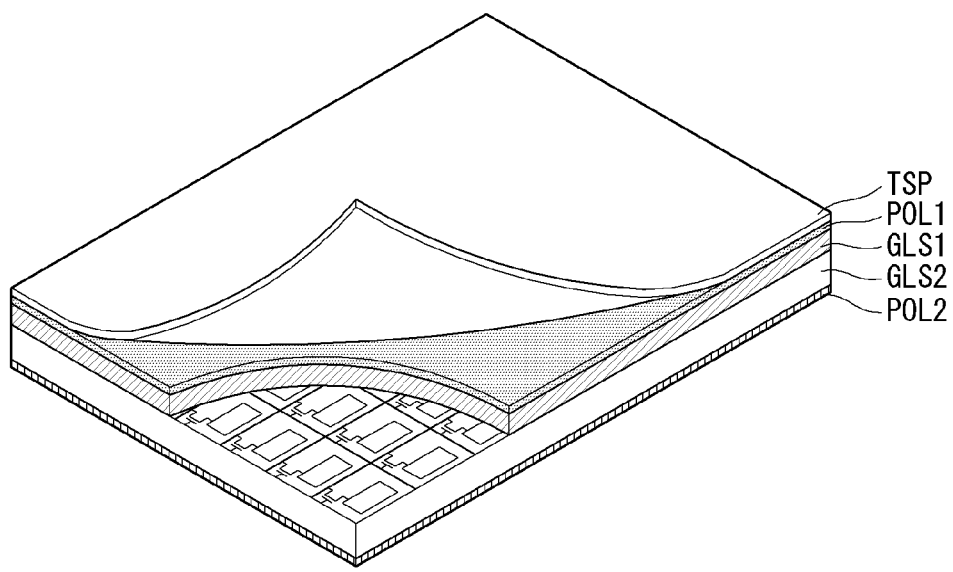
FIGS. 3 to 5 illustrate various combinations of a touch screen and a display panel according to an example embodiment of the invention.
Figure 4:
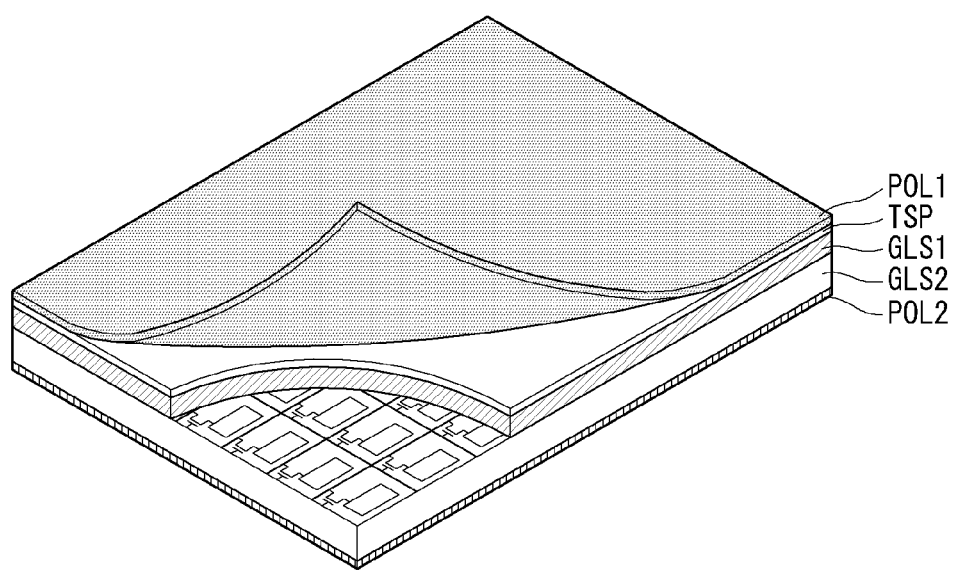
Figure 5:
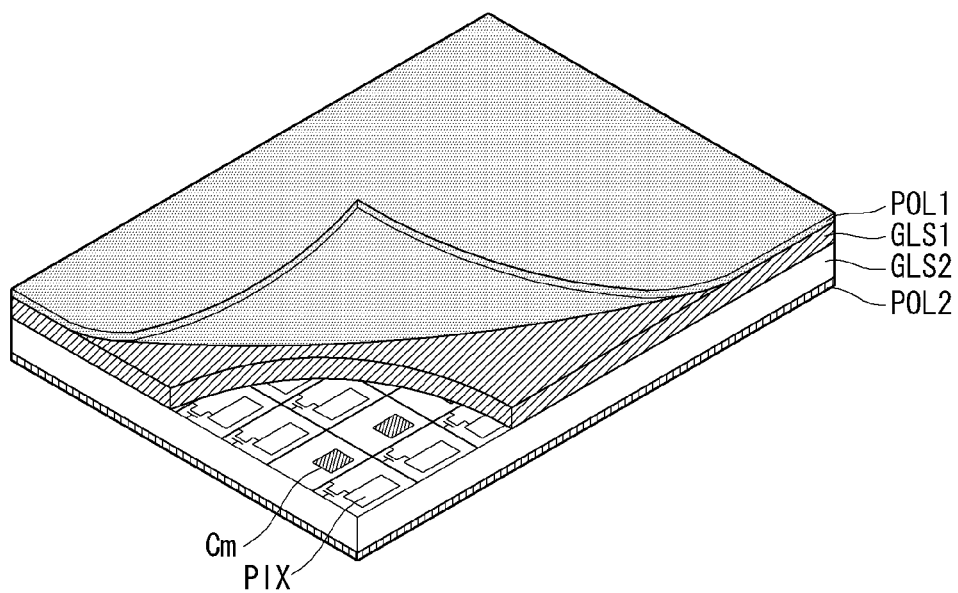

As shown in FIG. 3, the touch screen TSP may be attached on the upper polarizing plate POL1 of the display panel DIS. Alternatively, as shown in FIG. 4, the touch screen TSP may be formed between the upper polarizing plate POL1 and the upper glass substrate GLS1. In another embodiment, as shown in FIG. 5, touch sensors TSN of the touch screen TSP may be embedded in the lower glass substrate GLS2 along with pixel array of the display panel DIS in an in-cell manner. In FIG. 5, 'PIX' denotes the pixel electrode of the liquid crystal cell.

The touch screen TSP includes Tx lines T1 to Tj, where j is a positive integer less than n, Rx lines R1 to Ri crossing the Tx lines T1 to Tj, where i is a positive integer less than m, and i×j touch sensors TSN formed between the Tx lines T1 to Tj and the Rx lines R1 to Ri. Each of the touch sensors TSN has a mutual capacitance.

Figure 6:
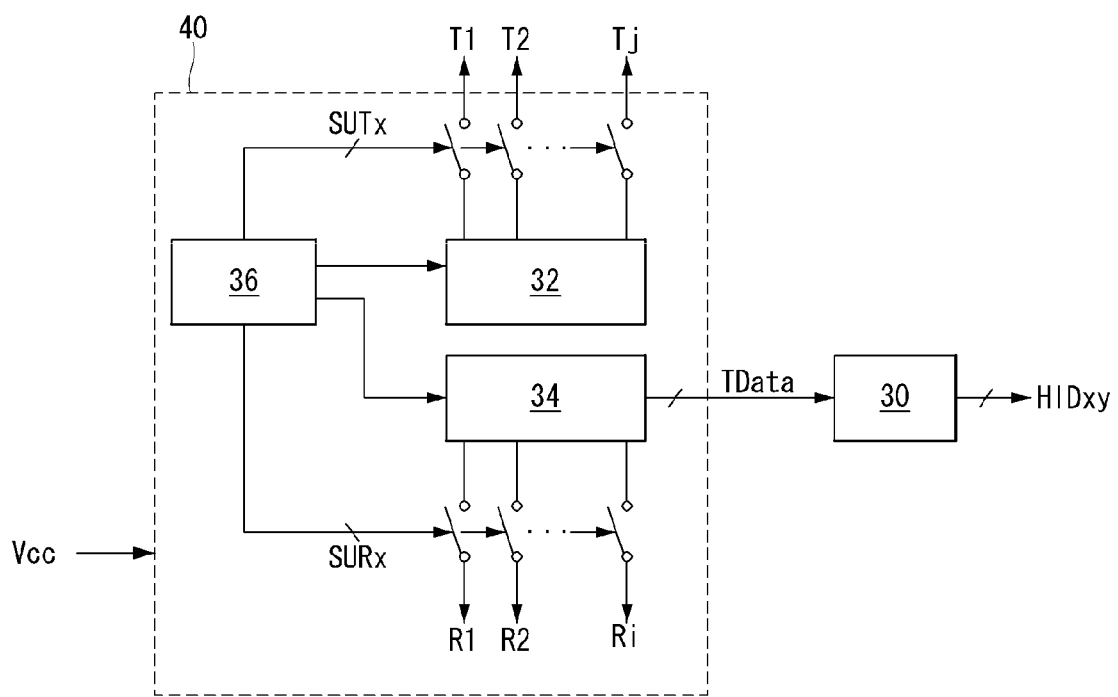
FIG. 6 is a block diagram illustrating a configuration of a readout integrated circuit according to an example embodiment of the invention.
Figure 7:
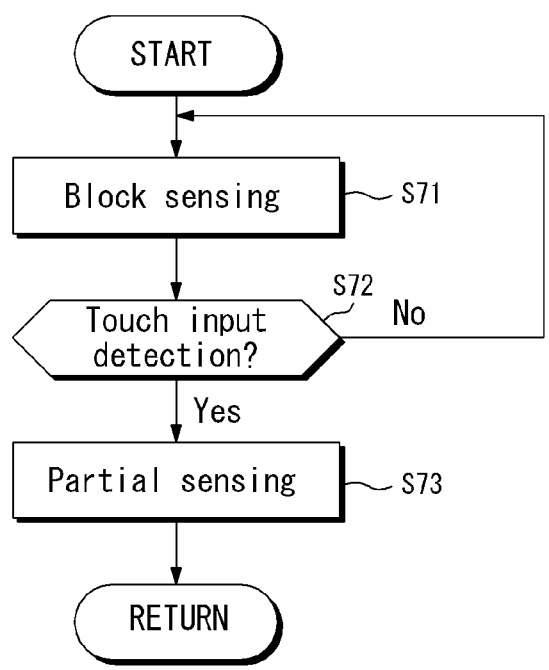
FIG. 7 is a flow chart illustrating a method for driving a touch sensing device according to a first embodiment of the invention.

The touch screen driving circuit includes a Tx driving circuit 32, an Rx driving circuit 34, a touch screen timing controller (hereinafter referred to as a "TSP timing controller") 36, and a touch recognition processor 30. The touch screen driving circuit supplies the driving signal to the Tx lines T1 to Tj and senses the voltage of the touch sensors through the Rx lines R1 to Ri in synchronization with the driving signal. As shown in FIG. 6, the Tx driving circuit 32, the Rx driving circuit 34, and the TSP timing controller 36 may be integrated in one readout integrated circuit (ROIC) 40. The touch recognition processor 30 may also be integrated in the ROIC 40.

The touch screen driving circuit senses all of the touch sensors of the touch screen TSP in a first sensing step and then again senses only the touch sensors, in which a touch input is detected as a result of the first sensing step, in a second sensing step, thereby detecting a touch input position. The first sensing step scans the touch sensors of the touch screen TSP using a block sensing method or a fully sensing method. The second sensing step uses a partial sensing method for precisely sensing again only the touch sensors, in which the touch input is detected in the first sensing step. The first sensing step may be repeatedly performed one or more times until the touch input is detected.

The touch screen driving circuit may repeatedly perform a block sensing operation in a first block sensing step two or more times while gradually reducing the size of Tx blocks based on a position of the touch input. A reason to repeatedly perform the block sensing operation in the first block sensing step while gradually reducing the size of the Tx blocks is to confirm whether the detected touch input is true or false and to reduce power consumption of the touch screen.

As shown in FIG. 6, the Tx driving circuit 32 selects the Tx lines to be supplied with a driving signal in response to a setup signal SUTx input from the TSP timing controller 36 and supplies the driving signal to the selected Tx lines T1 to Tj. The embodiment of the invention repeatedly accumulates the voltage of the touch sensor TSN N times (where N is a positive integer equal to or greater than 2) and charges a sampling capacitor of the Rx driving circuit 34 with the accumulated voltage, thereby increasing the change in the voltage of the touch sensor TSN before and after the touch operation. To this end, the driving signal applied to each of the Tx lines T1 to Tj may include N driving signals which are generated at predetermined time intervals. If the j touch sensors TSN are connected to one Tx line, the driving signal including the N driving signals may be successively supplied to the one Tx line j times and then may be successively supplied to the next Tx line in the same manner.

The Rx driving circuit 34 selects the Rx lines to receive a touch sensor voltage in response to an Rx setup signal SURx input from the TSP timing controller 36. The Rx driving circuit 34 receives and samples the touch sensor voltage through the selected Rx lines. The Rx driving circuit 34 converts the sampled voltage into digital data using an analog-to-digital converter to output touch raw data TData (refer to FIG. 6). The touch raw data TData is transmitted to the touch recognition processor 30.

The TSP timing controller 36 is connected to the Tx driving circuit 32 and the Rx driving circuit 34 through an interface, such as an I$_2$C bus, an serial peripheral interface (SPI), and a system bus, thereby synchronizing operation timings of the Tx driving circuit 32 and the Rx driving circuit 34 with each other. The TSP timing controller 36 controls a Tx channel setup of the Tx driving circuit 32, an Rx channel setup of the Rx driving circuit 34, a sampling timing of the Rx driving circuit 34, an analog-to-digital conversion timing of the Rx driving circuit 34, etc. The TSP timing controller 36 generates control signals for controlling the Tx channel setup of the Tx driving circuit 32, the Rx channel setup of the Rx driving circuit 34, and operation timings of the Tx driving circuit 32 and the Rx driving circuit 34.

The touch recognition processor 30 analyzes the touch raw data input from the Rx driving circuit 34 using a previously determined touch recognition algorithm. The touch recognition algorithm compares the touch raw data with a predetermined threshold value, estimates touch raw data, which is equal to or greater than the threshold value, as touch (or proximity) input data, and calculates coordinates of a position of the touch (or proximity) input. The touch recognition algorithm may be any well-known algorithm applicable to the mutual capacitance touch screen. The touch recognition processor 30 transmits coordinate data HIDxy, including coordinate information of the touch (or proximity) input position obtained as a calculation result of the touch recognition algorithm, to an external host system. The touch recognition processor 30 may include a buffer memory which stores a calculation result of the touch recognition algorithm and touch coordinate data. The touch recognition processor 30 may be implemented as a microcontroller unit (MCU).

The host system may be connected to an external video source equipment, for example, a navigation system, a set-top box, a DVD player, a Blu-ray player, a personal computer (PC), a home theater system, a broadcasting receiver, and a phone system and may receive image data from the external video source equipment. The host system converts the image data from the external video source equipment into a format suitable for displaying on the display panel DIS. Also, the host system runs an application associated with the coordinate data input from the touch recognition processor 30.

A method for driving the touch sensing device according to the embodiment of the invention may virtually divide the touch sensors of the touch screen TSP into two or more blocks when a block sensing method is used as a first sensing method, thereby quickly determining the presence or absence of a touch (or proximity) input in each block using the block sensing method. Subsequently, the method for driving the touch sensing device according to the embodiment of the invention may apply a partial sensing method only to the block, in which the touch (or proximity) input is detected in the block sensing method, thereby precisely sensing a position of the touch (or proximity) input in the detected block. Thus, the method for driving the touch sensing device according to the embodiment of the invention may reduce the total sensing time of the touch screen to thereby increase a touch report rate and also may increase sensing sensitivity.

The method for driving the touch sensing device using both the block sensing method and the partial sensing method is described below in conjunction with FIGS. 7 to 24.

The touch screen TSP is divided into virtual Tx blocks and/or Rx blocks along an x-axis direction and/or a y-axis direction (refer to FIGS. 1 and 2). Each of the Tx/Rx blocks includes two or more Tx lines, two or more Rx lines, and the plurality of touch sensors.

As shown in FIGS. 7 to 24, the touch screen driving circuit firstly scans the touch sensors of the touch screen TSP to sense the touch sensors on a per block basis. Then, the touch screen driving circuit performs partial sensing (or second scanning) on the touch sensors belonging to a block in which a touch (or proximity) input is detected, thereby precisely detecting a position of the touch (or proximity) input. A block sensing period of one block in the embodiment of the invention merely corresponds to a sensing time of one line in the related art. Accordingly, the touch screen driving circuit according to the embodiment of the invention may reduce the total sensing time required to sense all the touch sensors of the touch screen. Further, the touch screen driving circuit according to the embodiment of the invention may repeatedly sense the position of the touch (or proximity) input two or more times in each frame through the block sensing step and the partial sensing step, thereby increasing the touch sensing accuracy and increasing the sensitivity of the touch sensors.

The Tx driving circuit 32 applies the driving signal to the Tx lines T1 to Tj on a per Tx-block basis during a block sensing period under the control of the TSP timing controller 36. The Tx driving circuit 32 supplies the driving signal only to the Tx lines T1 to Tj present in the Tx block, in which the touch (or proximity) input is detected, during a partial sensing period under the control of the TSP timing controller 36.

During the block sensing period, the Rx driving circuit 34 simultaneously senses voltages of the touch sensors through the Rx lines R1 to Ri on a per Rx-block basis under the control of the TSP timing controller 36 and the touch recognition processor 30, and converts the sensed voltages of the touch sensors into digital data. Afterwards, during the partial sensing period, the Rx driving circuit 34 may sequentially sample the voltages of the touch sensors received through the Rx lines present in an Rx block, in which the touch (or proximity) input is detected as a result of the block sensing, and may convert the sampled voltages into digital data. The Rx block includes G Rx lines, where G is a positive integer equal to or greater than 2 and less than i/2.

In the related art, the Tx driving circuit sequentially supplied a driving signal to Tx lines. In contrast, in the embodiment of the invention, a Tx driving time can be greatly reduced through the block sensing step, and the false touch recognition can be prevented through the partial sensing step.

Figure 13:
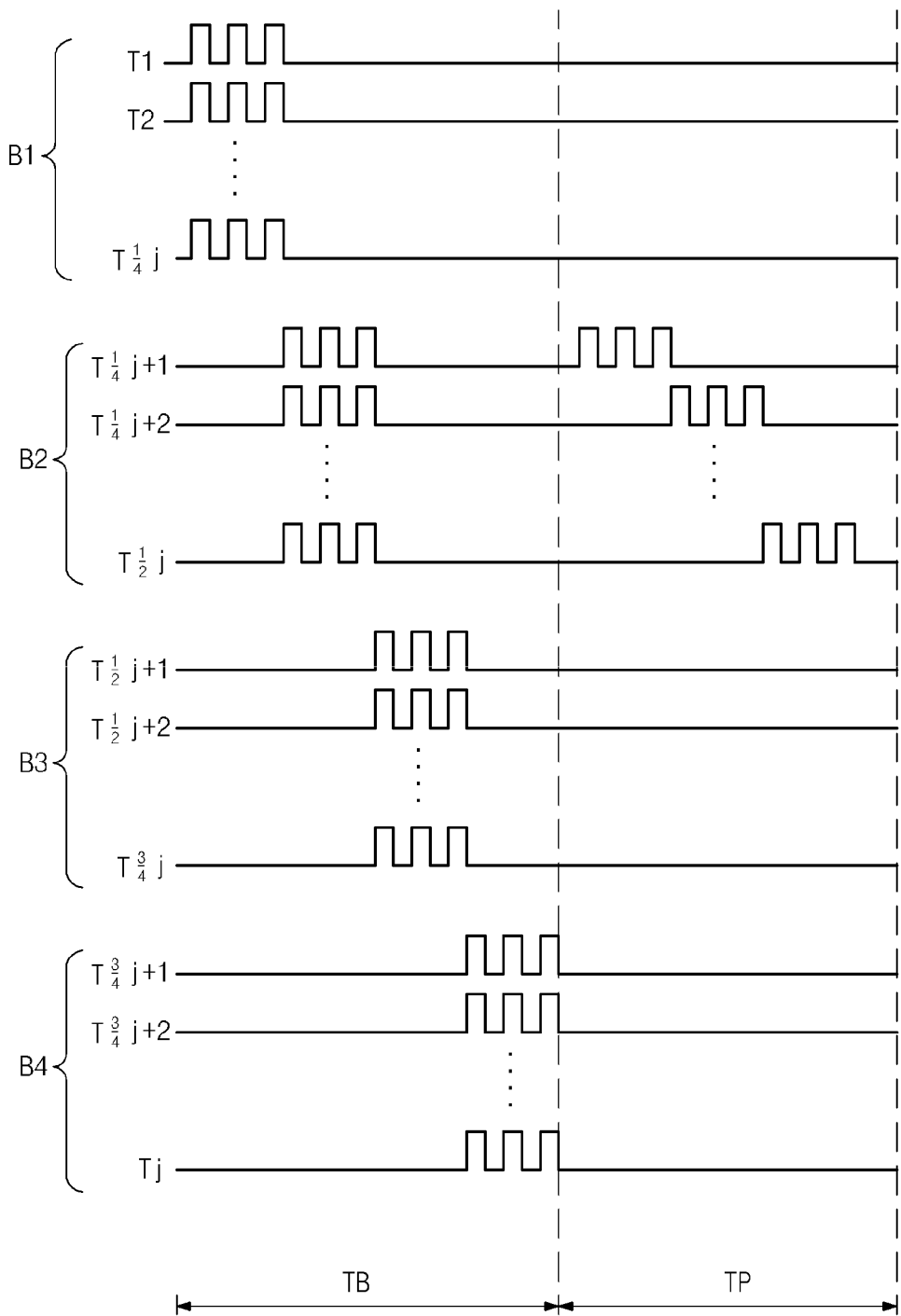
FIG. 13 is a waveform diagram of a driving signal supplied to Tx lines when a single touch input is detected as a block sensing result.
Figure 15:
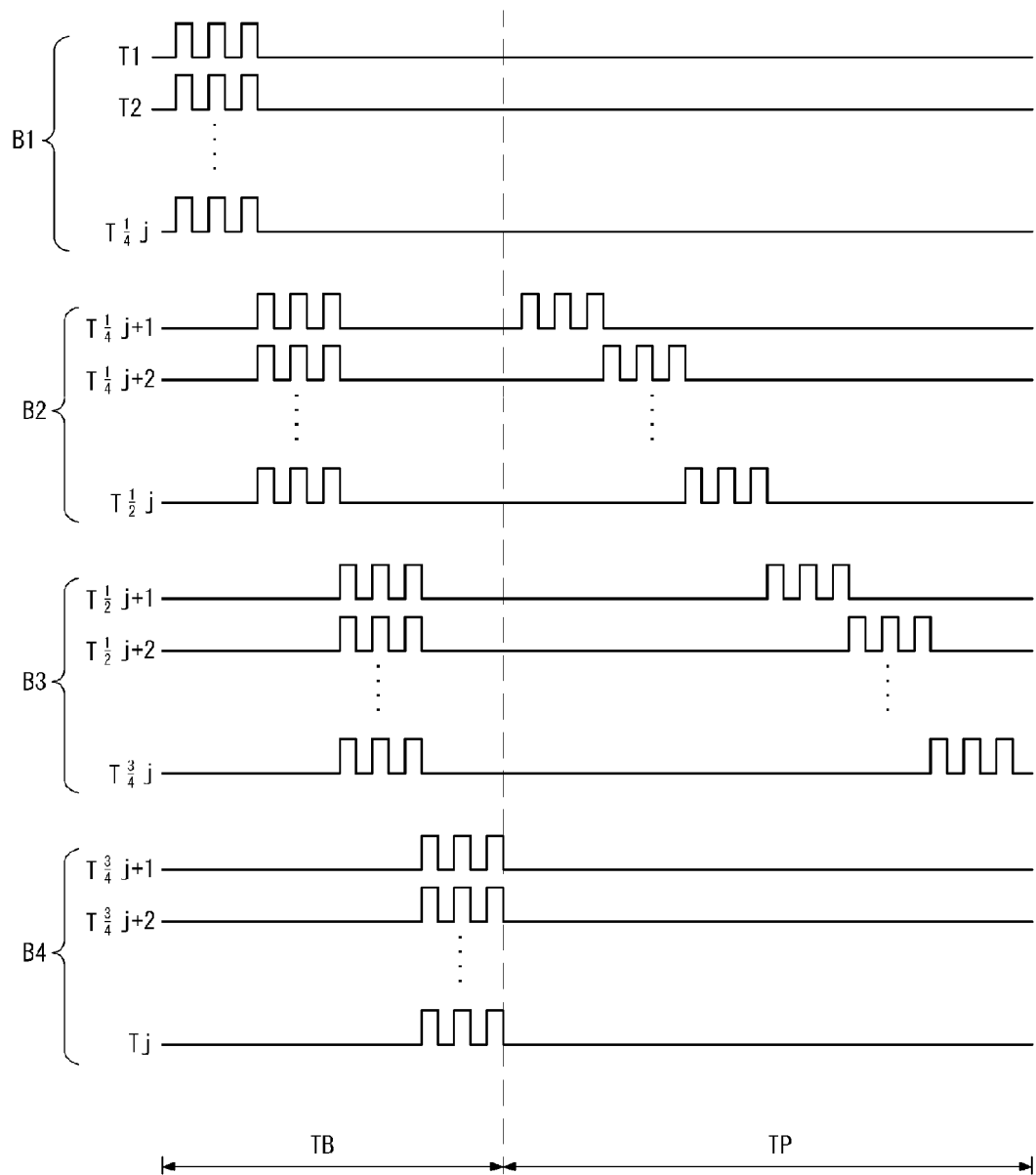
FIG. 15 is a waveform diagram of a driving signal supplied to Tx lines when a multi-touch input is detected as a block sensing result.

In response to the setup signal SUTx input from the TSP timing controller 36, the Tx driving circuit 32 selects the Tx lines on a per block basis during the block sensing period and selects the Tx lines on a per line basis during the partial sensing period. The Tx driving circuit 32 supplies the driving signal to the Tx lines T1 to Tj selected in response to the setup signal SUTx. To increase a charge amount of the sampling capacitor through the repeated accumulation of the voltages of the touch sensors TSN N times, as shown in FIGS. 13 and 15, the driving signal applied to each of the Tx lines T1 to Tj may include N driving signals which are successively generated at predetermined time intervals. If the j touch sensors are connected to one Tx line, the driving signal including the N driving signals may be successively supplied to the one Tx line j times and then may be successively supplied to the next Tx line in the same manner.

In the related art, when the touch sensors connected to one Tx line are sensed, the Rx driving circuit sequentially samples the voltages of the touch sensors and digitally converts the sampled voltages. In contrast, the Rx driving circuit 34 according to the embodiment of the invention can greatly reduce time required to receive and sample the voltages of the touch sensors in the block sensing step.

The Rx driving circuit 34 selects the Rx lines R1 to Ri to receive the touch sensor voltages in response to the Rx setup signal SURx input from the TSP timing controller 36. The Rx driving circuit 34 receives and samples the voltages of the touch sensors through the Rx lines selected in response to the Rx setup signal SURx.

During the block sensing period, the Rx driving circuit 34 may simultaneously receive and sample the voltages of the touch sensors through the Rx lines R1 to Ri on a per Rx-block basis and may convert the sampled voltages into digital data. The Rx driving circuit 34 may sequentially receive and sample the voltages of the touch sensors through the Rx lines present in the Rx block, in which the touch (or proximity) input is detected as the block sensing result, and may convert the sampled voltages into digital data. The digital data output from the Rx driving circuit 34, which is touch raw data, is transmitted to the touch recognition processor 30.

The touch recognition processor 30 may analyze the touch raw data TData obtained as the block sensing result using the touch recognition algorithm, and when a change amount of the touch sensor voltage before and after the touch operation is equal to or greater than a predetermined threshold value, may determine touch raw data of the change amount as data of the touch (or proximity) input position, thereby detecting the presence or absence of the touch (or proximity) input. When the touch (or proximity) input is detected as the block sensing result, the touch recognition processor 30 controls the Tx driving circuit 32 and the Rx driving circuit 34 in the partial sensing step. The touch recognition processor 30 performs the partial sensing step, thereby analyzing the touch raw data TData obtained by precisely sensing the touch sensors of the block, in which the touch (or proximity) input is detected in the block sensing step. The touch recognition processor 30 performs the touch recognition algorithm, and when a change amount of the touch sensor voltage before and after the touch operation as the partial sensing result is equal to or greater than the predetermined threshold value, determines touch raw data of the change amount as data obtained from the touch sensors at an actual touch (or proximity) input position, thereby estimating the coordinate values of the touch sensors. The touch recognition processor 30 transmits final touch coordinate data, including coordinate information of the touch sensors detected as the touch (or proximity) input in both the block sensing step and the partial sensing step, to the host system.

If no touch (or proximity) input is detected in the block sensing step, the touch recognition processor 30 does not proceed to the partial sensing step and repeats the block sensing step. Accordingly, the touch recognition processor 30 may selectively omit the partial sensing step based on the block sensing result, thereby reducing the total sensing time of the touch screen without a reduction in the touch sensitivity.

As shown in FIGS. 7 to 10, the block sensing step senses the touch sensors on a per block basis to sense all the touch sensors of the touch screen TSP for a first sensing time TB in step S71. For example, the block sensing step simultaneously supplies the driving signal to the Tx lines present in an I-th block (where I is a positive integer) to simultaneously sense the voltages of all the touch sensors belonging to the I-th block. Subsequently, the block sensing step simultaneously supplies the driving signal to the Tx lines present in an (I+1)th block to simultaneously sense the voltages of all the touch sensors belonging to the (I+1)th block. As shown in FIGS. 13 and 15, because the driving signal is simultaneously supplied to all the Tx lines present in one block, the first sensing time TB of one block in the embodiment of the invention is only time required to sense one line of the touch screen in the related art.

When the touch (or proximity) input is detected as the block sensing result, the touch recognition processor 30 proceeds to and performs the partial sensing step for a second sensing time TP to sequentially supply the driving signal, line by line, to the Tx lines present in a block, in which the touch (or proximity) input is detected, and to precisely sense the voltages of the touch sensors belonging to the block, thereby precisely detecting the touch (or proximity) input position in step S72 and S73. The second sensing time TP varies depending on the number of blocks in which the touch (or proximity) input is detected.

Figure 8:
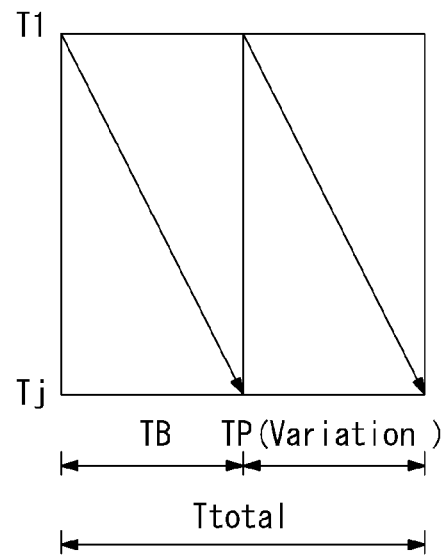
FIGS. 8 and 9 illustrate a block sensing time and a partial sensing time.

As shown in FIG. 8, only when the touch (or proximity) input is detected in the block sensing step, the partial sensing step is performed subsequent to the block sensing step. On the other hand, as shown in FIG. 9, if no touch (or proximity) input is detected in the block sensing step, the block sensing step is again performed subsequent to the block sensing step.

Figure 9:
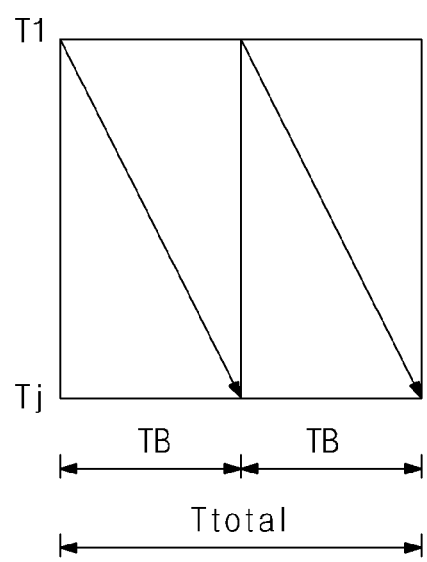

When the block sensing step is repeatedly performed as shown in FIG. 9, the Tx driving circuit 32, the Rx driving circuit 34, and the TSP timing controller 36 may be disabled and stop for a predetermined time before the next block sensing step is performed, so as to reduce power consumption of the touch screen driving circuit.

As shown in FIGS. 8 and 9, the total sensing time Ttotal required to sense all the touch sensors of the touch screen TSP is a sum of the first sensing time TB and the second sensing time TP. When the touch (or proximity) input (i.e., multi-touch (or multi-proximity) input) is detected from several blocks as the block sensing result, the partial sensing of the detected blocks is performed. Accordingly, as shown in FIG. 8, the first sensing time TB required for the block sensing is fixed, whereas the second sensing time required for the partial sensing is variable because the second sensing time TP may lengthen if the multi-touch (or multi-proximity) input is detected as the block sensing result.

Figure 10:
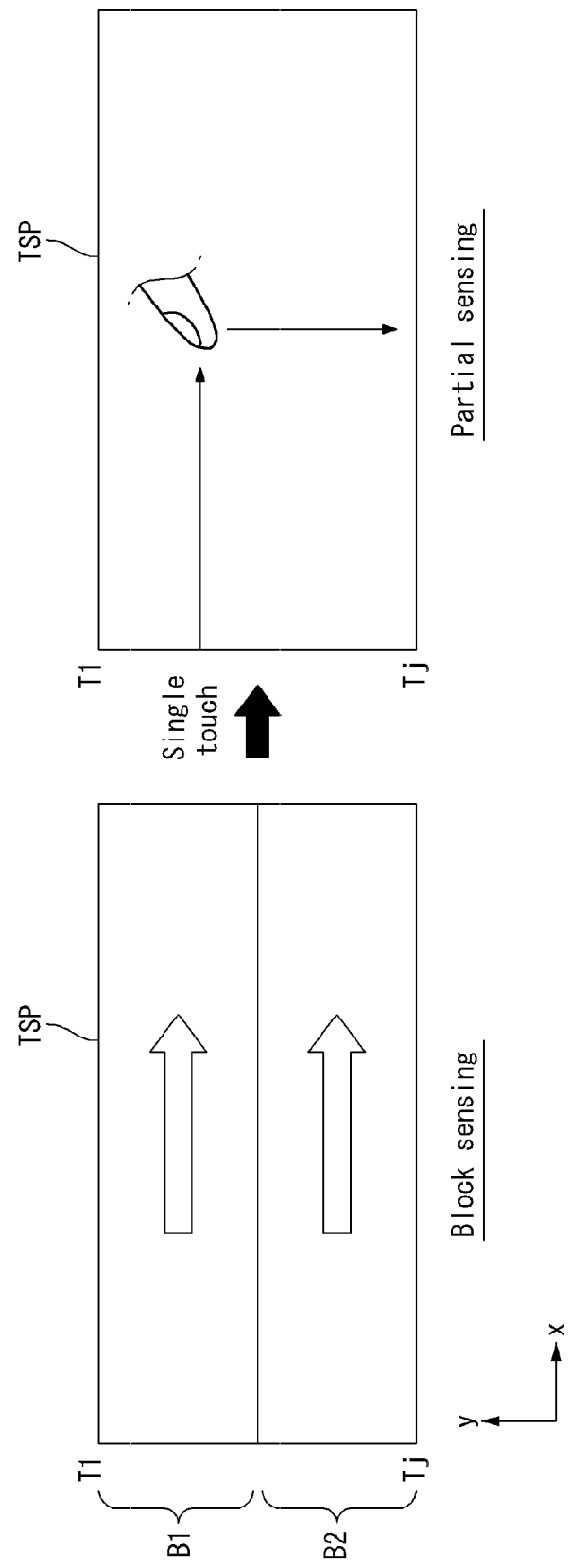
FIGS. 10 to 12 illustrate a block sensing method and a partial sensing method when a touch screen is driven in a state being divided into two or more Tx blocks.
Figure 11:
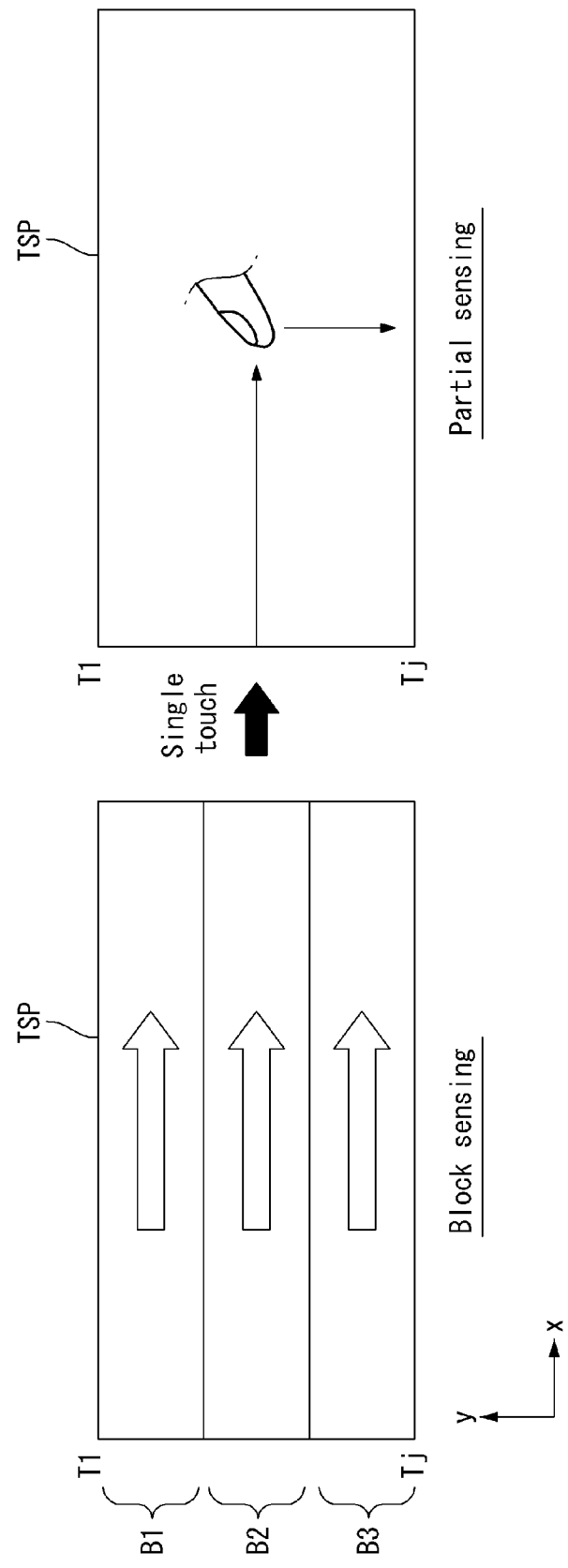
Figure 12:
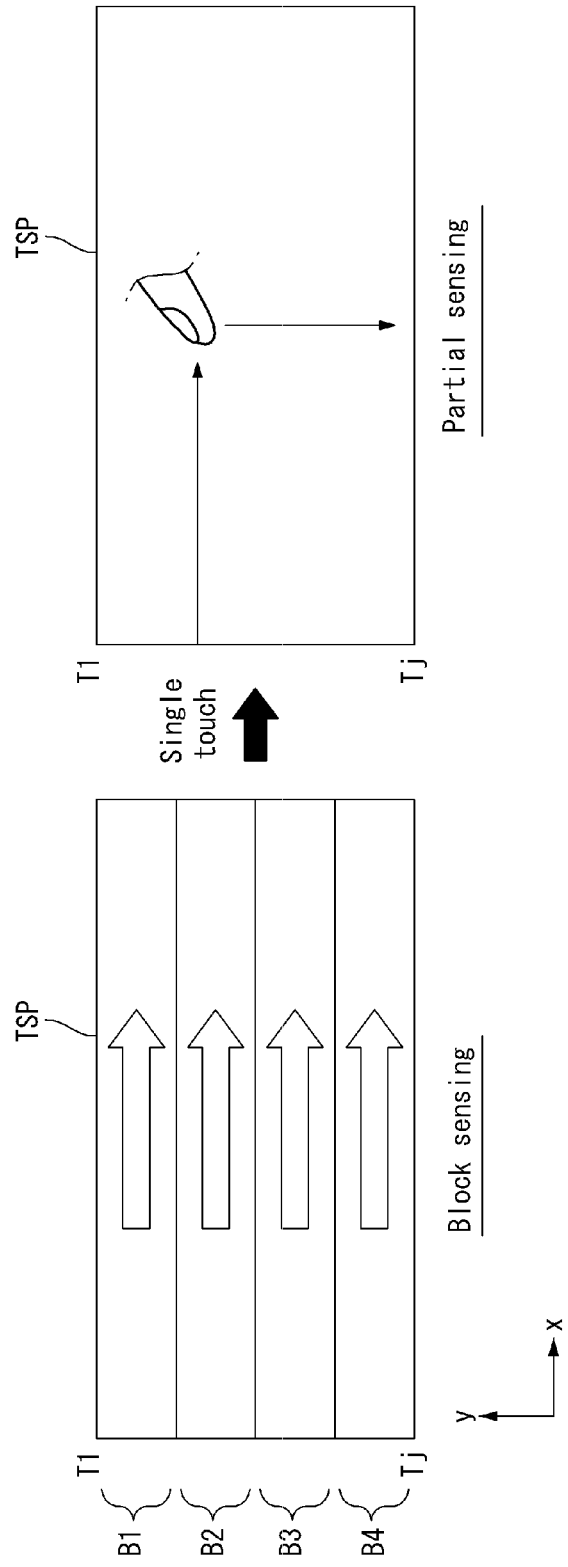

FIGS. 10 to 12 illustrate the block sensing step and the partial sensing step when the touch screen TSP is driven in a state being divided into the plurality of Tx blocks along the y-axis. Herein, the y-axis is parallel to a long-axis direction of the Rx lines as shown in FIGS. 1 and 2.

As shown in FIG. 10, the touch screen TSP may be divided into first and second Tx blocks B1 and B2. In this instance, in the block sensing step, the touch screen driving circuit simultaneously supplies the driving signal to all the Tx lines present in the first Tx block B1 and then simultaneously supplies the driving signal to all the Tx lines present in the second Tx blocks B2, thereby detecting the presence or absence of the touch (or proximity) input on a per Tx-block basis. When the touch (or proximity) input is detected in the first Tx block B1 in the block sensing step, the touch screen driving circuit proceeds to the partial sensing step. In the partial sensing step, the touch screen driving circuit sequentially supplies the driving signal to the Tx lines present in the first Tx block B1 to precisely sense the touch sensors of the first Tx block B1. As a result, the touch screen driving circuit accurately detects a final touch (or proximity) input position. In the partial sensing step, the touch screen driving circuit does not sense the second Tx block B2, in which no touch (or proximity) input is detected in the block sensing step.

As shown in FIG. 11, the touch screen TSP may be divided into first to third Tx blocks B1 to B3. In this instance, in the block sensing step, the touch screen driving circuit simultaneously supplies the driving signal to all the Tx lines present in the first Tx block B1 and then simultaneously supplies the driving signal to all the Tx lines present in the second Tx blocks B2, thereby detecting the presence or absence of the touch (or proximity) input on a per Tx-block basis. Subsequently, the touch screen driving circuit simultaneously supplies the driving signal to all the Tx lines present in the third block B3, thereby detecting the presence or absence of the touch (or proximity) input in the third Tx block B3. When the touch (or proximity) input is detected in the second Tx block B2 in the block sensing step, the touch screen driving circuit proceeds to the partial sensing step. In the partial sensing step, the touch screen driving circuit sequentially supplies the driving signal to the Tx lines present in the second Tx block B2 to precisely sense the touch sensors of the second Tx block B2. As a result, the touch screen driving circuit accurately detects a final touch (or proximity) input position. In the partial sensing step, the touch screen driving circuit does not sense the first and third Tx blocks B1 and B3, in which no touch (or proximity) input is detected in the block sensing step.

As shown in FIG. 12, the touch screen TSP may be divided into first to fourth Tx blocks B1 to B4. In this instance, in the block sensing step, the touch screen driving circuit simultaneously supplies the driving signal to all the Tx lines present in the first Tx block B1 and then simultaneously supplies the driving signal to all the Tx lines present in the second Tx blocks B2. Subsequently, the touch screen driving circuit simultaneously supplies the driving signal to all the Tx lines present in the third block B3 and then simultaneously supplies the driving signal to all the Tx lines present in the fourth Tx blocks B4, thereby detecting the presence or absence of the touch (or proximity) input on a per Tx-block basis. When the touch (or proximity) input is detected in the second Tx block B2 in the block sensing step, the touch screen driving circuit proceeds to the partial sensing step. In the partial sensing step, the touch screen driving circuit sequentially supplies the driving signal to the Tx lines present in the second Tx block B2 to precisely sense the touch sensors of the second Tx block B2. As a result, the touch screen driving circuit accurately detects a final touch (or proximity) input position. In the partial sensing step, the touch screen driving circuit does not sense the first, third, and fourth Tx blocks B1, B3, and B4, in which no touch (or proximity) input is detected in the block sensing step.

FIG. 13 is a waveform diagram of the driving signal supplied to the Tx lines in the case illustrated in FIG. 12.

Figure 14:
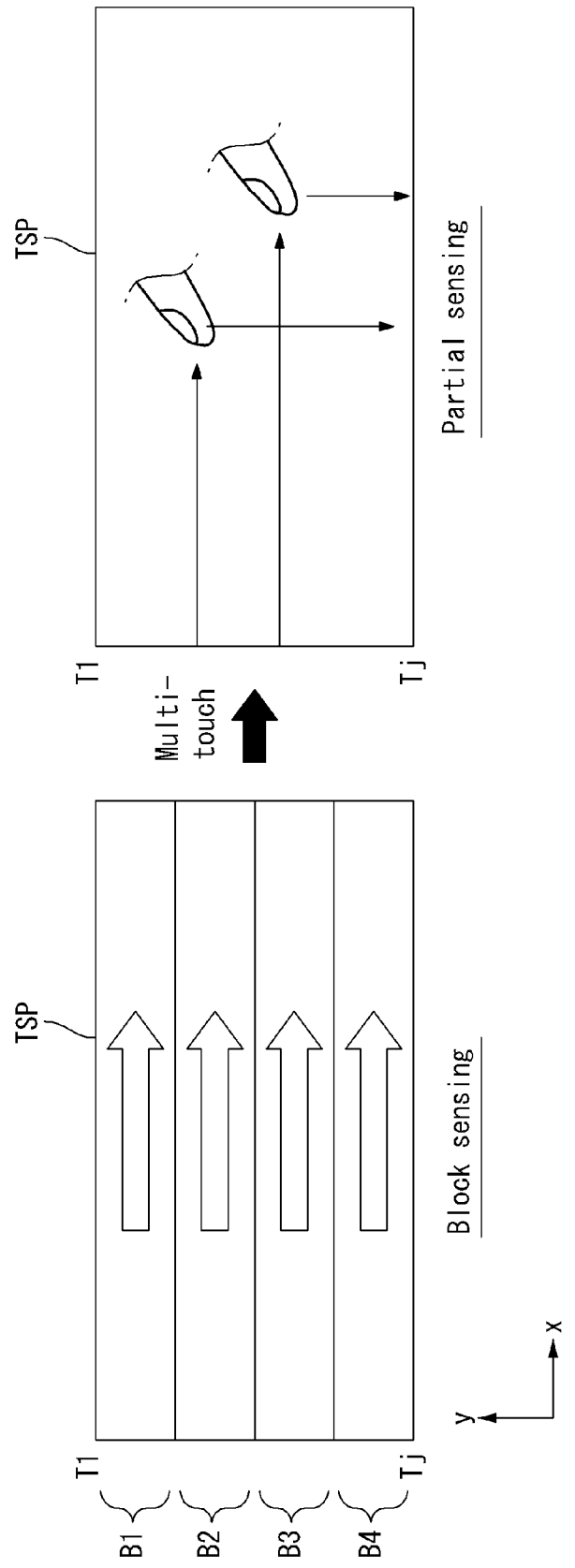
FIG. 14 illustrates a block sensing method and a partial sensing method when a multi-touch input to a plurality of Tx blocks is detected as a block sensing result.

FIG. 14 illustrates a block sensing step and a partial sensing step in a multi-touch (or multi-proximity) input. FIG. 15 is a waveform diagram of the driving signal supplied to the Tx lines in the case illustrated in FIG. 14.

As shown in FIGS. 14 and 15, the block sensing step supplies the driving signal on a per Tx-block basis to detect the presence or absence of the touch (or proximity) input on a per Tx-block basis. If the touch (or proximity) input is detected in each of the second and third Tx blocks B2 and B3 in the block sensing step, the partial sensing step is performed. The partial sensing step sequentially supplies the driving signal to the Tx lines present in the second Tx block B2 and then sequentially supplies the driving signal to the Tx lines present in the third Tx block B3, thereby precisely sensing the touch sensors belonging to the second and third Tx blocks B2 and B3. Accordingly, when the touch (or proximity) input is detected in several blocks as the block sensing result, the second sensing time TP may lengthen. The partial sensing step does not sense the touch sensors of the first and fourth Tx blocks B1 and B4 in which no touch (or proximity) input is detected in the block sensing step.

Figure 16:
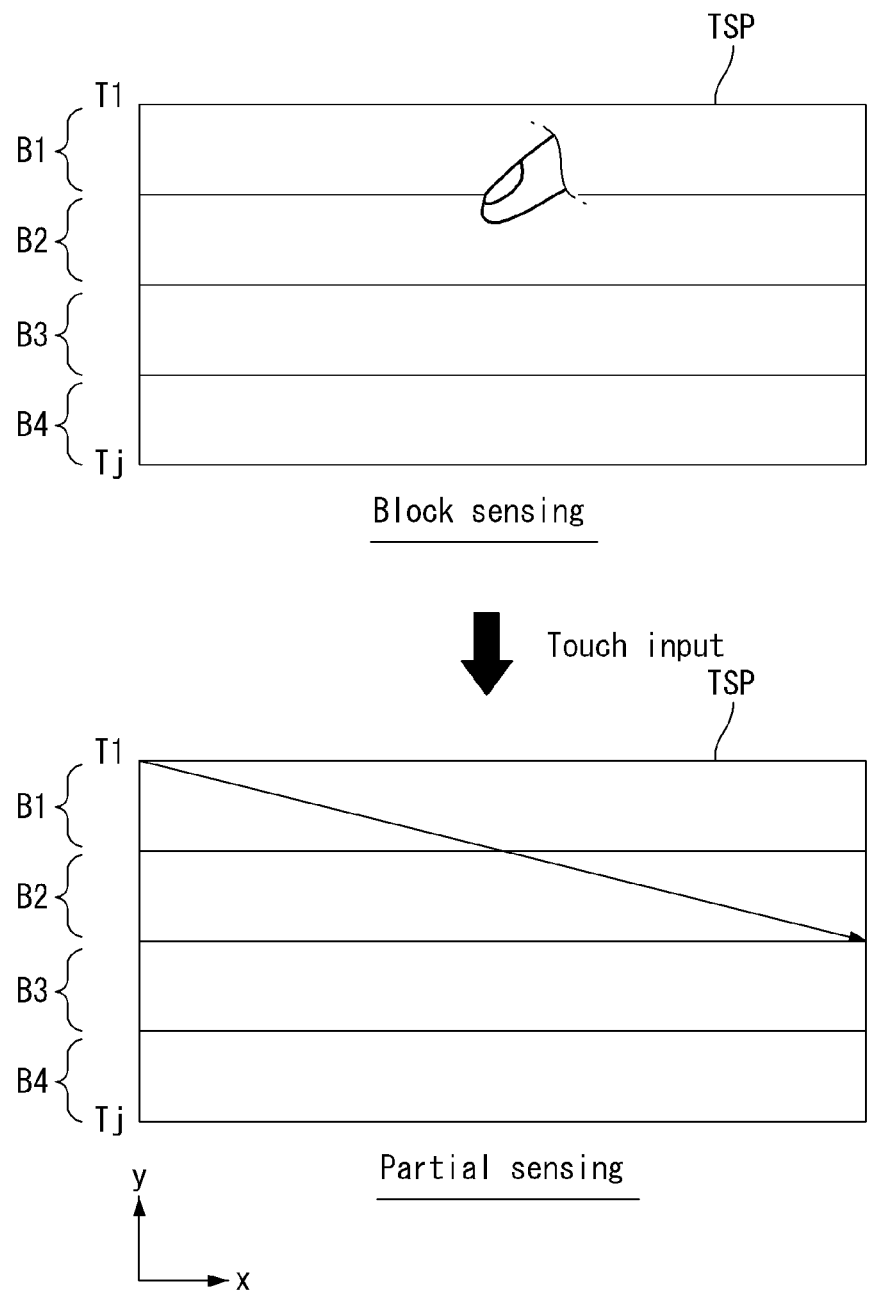
FIG. 16 illustrates a block sensing method and a partial sensing method when a touch input is generated at a boundary between adjacent blocks.
Figure 17:
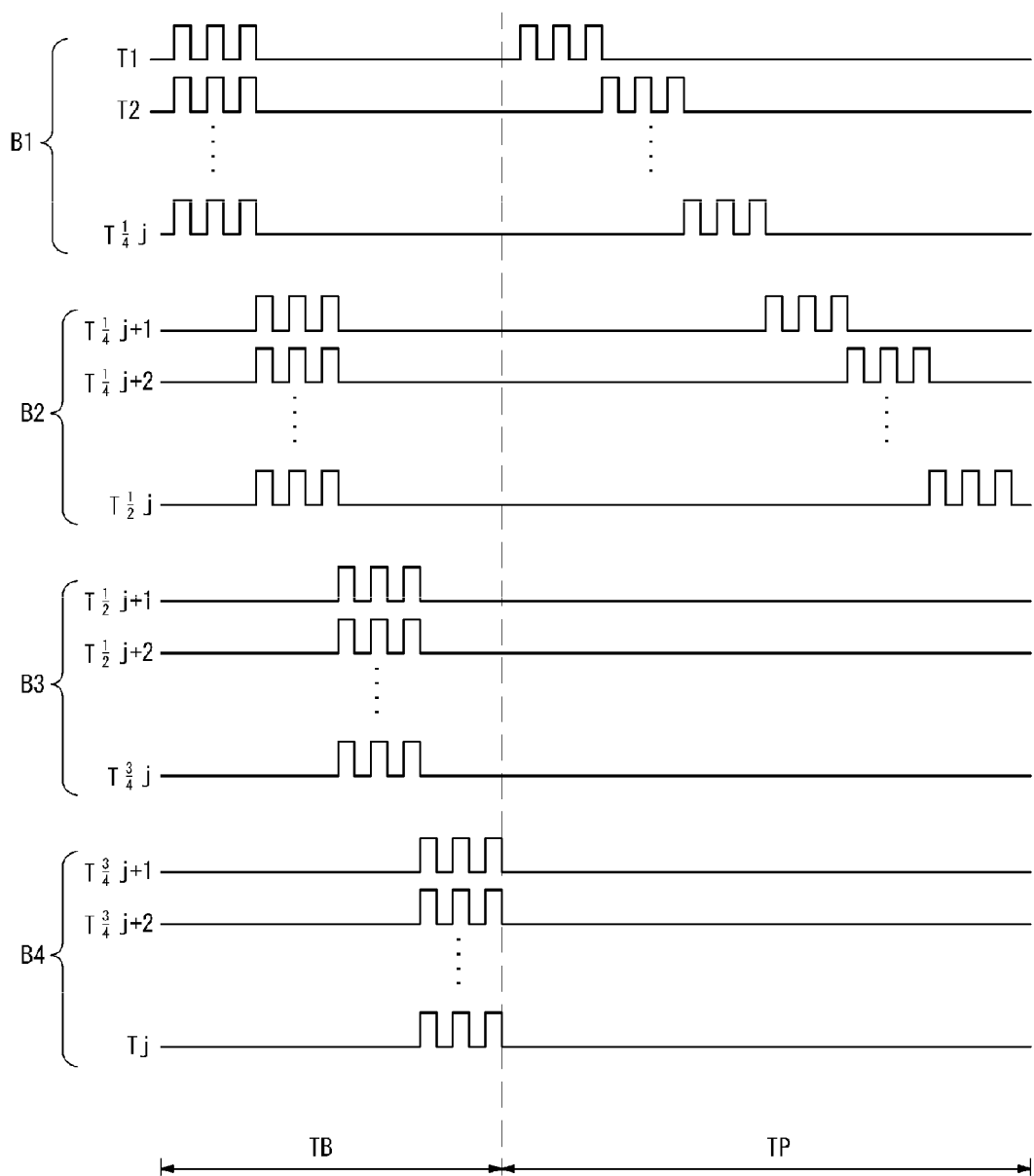
FIG. 17 is a waveform diagram of a driving signal supplied to Tx lines in the case illustrated in FIG. 16.
Figure 18:
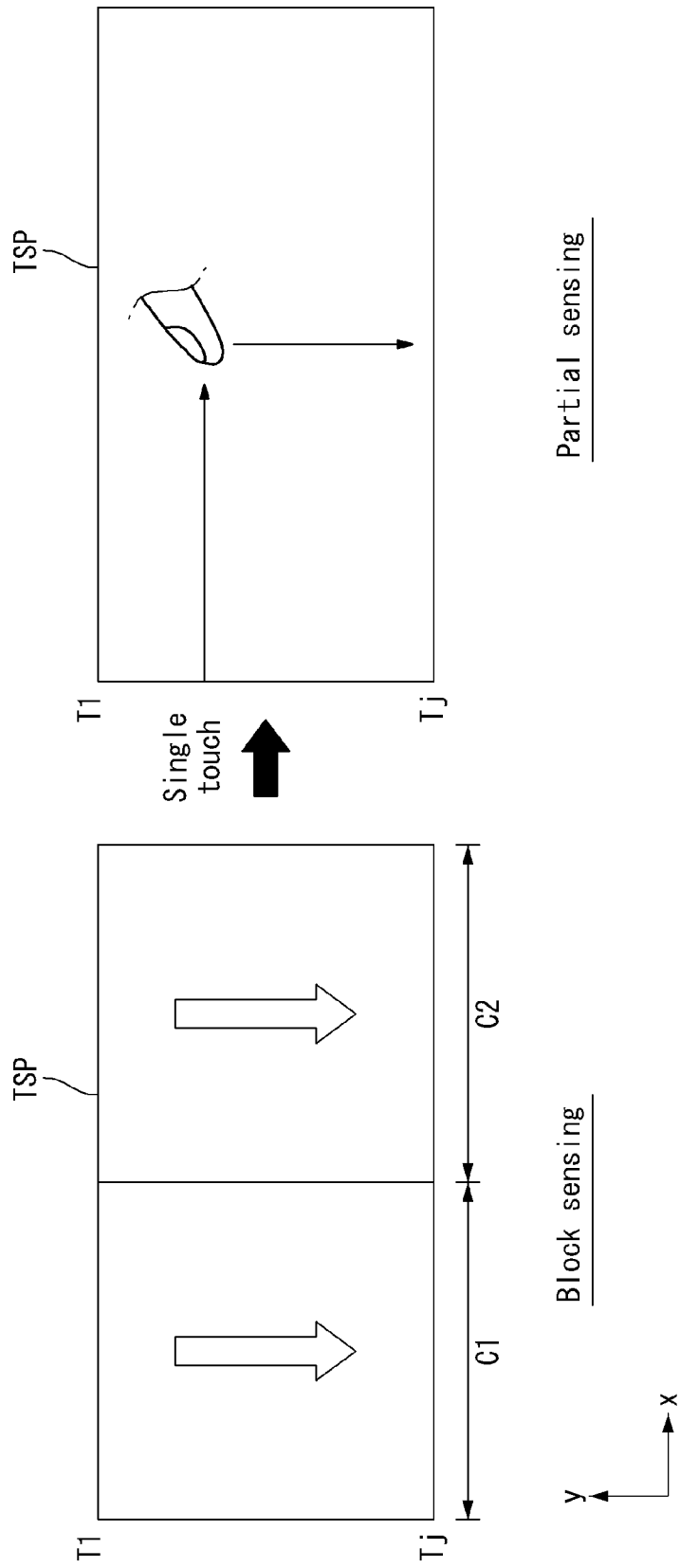
Figure 19:
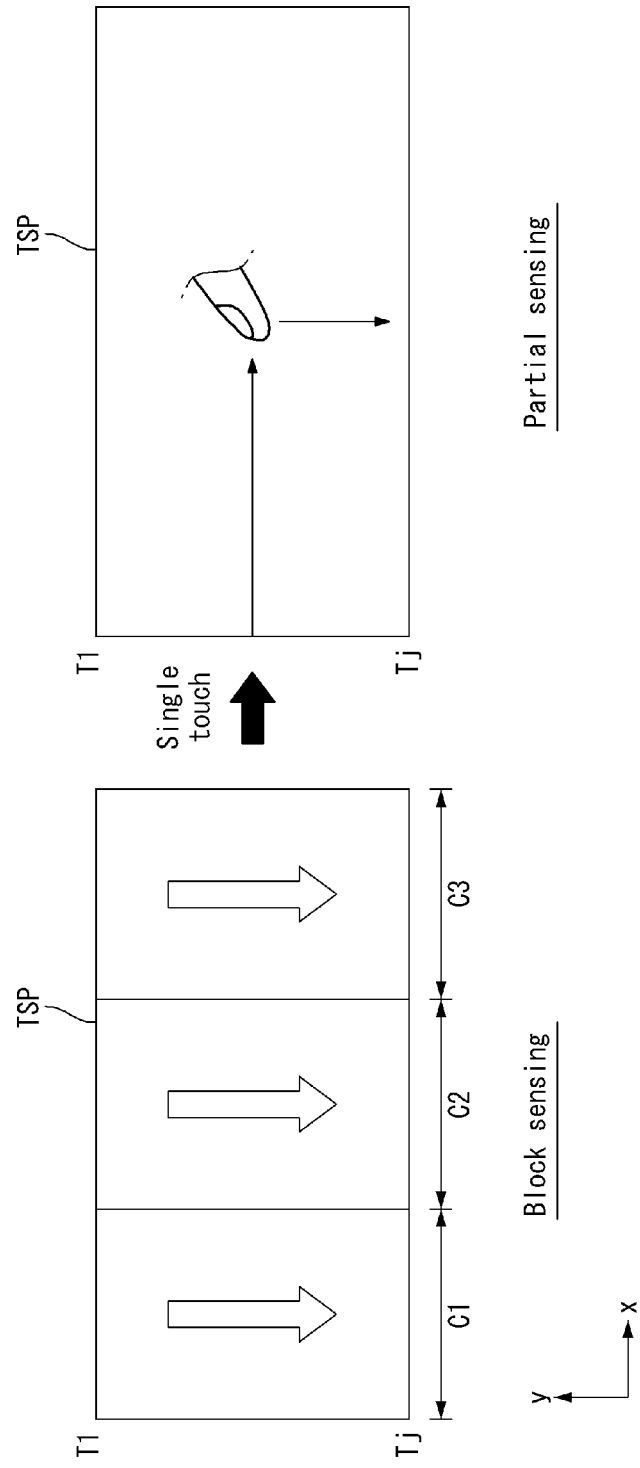
Figure 20:
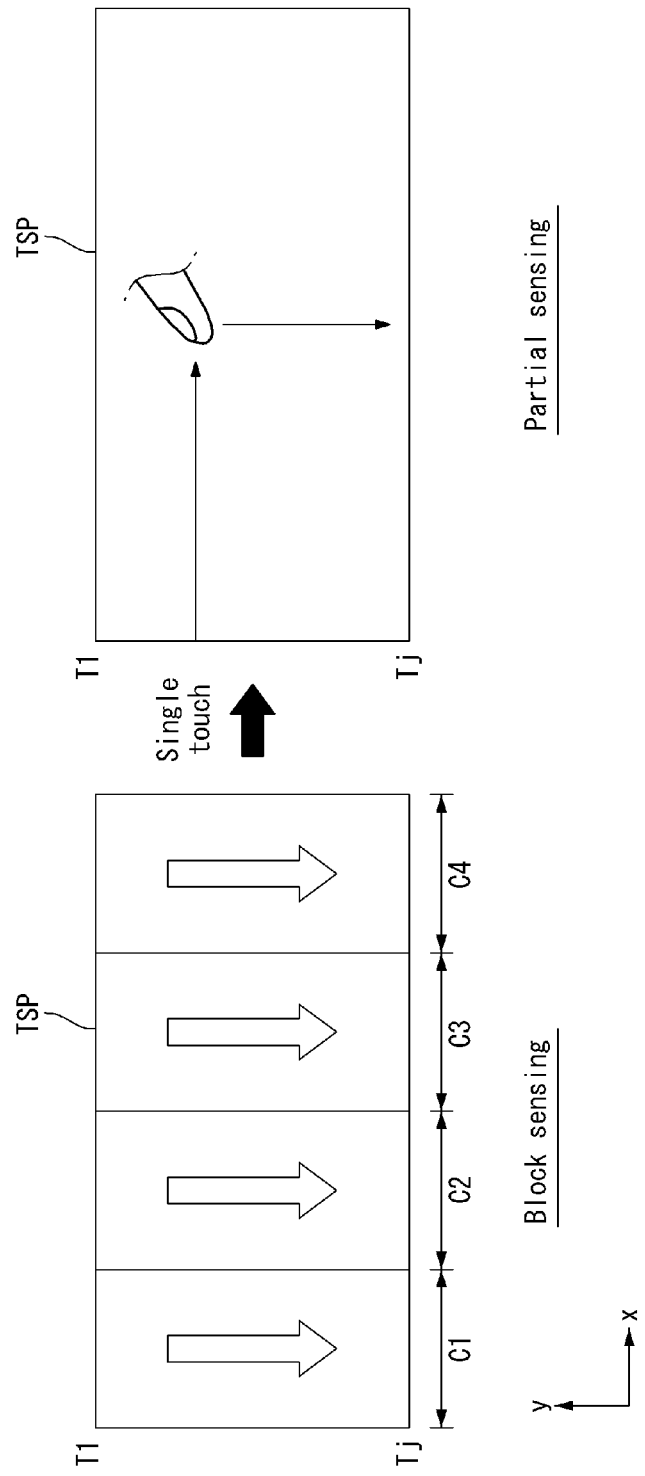

As shown in FIGS. 16 and 22, when the touch (or proximity) input is detected at a boundary between the neighboring Tx blocks or at a boundary between the neighboring Rx blocks, the partial sensing method precisely senses the neighboring Tx/Rx blocks close to the touch (or proximity) input position. FIG. 17 is a waveform diagram of the driving signal supplied to Tx lines in the case illustrated in FIG. 16.

As shown in FIGS. 16 and 17, when the touch (or proximity) input is detected at a boundary between the first and second Tx blocks B1 and B2 as the block sensing result, the partial sensing step is performed. The partial sensing step sequentially supplies the driving signal to the Tx lines present in the first Tx block B1 and then sequentially supplies the driving signal to the Tx lines present in the second Tx block B2, thereby precisely sensing the touch sensors belonging to the first and second Tx blocks B1 and B2. Accordingly, when the touch (or proximity) input is detected at the boundary between the blocks as the block sensing result, the second sensing time TP may lengthen. The partial sensing step does not sense the touch sensors of the third and fourth Tx blocks B3 and B4 in which no touch (or proximity) input is detected in the block sensing step.

FIGS. 18 to 22 illustrate a block sensing step and a partial sensing step when the touch screen TSP is driven in a state being divided into a plurality of Rx blocks C1 to C4 along the x-axis. Herein, the x-axis is parallel to a long-axis direction of the Tx lines as shown in FIGS. 1 and 2.

As shown in FIGS. 18 to 22, in the block sensing step, the touch screen driving circuit applies the driving signal to the Tx blocks on a per Tx-block basis as described above and may receive and sample voltages of the touch sensors belonging to each of the first to fourth Rx blocks C1 to C4 and may convert the sampled voltages into digital data. For example, in the block sensing step, the touch screen driving circuit may simultaneously supply a first driving signal to the Tx lines of the first Tx block B1 to simultaneously receive the voltages of the touch sensors through the Rx lines of the first Rx block C1, and then may simultaneously supply a second driving signal to the Tx lines of the first Tx block B1 to simultaneously receive the voltages of the touch sensors through the Rx lines of the second Rx block C2. Subsequently, in the block sensing step, the touch screen driving circuit may simultaneously supply a third driving signal to the Tx lines of the first Tx block B1 to simultaneously receive the voltages of the touch sensors through the Rx lines of the third Rx block C3, and then may simultaneously supply a fourth driving signal to the Tx lines of the first Tx block B1 to simultaneously receive the voltages of the touch sensors through the Rx lines of the fourth Rx block C4. In this way, all the touch sensors of the first Tx block B1 are sensed in the block sensing step, and then the touch sensors of the second Tx block B2 are sensed.

When the touch (or proximity) input is detected in the block sensing step, the touch screen driving circuit proceeds to the partial sensing step. In the partial sensing step, the touch screen driving circuit precisely senses all the touch sensors in a crossing area between a Tx block and an Rx block connected to the touch sensors, in which the touch (or proximity) input is detected as the block sensing result. More specifically, in the partial sensing step, the touch screen driving circuit sequentially applies the driving signal to the Tx lines of the Tx block, in which the touch (or proximity) input is detected as the block sensing result, and simultaneously or sequentially receives and samples the touch sensor voltages through the Rx lines of the Rx block, in which the touch (or proximity) input is detected as the block sensing result, to convert the sampled voltages into digital data. In the partial sensing step, the touch screen driving circuit does not apply the driving signal to the Tx blocks, in which no touch (or proximity) input is detected as the block sensing result, and does not receive the touch sensor voltages through the Rx blocks, in which no touch (or proximity) input is detected as the block sensing result. If no touch (or proximity) input is detected in all the blocks as the block sensing result, the partial sensing step is not performed, and the block sensing step is performed again.

Figure 21:
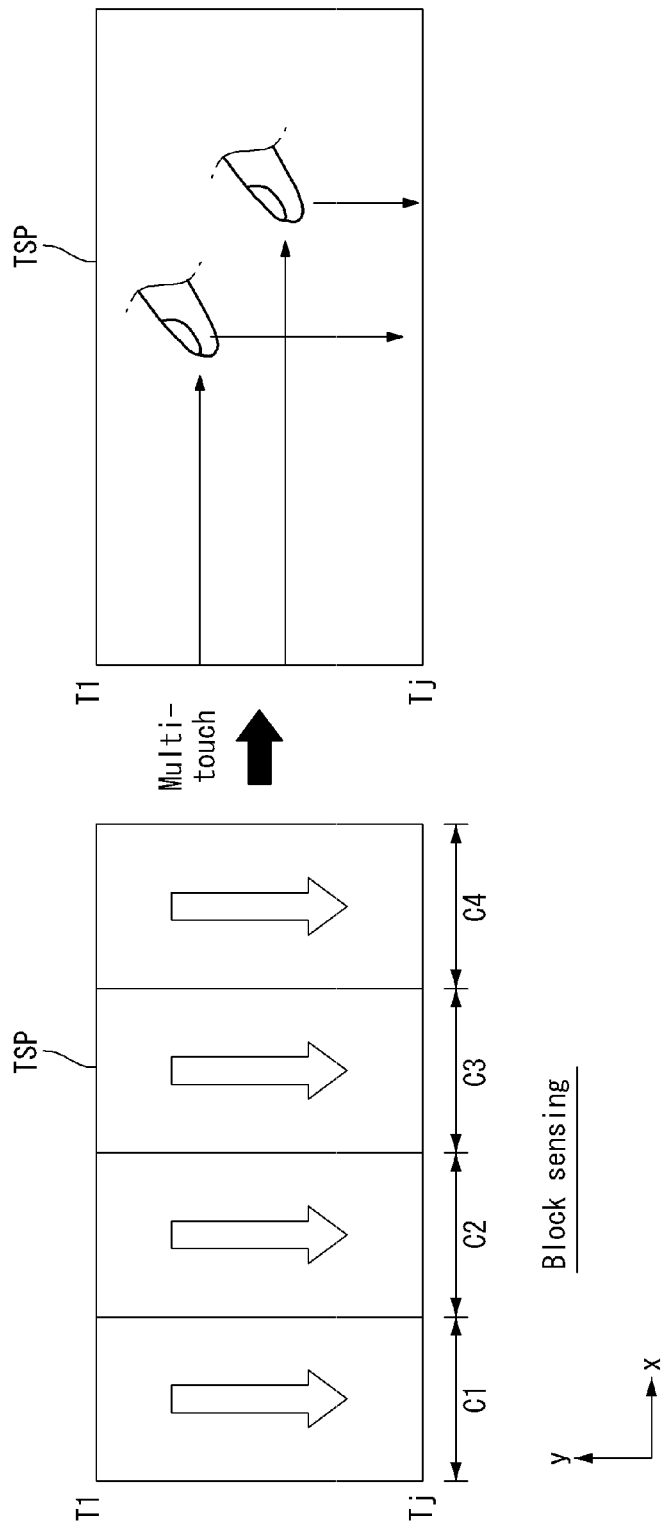

As shown in FIG. 21, when a multi-touch (or proximity) input is detected in the plurality of Rx blocks in the block sensing step, the touch screen driving circuit sequentially applies the driving signal to the Tx lines of each of the Tx blocks, in which the touch (or proximity) input is detected, in the partial sensing step. In the block sensing step, the touch screen driving circuit simultaneously or sequentially receives and samples the voltages of the touch sensors through the Rx lines of each of the Rx blocks, in which the touch (or proximity) input is detected, and converts the sampled voltages into digital data. In this instance, in the partial sensing step, the touch screen driving circuit does not apply the driving signal to the Tx blocks, in which no touch (or proximity) input is detected in the block sensing step, and does not receive the touch sensor voltages through the Rx blocks, in which no touch (or proximity) input is detected in the block sensing step. If no touch (or proximity) input is detected in all the blocks as the block sensing result, the partial sensing step is not performed, and the block sensing step is performed again.

As shown in FIG. 22, when the touch (or proximity) input is detected at a boundary between the neighboring Rx blocks in the block sensing step, the partial sensing step sequentially applies the driving signal to the Tx lines of the Tx block, in which the touch (or proximity) input is detected. The touch screen driving circuit simultaneously or sequentially receives and samples the touch sensor voltages through the Rx lines of the neighboring Rx blocks, which border the touch (or proximity) input position therebetween, and converts the sampled voltages into digital data. In this instance, in the partial sensing step, the touch screen driving circuit does not apply the driving signal to the Tx blocks, in which no touch (or proximity) input is detected in the block sensing step, and does not receive the touch sensor voltages through the Rx blocks, in which no touch (or proximity) input is detected in the block sensing step. If no touch (or proximity) input is detected in all the blocks as the block sensing result, the partial sensing step is not performed, and the block sensing step is performed again.

Figure 23:
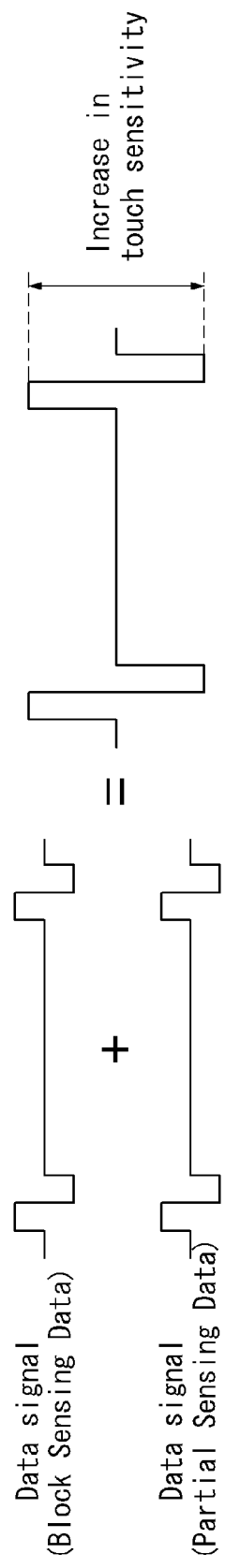
FIG. 23 illustrates an improvement effect of touch sensitivity in a method for driving a touch sensing device according to a second embodiment of the invention.

As shown in FIG. 23, the embodiment of the invention may increase a change amount of the voltage of the touch sensor before and after the touch operation based on a sum of block sensing data and partial sensing data. In this instance, because a voltage difference between a no-touch signal (applied when there is no touch input) and a touch input signal increases, the touch sensitivity may be further improved. The method illustrated in FIG. 23 may be implemented using a method for adding digital data, which is sequentially output through the analog-to-digital conversion as shown in FIG. 24.

Figure 24:
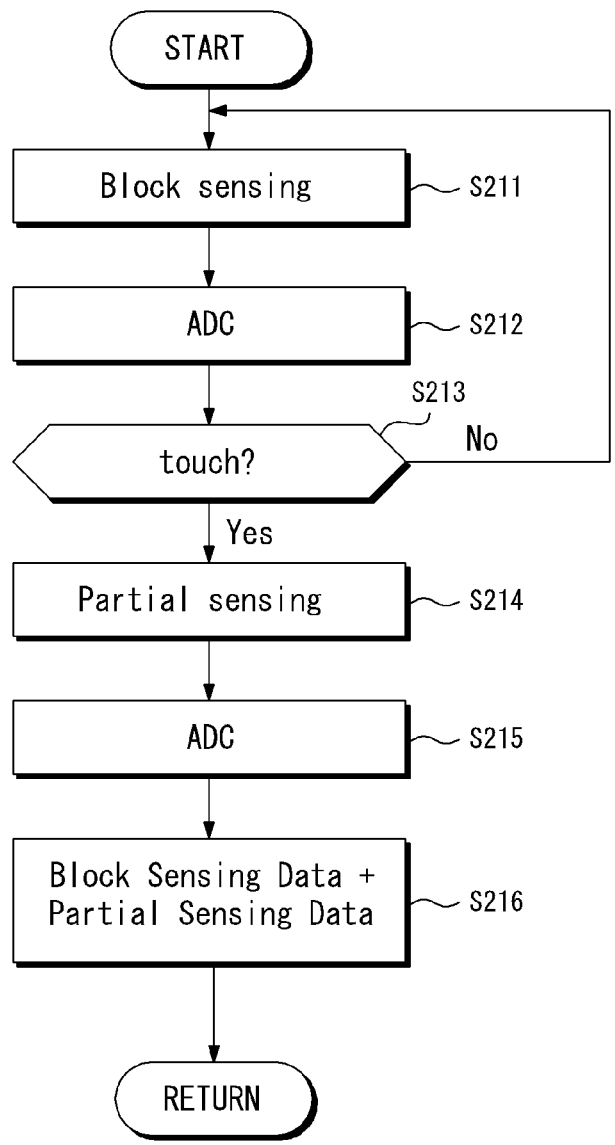
FIG. 24 is a flow chart illustrating the method for driving the touch sensing device according to the second embodiment of the invention.

FIG. 24 is a flow chart illustrating a method for driving the touch sensing device according to a second embodiment of the invention.

As shown in FIG. 24, the touch screen driving circuit senses voltages of the touch sensors on a per block basis in a block sensing step in step S211. The touch screen driving circuit converts the voltages of the touch sensors received in the block sensing step into digital data (i.e., touch raw data TData), and the touch raw data TData is temporarily stored in a memory 301 (refer to FIG. 25) in step S212. The data stored in the memory 301 as the block sensing result is referred to herein as block sensing data. When a change amount of digital data, before and after the touch operation, sensed based on the block sensing result is equal to or greater than a predetermined threshold value, digital data of the change amount is determined as touch (or proximity) input data, and a partial sensing step is performed in steps S213 and S214.

In the partial sensing step, the touch screen driving circuit sequentially supplies the driving signal to the Tx lines present in the Tx block, in which the touch (or proximity) input is detected, on a per line basis, thereby precisely sensing voltages of the touch sensors belonging to the touch input Tx block. Hence, a position of the touch (or proximity) input is detected in step S214. The voltages of the touch sensors received in the partial sensing step are converted into digital data (i.e., touch raw data TData) in step S215. The data obtained as the partial sensing result is referred to herein as partial sensing data. The touch screen driving circuit adds the block sensing data, which has been previously stored in the memory 301, to the partial sensing data and transmits the addition result to the touch recognition processor 30 in step S216. The touch recognition processor 30 compares the touch raw data, having a large change amount before and after the touch operation by adding the block sensing data to the partial sensing data, with the threshold value and detects the touch (or proximity) input.

Figure 25:
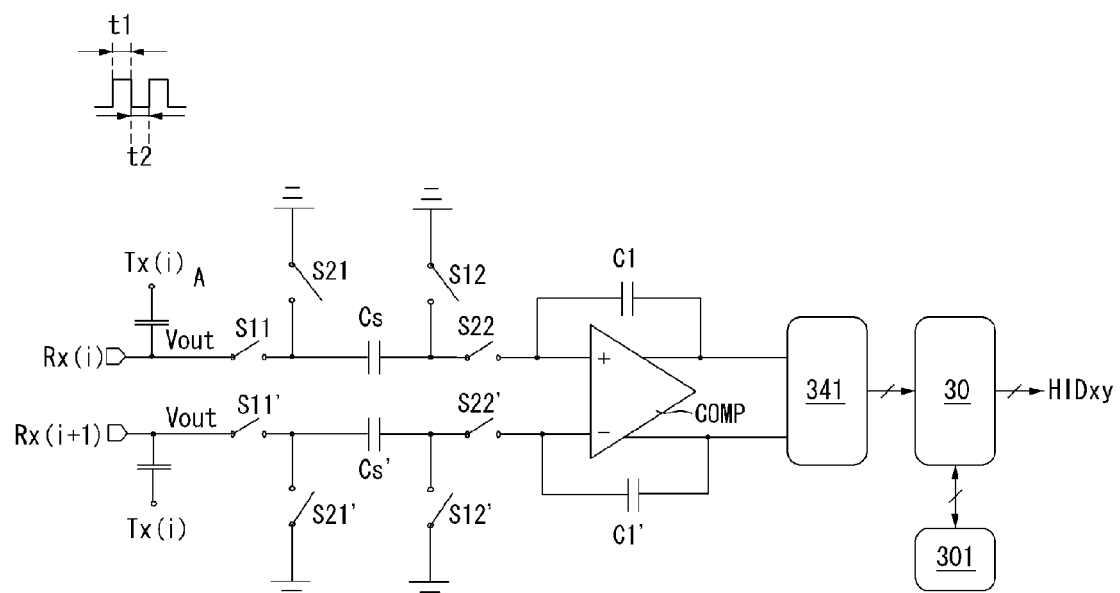
FIG. 25 is a circuit diagram illustrating a sampling circuit of an Rx driving circuit and an analog-to-digital converter for implementing the method for driving the touch sensing device according to the second embodiment of the invention.
Figure 26:
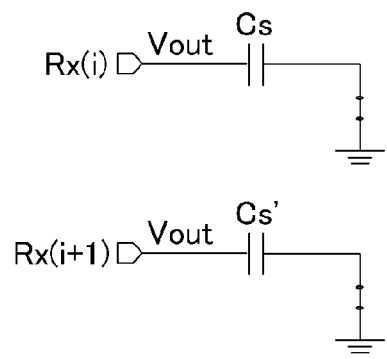
Figure 27:
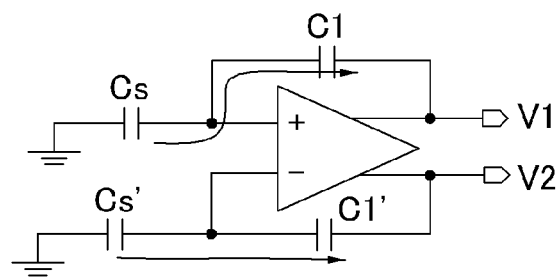

FIGS. 25 to 27 illustrate in detail a circuit configuration and an operation of the Rx driving circuit 34 for implementing the method for driving the touch sensing device according to the second embodiment of the invention. A pulse signal shown at the top of FIG. 25 is an example of a driving signal supplied to the Tx lines T1 to Tj. The driving signal is generated at a voltage of a high logic level for a time t1 and is generated at a voltage of a low logic level for a time t2.

As shown in FIGS. 25 to 27, Tx(i) indicates an ith Tx line Tx(i), Rx(i) indicates an ith Rx line Rx(i), and Rx(i+1) indicates an (i+1)th Rx line Rx(i+1), where 'i' is a natural number. The touch sensors are formed between the Tx line Tx(i) and the Rx lines Rx(i) and Rx(i+1).

A sampling circuit of the Rx driving circuit 34 receives and samples voltages of the touch sensors received through the neighboring Rx lines Rx(i) and Rx(i+1) and supplies a difference between the sampled voltages to an analog-to-digital converter 341. For this, the sampling circuit includes a first sampling circuit, a second sampling circuit, and a comparator COMP for comparing outputs of the first and second sampling circuits. The comparator COMP may be implemented as an operational amplifier (op-amp). The first and second sampling circuits accumulate voltages of the touch sensors received through the ith Rx line Rx(i) on a first sampling capacitor C1 each time the driving signal is applied to the ith Tx line Tx(i), and sample the voltages of the touch sensors. And at the same time, the first and second sampling circuits accumulate voltages of the touch sensors received through the (i+1)th Rx line Rx(i+1) on a second sampling capacitor C1' each time the driving signal is applied to the ith Tx line Tx(i), and sample the voltages of the touch sensors.

The first sampling circuit includes first to fourth switches S11, S12, S21, and S22, a first sensing capacitor Cs, and the first sampling capacitor C1. The first sampling circuit samples the voltages of the touch sensors received through the ith Rx line Rx(i).

The first switch S11 is connected to the ith Rx line Rx(i). The third switch S21 is connected between the first switch S11 and a ground level voltage source GND. The second switch S12 is connected between the fourth switch S22 and the ground level voltage source GND. The fourth switch S22 is connected between the second switch S12 and a non-inverting input terminal of the comparator COMP.

One terminal of the first sensing capacitor Cs is connected to a first node between the first switch S11 and the third switch S21. The other terminal of the first sensing capacitor Cs is connected to a second node between the second switch S12 and the fourth switch S22. One terminal of the first sampling capacitor C1 is connected to a node between the fourth switch S22 and the non-inverting input terminal of the comparator COMP. The other terminal of the first sampling capacitor C1 is connected to a first output terminal of the comparator COMP.

The first and second switches S11 and S12 are turned on for the time t1, in which the driving signal is generated. Hence, as shown in FIG. 26, a voltage of a first touch sensor connected to the ith Rx line Rx(i) is stored in the first sensing capacitor Cs. Subsequently, the third and fourth switches S21 and S22 are turned on for the time t2, in which the voltage of the ith Tx line Tx(i) is reduced to the low logic level. Hence, as shown in FIG. 27, the voltage of the first touch sensor stored in the first sensing capacitor Cs is sampled by the first sampling capacitor C1.

The second sampling circuit includes fifth to eighth switches S11', S12', S21', and S22', a second sensing capacitor Cs', and the second sampling capacitor C1'. The second sampling circuit samples the voltages of the touch sensors received through the (i+1)th Rx line Rx(i+1).

The fifth switch S11' is connected to the (i+1)th Rx line Rx(i+1). The seventh switch S21' is connected between the fifth switch S11' and the ground level voltage source GND. The sixth switch S12' is connected between the eighth switch S22' and the ground level voltage source GND. The eighth switch S22' is connected between the sixth switch S12' and an inverting input terminal of the comparator COMP.

One terminal of the second sensing capacitor Cs' is connected to a third node between the fifth switch S11' and the seventh switch S21'. The other terminal of the second sensing capacitor Cs' is connected to a fourth node between the sixth switch S12' and the eighth switch S22'. One terminal of the second sampling capacitor C1' is connected to a node between the eighth switch S22' and the inverting input terminal of the comparator COMP. The other terminal of the second sampling capacitor C1' is connected to a second output terminal of the comparator COMP.

The fifth and sixth switches S11' and S12' are turned on for the time t1, in which the driving signal is generated. Hence, as shown in FIG. 26, a voltage of a second touch sensor connected to the (i+1)th Rx line Rx(i+1) is stored in the second sensing capacitor Cs'. Subsequently, the seventh and eighth switches S21' and S22' are turned on for the time t2, in which the voltage of the ith Tx line Tx(i) is reduced to the low logic level. Hence, as shown in FIG. 27, the voltage of the second touch sensor stored in the second sensing capacitor Cs' is sampled by the second sampling capacitor C1'.

The comparator COMP supplies the voltage of the first touch sensor stored in the first sampling capacitor C1 and the voltage of the second touch sensor stored in the second sampling capacitor C1' to the analog-to-digital converter 341.

The analog-to-digital converter 341 converts a difference between the voltage of the first touch sensor and the voltage of the second touch sensor into digital data in each of the block sensing step and the partial sensing step and supplies it to the touch recognition processor 30.

The touch recognition processor 30 stores digital data received as the block sensing result in the memory 301. The touch recognition processor 30 reads digital data of the partial sensing result, input after the touch (or proximity) input is detected, from the memory 301 and then adds the digital data of the partial sensing result to the digital data of the block sensing result. The touch recognition processor 30 performs the touch recognition algorithm and analyzes touch raw data obtained by adding the digital data of the partial sensing result to the digital data of the block sensing result, thereby calculating a coordinate value of a final touch (or proximity) input position.

As shown in FIGS. 28 to 31, the block sensing step may be replaced by a fully sensing step. In this instance, the fully sensing step has a small effect on a reduction in the total sensing time, but can improve the sensing sensitivity.

Figure 28:
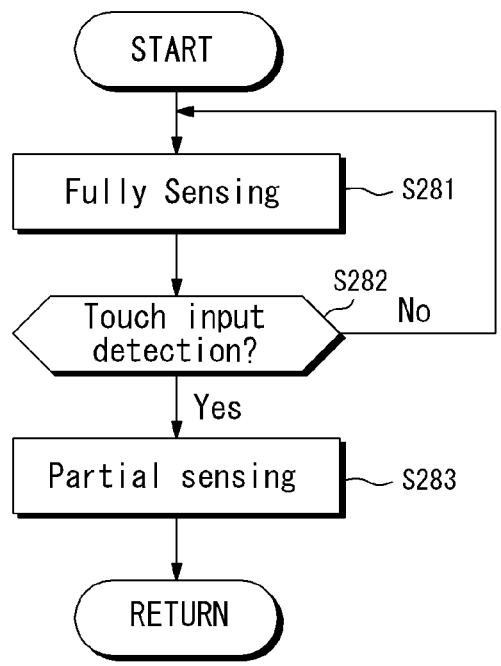
FIG. 28 is a flow chart illustrating a method for driving a touch sensing device according to a third embodiment of the invention.
Figure 29:
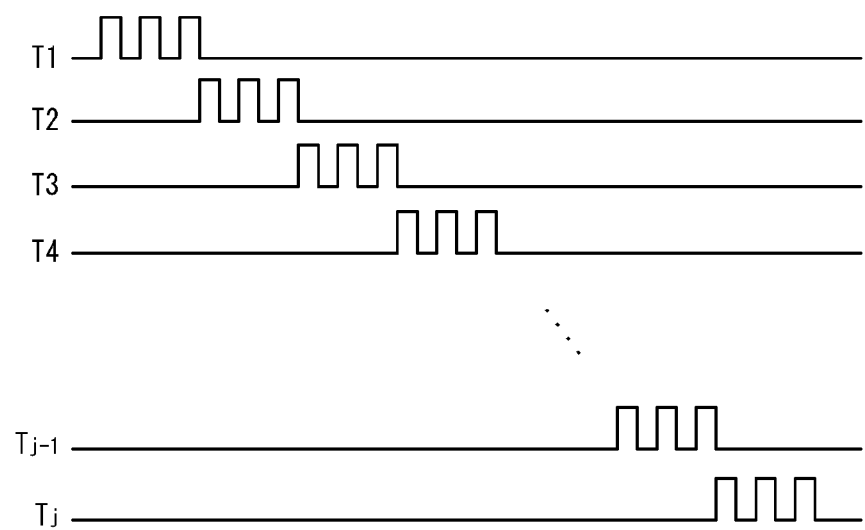
FIG. 29 is a waveform diagram illustrating a fully sensing method.

FIG. 28 is a flow chart illustrating a method for driving the touch sensing device according to a third embodiment of the invention. FIG. 29 is a waveform diagram illustrating a fully sensing method.

As shown in FIGS. 28 and 29, the touch screen driving circuit performs a first scanning process on the touch sensors of the touch screen TSP using a fully sensing method to sense the touch sensors in step S281. As shown in FIG. 29, the fully sensing method sequentially supplies the driving signal to the first to jth Tx lines T1 to Tj in the order named to sense the touch sensors. In the third embodiment of the invention, the touch sensors may be sensed using the method illustrated in FIGS. 18 to 22 (i.e., in the units of Rx blocks), so as to reduce a sensing time required in the fully sensing step.

When the touch (or proximity) input is detected as the fully sensing result, the touch screen driving circuit proceeds to a second scanning process, i.e., the partial sensing step. Namely, in the partial sensing step, the touch screen driving circuit sequentially supplies the driving signal to the Tx lines, in which the touch (or proximity) input is detected in the fully sensing step, on a per line basis, thereby precisely sensing voltages of the touch sensors present in the touch input Tx lines in step S282 and S283.

Only when the touch (or proximity) input is detected in the fully sensing step, the partial sensing step is performed subsequent to the fully sensing step. On the other hand, if no touch (or proximity) input is detected in the fully sensing step, the fully sensing step is again performed or the block sensing step is performed.

Figure 30:
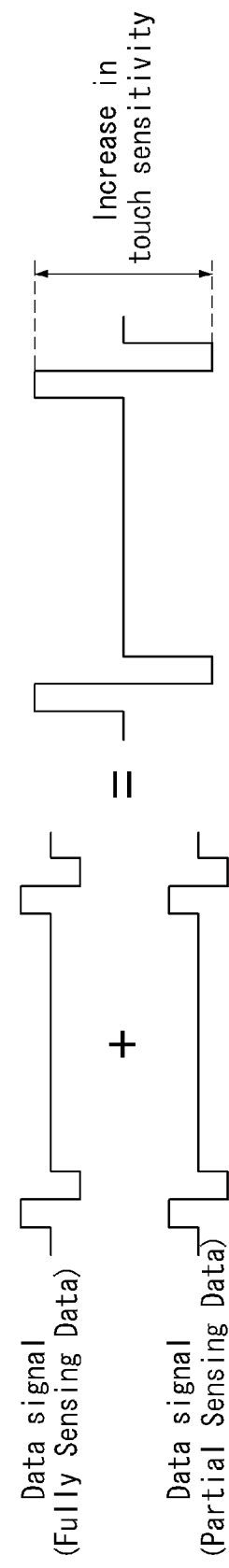
FIG. 30 illustrates an improvement effect of touch sensitivity in the method for driving the touch sensing device according to the third embodiment of the invention.

As shown in FIG. 30, the third embodiment of the invention may increase a change amount of the voltage of the touch sensor before and after the touch operation based on a sum of fully sensing data and partial sensing data. In this instance, because a voltage difference between a no-touch signal (applied when there is no touch input) and a touch input signal increases, the touch sensitivity may be further improved. The method illustrated in FIG. 30 may be implemented using a method for adding digital data, which is sequentially output through the analog-to-digital conversion as shown in FIG. 31.

Figure 31:
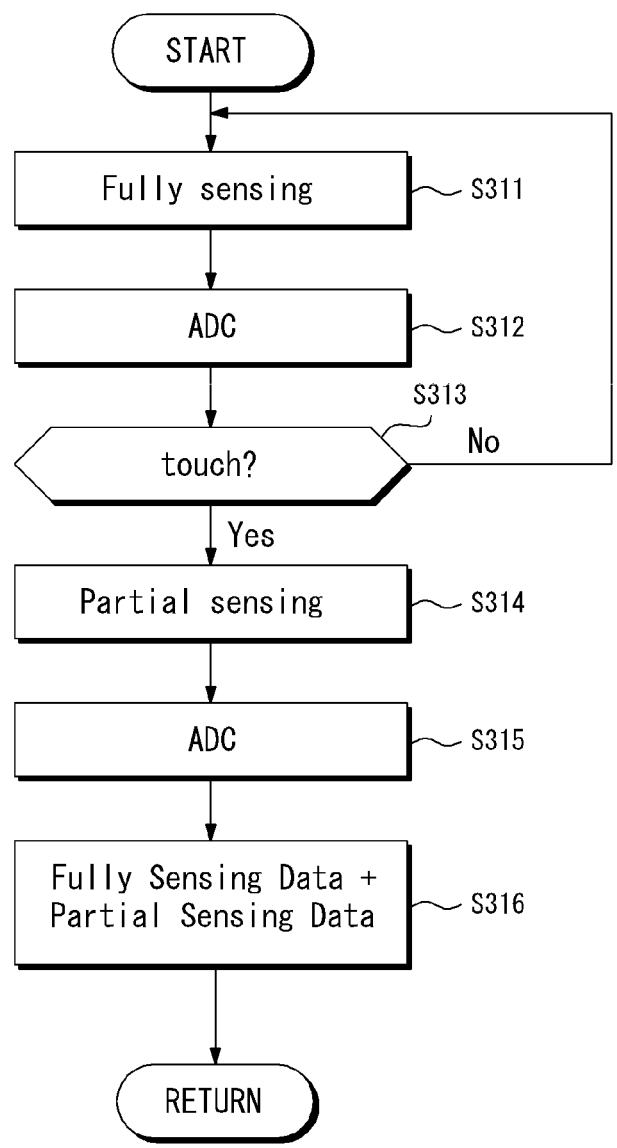
FIG. 31 is a flow chart illustrating in more detail the method for driving the touch sensing device according to the third embodiment of the invention.

As shown in FIGS. 30 and 31, the touch screen driving circuit sequentially supplies the driving signal to the Tx lines T1 to Tj on a per line basis in the fully sensing step to sense voltages of the touch sensors in step S311. The touch screen driving circuit converts the voltages of the touch sensors received in the fully sensing step into digital data (i.e., touch raw data TData), and the touch raw data TData is temporarily stored in the memory 301 (refer to FIG. 25) in step 3212. The data stored in the memory 301 as the fully sensing result is referred to herein as fully sensing data. When a change amount of digital data, before and after the touch operation, sensed based on the fully sensing result is equal to or greater than a predetermined threshold value, digital data of the change amount is determined as touch (or proximity) input data, and a partial sensing step is performed in steps S313 and S314.

In the partial sensing step, the touch screen driving circuit sequentially supplies the driving signal to the Tx lines, in which the touch (or proximity) input is detected, on a per line basis, thereby precisely sensing voltages of the touch sensors present in the touch input Tx lines. Hence, a position of the touch (or proximity) input is detected in step S314. The voltages of the touch sensors received in the partial sensing step are converted into digital data (i.e., touch raw data TData) in step S315. The data obtained as the partial sensing result is referred to herein as partial sensing data. The touch screen driving circuit adds the fully sensing data, which has been previously stored in the memory 301, to the partial sensing data and transmits the addition result to the touch recognition processor 30 in step S316. The touch recognition processor 30 compares the touch raw data, having a large change amount before and after the touch operation by adding the fully sensing data to the partial sensing data, with the threshold value and detects the touch (or proximity) input.

In the embodiments of the invention, the block sensing step detects the touch (or proximity) input and may be repeatedly performed two or more times so as to reduce power consumption. This will be described below with reference to FIGS. 32 to 44.

Figure 32:
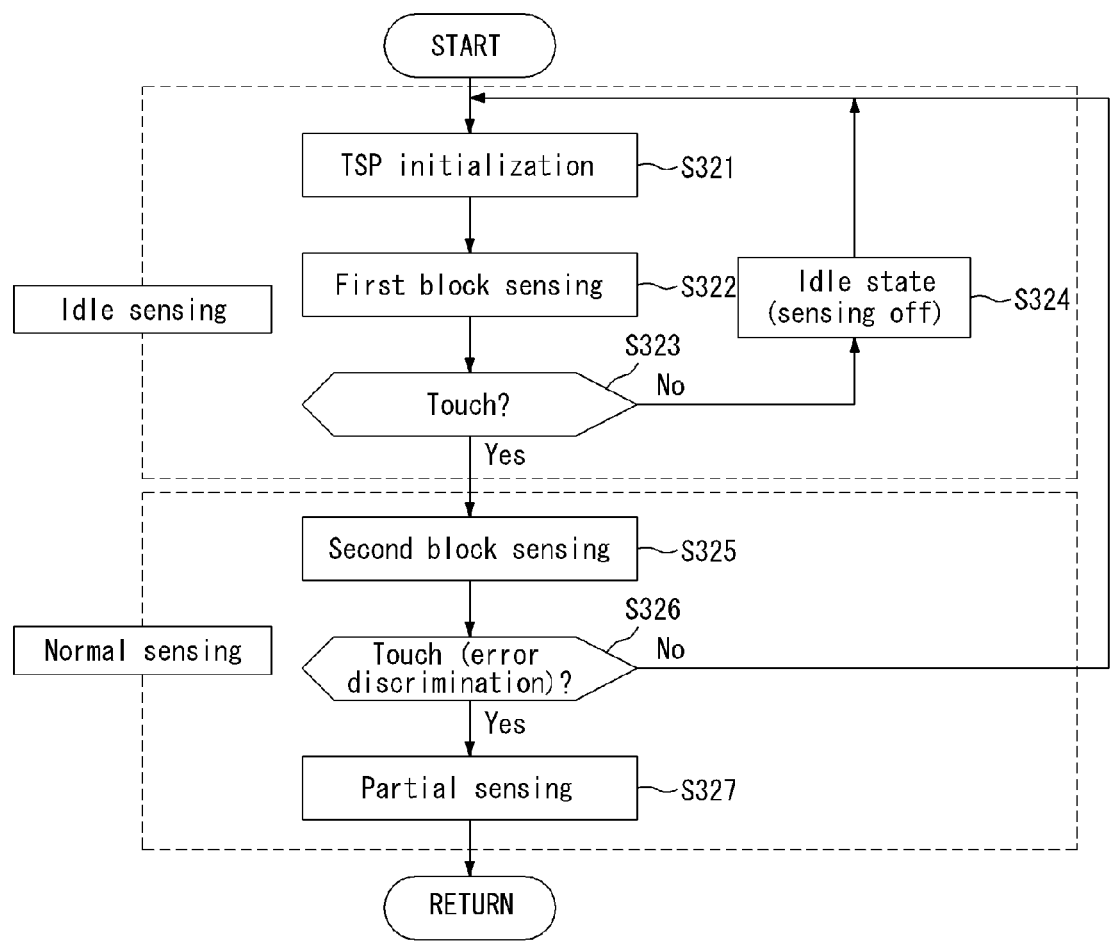
FIG. 32 is a flow chart illustrating a method for driving a touch sensing device according to a fourth embodiment of the invention.
Figure 33:
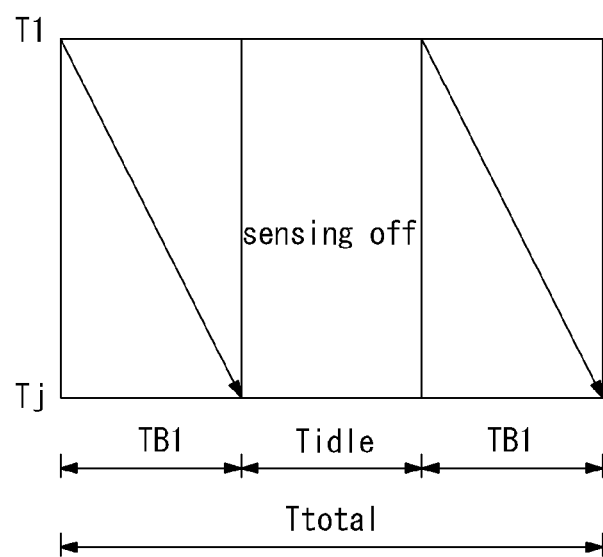
FIGS. 33 and 34 illustrate a block sensing period and a partial sensing period in the method for driving the touch sensing device according to the fourth embodiment of the invention.
Figure 34:
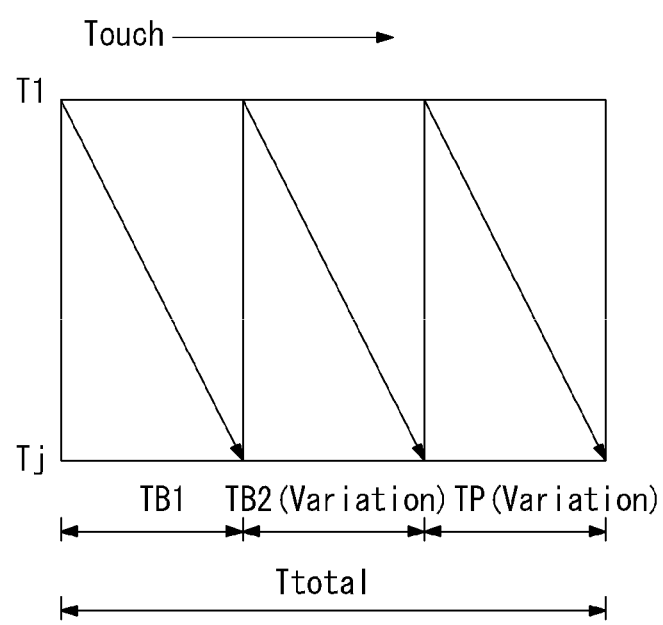

FIG. 32 is a flow chart illustrating a method for driving the touch sensing device according to a fourth embodiment of the invention. FIGS. 33 and 34 illustrate a block sensing period and a partial sensing period in the method for driving the touch sensing device according to the fourth embodiment of the invention.

In the fourth embodiment of the invention, the touch screen TSP may be virtually divided into a plurality of blocks. The blocks may be divided into a plurality of first blocks, each of which is set to a first block sensing area, and each of the first blocks may be divided into a plurality of second blocks, each of which is set to a second block sensing area. Each of the second blocks may be divided into a plurality of third blocks, each of which is set to a third block sensing area. Thus, the size of the second block is less than the size of the first block, and the size of the third block is less than the size of the second block. A minimum size of the block is set to the size including at least two Tx lines and at least two Rx lines.

As shown in FIGS. 32 to 34, the method for driving the touch sensing device according to the fourth embodiment of the invention initialize the touch screen driving circuit and the touch sensors of the touch screen TSP in step S321. Subsequently, the method senses the touch sensors of the first blocks on a per block basis during a first block sensing period TB1 in step S322.

During the first block sensing period TB1, the method simultaneously supplies the driving signal to the Tx lines present in one first block to simultaneously sense voltages of all the touch sensors present in the one first block and then simultaneously senses voltages of all the touch sensors of another first block in the same manner. Because the driving signal is simultaneously applied to all the Tx lines present in one first block during the first block sensing period TB1, the first block sensing period TB1 of one first block merely correspond to a sensing time of one line in the related art.

The method may analyze touch raw data obtained in a first block sensing step and when a change amount of the touch sensor voltage before and after the touch operation is equal to or greater than a predetermined threshold value, may determine touch raw data of change amount as data of the touch (or proximity) input position, thereby detecting the presence or absence of the touch (or proximity) input in step S323. When it is determined that no touch (or proximity) input of the touch screen TSP is detected as a first block sensing result, the method disables the touch screen driving circuit for a predetermined idle time Tidle (refer to FIG. 33) in step S324. Because the touch screen driving circuit is disabled for the idle time Tidle, the touch screen driving circuit does not generate any output and does not sense the touch sensors. Thus, power consumption of the touch screen driving circuit and the touch screen TSP is controlled at a minimum level for the idle time Tidle. The idle time Tidle may be properly selected in consideration of the sensitivity of the touch screen TSP and the power consumption. For example, the idle time Tidle may be determined between about 0.1 mse to 50 msec in consideration of the sensitivity of the touch screen TSP and the power consumption.

If it is determined that no touch (or proximity) input of the touch screen TSP is detected as the first block sensing result, the host system may control a power source of the touch screen driving circuit or an enable/disable signal, thereby stopping an operation of the touch screen driving circuit. The host system analyzes an output of the touch recognition processor 30. Hence, if it is determined that no touch (or proximity) input of the touch screen TSP is detected as the first block sensing result, the host system controls a power input switch (not shown) of an IC, in which the touch screen driving circuit is embedded, thereby blocking a driving power source Vcc of the ROIC for the idle time Tidle. When the driving power source Vcc is not supplied to the touch screen driving circuit, the touch screen driving circuit stops working and does not generate the output. The host system counts the idle time Tidle using a counter and again supplies the driving power source Vcc to the touch screen driving circuit after the idle time Tidle passed.

The host system analyzes the output of the touch recognition processor 30. Hence, if it is determined that no touch (or proximity) input of the touch screen TSP is detected as the first block sensing result, the host system inverts an enable/disable signal EN of the ROIC, in which the touch screen driving circuit is embedded, to a logic value of a disable state for the idle time Tidle, thereby stopping an operation of the touch screen driving circuit. The host system counts the idle time Tidle using the counter and again inverts a logic value of the enable/disable signal EN to a logic value of an enable state after the idle time Tidle passed, thereby again enabling the touch screen driving circuit.

The steps S321 to S324 correspond to an idle sensing mode, in which when no touch (or proximity) input of the touch screen TSP is detected as the first block sensing result, the first block sensing step is again performed after the predetermined idle time Tidle passed.

When it is determined that the touch (or proximity) input is detected as the first block sensing result in the step S323, the method for driving the touch sensing device proceeds to a second block sensing step and thus senses the touch sensors of the second blocks divided from the first block, in which the touch (or proximity) input is detected, on a per block basis in the step S325. The method simultaneously supplies the driving signal to the Tx lines present in one second block in the second block sensing step and simultaneously senses the touch sensors present in the one second block. Thus, time required to sense one second block merely correspond to a sensing time of one line in the related art.

The method for driving the touch sensing device may analyze touch raw data obtained in the second block sensing step, and when a change amount of the touch sensor voltage before and after the touch operation is equal to or greater than a predetermined threshold value, determines touch raw data of the change amount as touch (or proximity) input data, thereby detecting the presence or absence of the touch (or proximity) input.

When it is determined that the touch (or proximity) input is detected as a second block sensing result, the method for driving the touch sensing device confirms the presence of the touch (or proximity) input determined in the first block sensing step. The method proceeds to a partial sensing step in steps S326 and S327, so as to precisely sense touch (or proximity) input data. On the contrary, when it is determined that no touch (or proximity) input is detected as the second block sensing result, the method determines the touch (or proximity) input determined in the first block sensing step as a touch error resulting from a noise. Hence, the method does not proceed to the partial sensing step and proceeds to the step S321 to repeatedly perform the first block sensing step. The second block sensing step examines the first block sensing result and also more precisely senses a position of the touch (or proximity) input obtained as the first block sensing result.

The method for driving the touch sensing device sequentially supplies the driving signal to the Tx lines present in the second block, in which the touch (or proximity) input is detected, on a per line basis during a partial sensing period TP, thereby precisely sensing the position of the touch (or proximity) input in step S327. The method compares touch raw data produced as the partial sensing result with a predetermined threshold value, and when a change amount of the touch sensor voltage before and after the touch operation is equal to or greater than the threshold value, determines touch raw data of the change amount as touch (or proximity) input data. Subsequently, the method performs the touch recognition algorithm and estimates coordinates of the touch (or proximity) input data obtained as the partial sensing result. The method outputs coordinate data HIDxy including coordinate information of the touch (or proximity) input position.

The steps S325 to S327 correspond to a normal sensing mode, in which the coordinates of the touch (or proximity) input position are estimated. In the normal sensing mode, the touch screen driving circuit is enabled to generate the driving signal and repeatedly performs the sensing operation. Thus, the touch screen driving circuit generates the power consumption of a normal driving level in the normal sensing mode.

As shown in FIG. 34, a second block sensing period TB2 depends on the number of touch (or proximity) inputs detected in the touch screen TSP. As the number of touch (or proximity) inputs increases as the first block sensing result, the number of first blocks, on which the second block sensing step is performed, increases. Hence, the second block sensing period TB2 lengthens. Further, a partial sensing period TP depends on the number of touch (or proximity) inputs detected in the touch screen TSP. As the number of touch (or proximity) inputs increases as the second block sensing result, the number of second blocks, on which the partial sensing step is performed, increases. Hence, the partial sensing period TP lengthens.

When the touch (or proximity) input is detected as the second block sensing result, the method for driving the touch sensing device does not immediately proceed to the partial sensing step and additionally performs the block sensing step one or more times while reducing the size of the first block sensing area to one half. Then, when the touch (or proximity) input is again detected, the method may proceed to the partial sensing step. For example, as shown in FIGS. 41 to 44, the method performs a third block sensing step on each of the third blocks reduced to one half of the size of the second block, in which the touch (or proximity) input is detected as the second block sensing result, between the step S326 and the step S327. In this instance, when the touch (or proximity) input is detected as a third block sensing result, the method may proceed to a fourth block sensing step or the partial sensing step.

Figure 35:
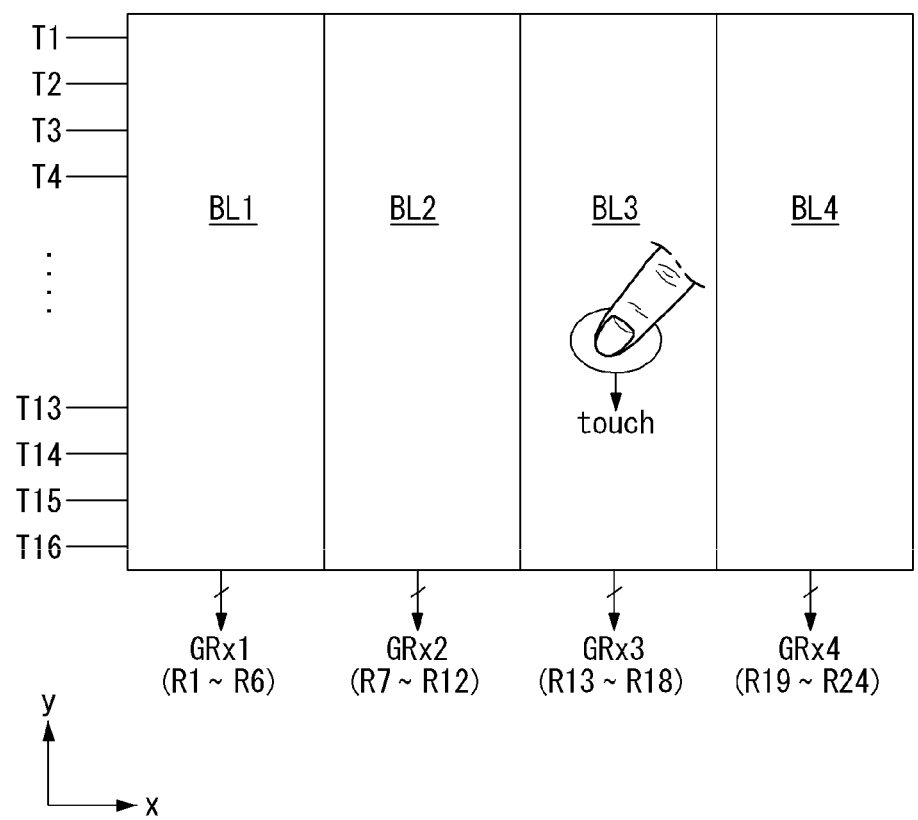
FIG. 35 illustrates an example of a method for dividing a touch screen.
Figure 36:
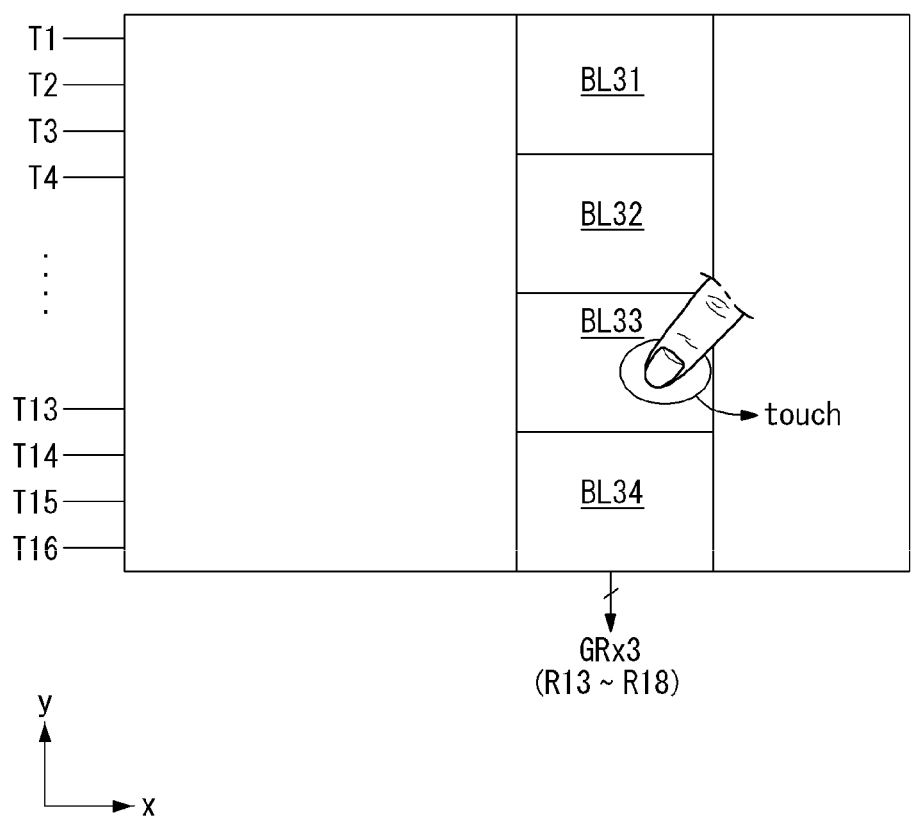
FIG. 36 illustrates an example of sub-blocks divided from a block, in which a touch input is detected among a plurality of blocks shown in FIG. 35.
Figure 37:
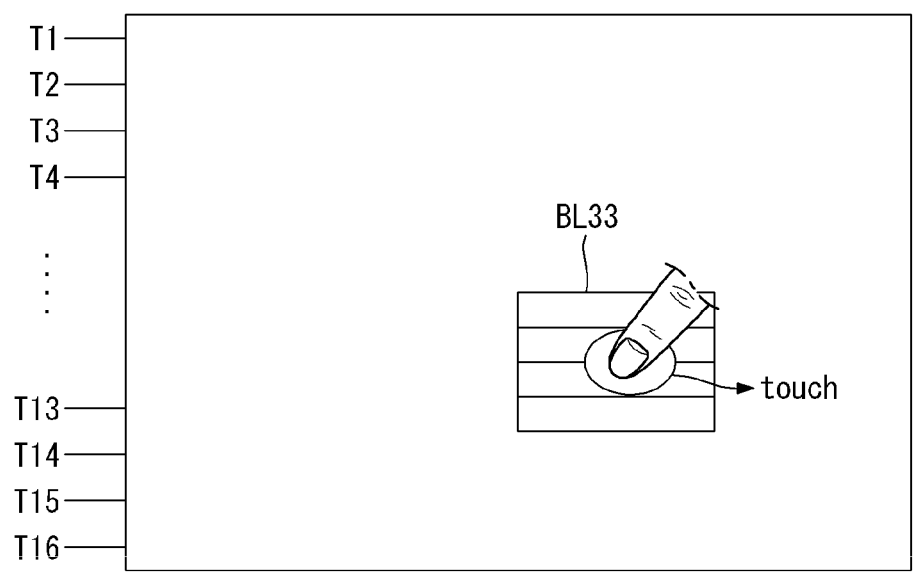
FIG. 37 illustrates a partial sensing method performed inside a sub-block, in which a touch input is detected among sub-blocks shown in FIG. 36.
Figure 38:
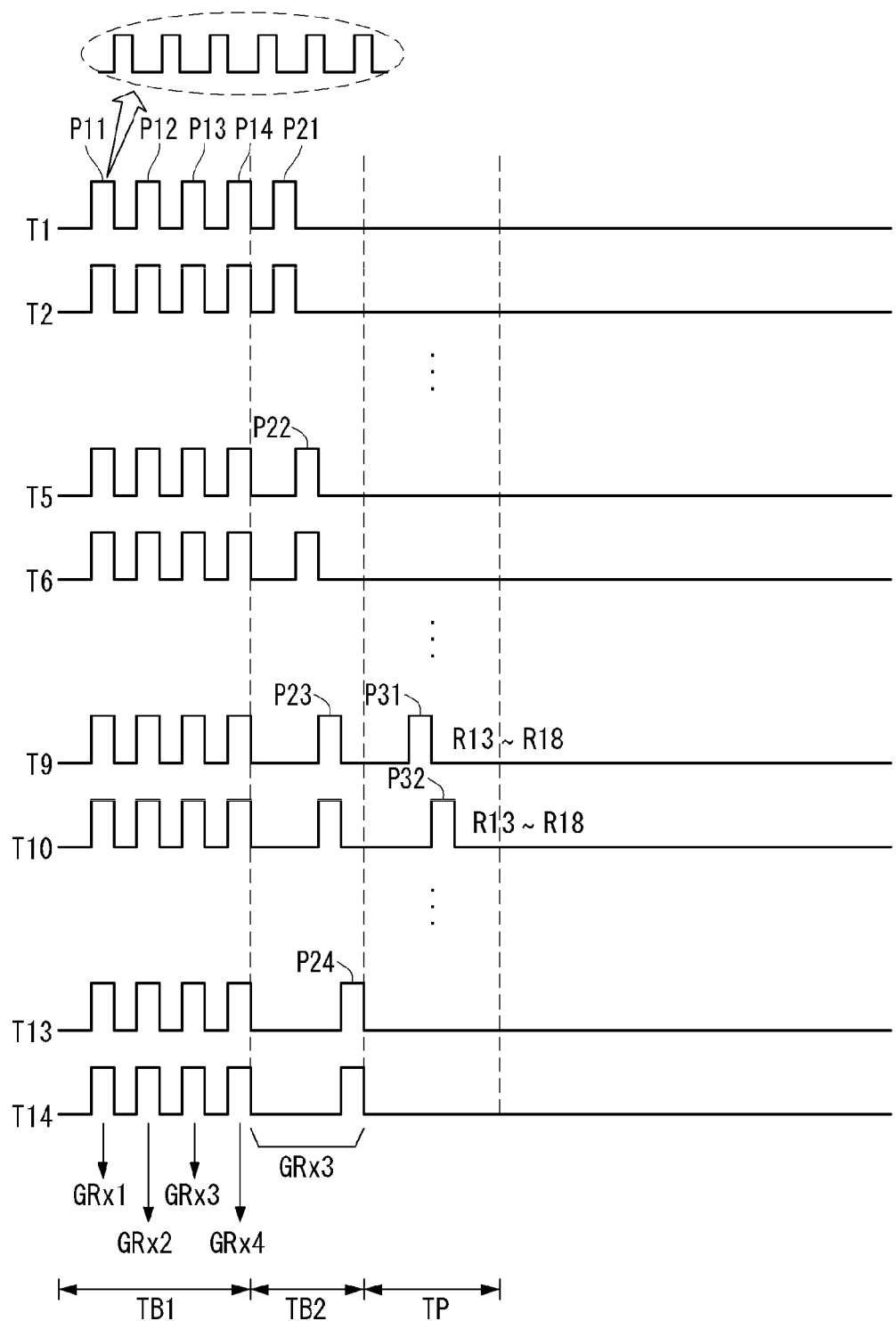
FIG. 38 is a waveform diagram illustrating a block sensing method and a partial sensing method in the case illustrated in FIGS. 35 to 37.

FIG. 35 illustrates an example of a method for dividing the touch screen. FIG. 36 illustrates an example of sub-blocks divided from a block, in which a touch input is detected among the plurality of blocks shown in FIG. 35. FIG. 37 illustrates a partial sensing method performed inside a sub-block, in which a touch input is detected among the sub-blocks shown in FIG. 36. FIG. 38 is a waveform diagram illustrating a block sensing method and a partial sensing method in the case illustrated in FIGS. 35 to 37. In FIGS. 35 to 38, it is assumed that the 16 Tx lines and the 24 Rx lines are arranged on the touch screen TSP. FIGS. 35 to 38 show an example of the touch screen TSP for the sake of brevity and ease of reading. Other block sizes, other numbers of Tx lines, other numbers of Rx lines, etc. may be used for the touch screen TSP.

As shown in FIGS. 35 to 38, the touch screen TSP may be virtually divided into first to fourth blocks BL1 to BL4.

As shown in FIGS. 35 and 38, in a first block sensing step, the Tx driving circuit 32 simultaneously supplies a first driving signal P11 to the Tx lines T1 to T16 and then simultaneously supplies a second driving signal P12 to the Tx lines T1 to T16. Subsequently, the Tx driving circuit 32 simultaneously supplies a third driving signal P13 to the Tx lines T1 to T16 and then simultaneously supplies a fourth driving signal P14 to the Tx lines T1 to T16. Each of the driving signals P11 to P14 may include a plurality of pulses.

As shown in FIGS. 35 and 38, in the first block sensing step, the Rx driving circuit 34 receives voltages of the touch sensors in synchronization with the first driving signal P11 through the Rx lines R1 to R6 of a first Rx block GRx1(R1-R6), samples the voltages of the touch sensors, and converts the sampled voltages into digital data. Then, the Rx driving circuit 34 receives voltages of the touch sensors in synchronization with the second driving signal P12 through the Rx lines R7 to R12 of a second Rx block GRx2(R7-R12), samples the voltages of the touch sensors, and converts the sampled voltages into digital data. Subsequently, the Rx driving circuit 34 receives voltages of the touch sensors in synchronization with the third driving signal P13 through the Rx lines R13 to R18 of a third Rx block GRx3(R13-R18), samples the voltages of the touch sensors, and converts the sampled voltages into digital data. Then, the Rx driving circuit 34 receives voltages of the touch sensors in synchronization with the fourth driving signal P14 through the Rx lines R19 to R24 of a fourth Rx block GRx4(R19-R24), samples the voltages of the touch sensors, and converts the sampled voltages into digital data.

The first Rx block GRx1(R1-R6) includes the Rx lines R1 to R6 connected to the touch sensors of the first block BL1. The second Rx block GRx2(R7-R12) includes the Rx lines R7 to R12 connected to the touch sensors of the second block BL2. The third Rx block GRx3(R13-R18) includes the Rx lines R13 to R18 connected to the touch sensors of the third block BL3. The fourth Rx block GRx4(R19-R24) includes the Rx lines R19 to R248 connected to the touch sensors of the fourth block BL4.

The touch recognition processor 30 compares touch raw data received from the Rx driving circuit 34 as a first block sensing result with a predetermined threshold value and determines the presence or absence of a touch (or proximity) input. When the touch (or proximity) input is detected in the third block BL3 as the first block sensing result as shown in FIG. 35, the third block BL3 is virtually subdivided into first to fourth sub-blocks BL31 to BL34 as shown in FIG. 36. When no touch (or proximity) input is detected as the first block sensing result, the touch screen driving circuit is held in an idle sensing mode for a predetermined idle time Tidle.

When the touch (or proximity) input is detected as the first block sensing result, the Tx driving circuit 32 proceeds to a second block sensing step. As shown in FIGS. 36 and 38, the Tx driving circuit 32 simultaneously supplies a first driving signal P21 to the Tx lines T1 to T4 connected to the touch sensors of the first sub-block BL31, and then simultaneously supplies a second driving signal P22 to the Tx lines T5 to T8 connected to the touch sensors of the second sub-block BL32. Subsequently, the Tx driving circuit 32 simultaneously supplies a third driving signal P23 to the Tx lines T9 to T12 connected to the touch sensors of the third sub-block BL33, and then simultaneously supplies a fourth driving signal P24 to the Tx lines T13 to T16 connected to the touch sensors of the fourth sub-block BL34. Each of the driving signals P21 to P24 may include a plurality of pulses in the same manner as the driving signals P11 to P14.

As shown in FIGS. 36 and 38, in the second block sensing step, the Rx driving circuit 34 receives voltages of the touch sensors of the third sub-block BL33, in which the touch (or proximity) input is detected as the first block sensing result, in synchronization with the driving signals P21 to P24. More specifically, the Rx driving circuit 34 receives voltages of the touch sensors in synchronization with the first driving signal P21 through the Rx lines R13 to R18 of the third Rx block GRx3(R13-R18), samples the voltages of the touch sensors, and converts the sampled voltages into digital data. Then, the Rx driving circuit 34 receives voltages of the touch sensors in synchronization with the second driving signal P22 through the Rx lines R13 to R18 of the third Rx block GRx3(R13-R18), samples the voltages of the touch sensors, and converts the sampled voltages into digital data. Subsequently, the Rx driving circuit 34 receives voltages of the touch sensors in synchronization with the third driving signal P23 through the Rx lines R13 to R18 of the third Rx block GRx3(R13-R18), samples the voltages of the touch sensors, and converts the sampled voltages into digital data. Then, the Rx driving circuit 34 receives voltages of the touch sensors in synchronization with the fourth driving signal P24 through the Rx lines R13 to R18 of the third Rx block GRx3(R13-R18), samples the voltages of the touch sensors, and converts the sampled voltages into digital data.

The touch recognition processor 30 compares touch raw data received from the Rx driving circuit 34 as a second block sensing result with a predetermined threshold value and determines the presence or absence of the touch (or proximity) input. When the touch (or proximity) input is detected in the third sub-block BL33 as the second block sensing result as shown in FIG. 36, a partial sensing step is performed on the third sub-block BL33. In the partial sensing step, the touch screen driving circuit sequentially supplies the driving signal to the Tx lines on a per line basis and simultaneously sets the Rx channel on a per Rx-block basis or sequentially sets the Rx channel on a per Rx-block basis in synchronization with the driving signals, thereby precisely sensing each of the touch sensors. On the other hand, when no touch (or proximity) input is detected as the second block sensing result, the touch screen driving circuit performs the first block step.

When the touch (or proximity) input is detected as the second block sensing result, the Tx driving circuit 32 proceeds to the partial sensing step. As shown in FIG. 37, in the partial sensing step, the Tx driving circuit 32 sequentially supplies first to fourth driving signals P31 to P34 (refer to FIG. 38) to the Tx lines T9 to T12 connected to the touch sensors of the third sub-block BL33. Each of the driving signals P31 to P34 may include a plurality of pulses in the same manner as the driving signals.

As shown in FIGS. 37 and 38, in the partial sensing step, the Rx driving circuit 34 receives voltages of the touch sensors in synchronization with the first driving signal P31 through the Rx lines R13 to R18 of the third Rx block GRx3 (R13-R18), samples the voltages of the touch sensors, and converts the sampled voltages into digital data. Then, the Rx driving circuit 34 receives voltages of the touch sensors in synchronization with the second driving signal P32 through the Rx lines R13 to R18 of the third Rx block GRx3(R13-R18), samples the voltages of the touch sensors, and converts the sampled voltages into digital data. Subsequently, the Rx driving circuit 34 receives voltages of the touch sensors in synchronization with the third driving signal P33 through the Rx lines R13 to R18 of the third Rx block GRx3(R13-R18), samples the voltages of the touch sensors, and converts the sampled voltages into digital data. Then, the Rx driving circuit 34 receives voltages of the touch sensors in synchronization with the fourth driving signal P34 through the Rx lines R13 to R18 of the third Rx block GRx3(R13-R18), samples the voltages of the touch sensors, and converts the sampled voltages into digital data.

The touch recognition processor 30 compares touch raw data received from the Rx driving circuit 34 as a partial sensing result with a predetermined threshold value and determines a position of the touch (or proximity) input. The touch recognition processor 30 performs a touch recognition algorithm and estimates a coordinate value of the touch (or proximity) input position. The touch recognition processor 30 outputs coordinate data HIDxy including coordinate information of the touch (or proximity) input position detected as the partial sensing result.

Figure 39:
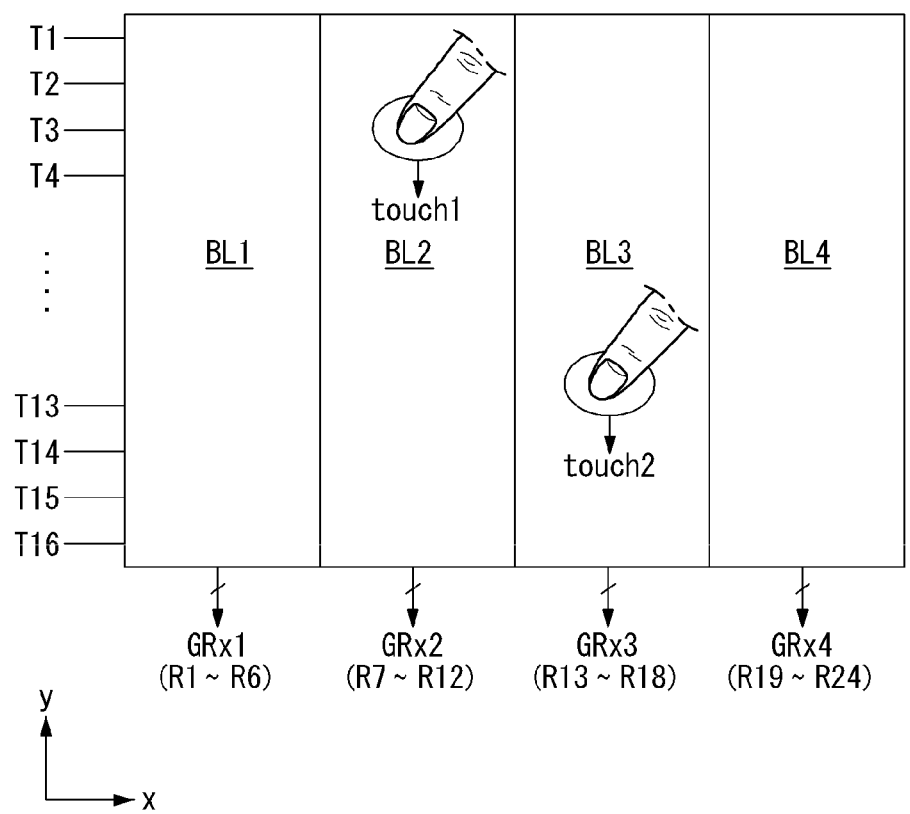
FIG. 39 illustrates an example of a multi-touch input, in which a touch input is generated in two first blocks of first blocks shown in FIG. 35.
Figure 40:
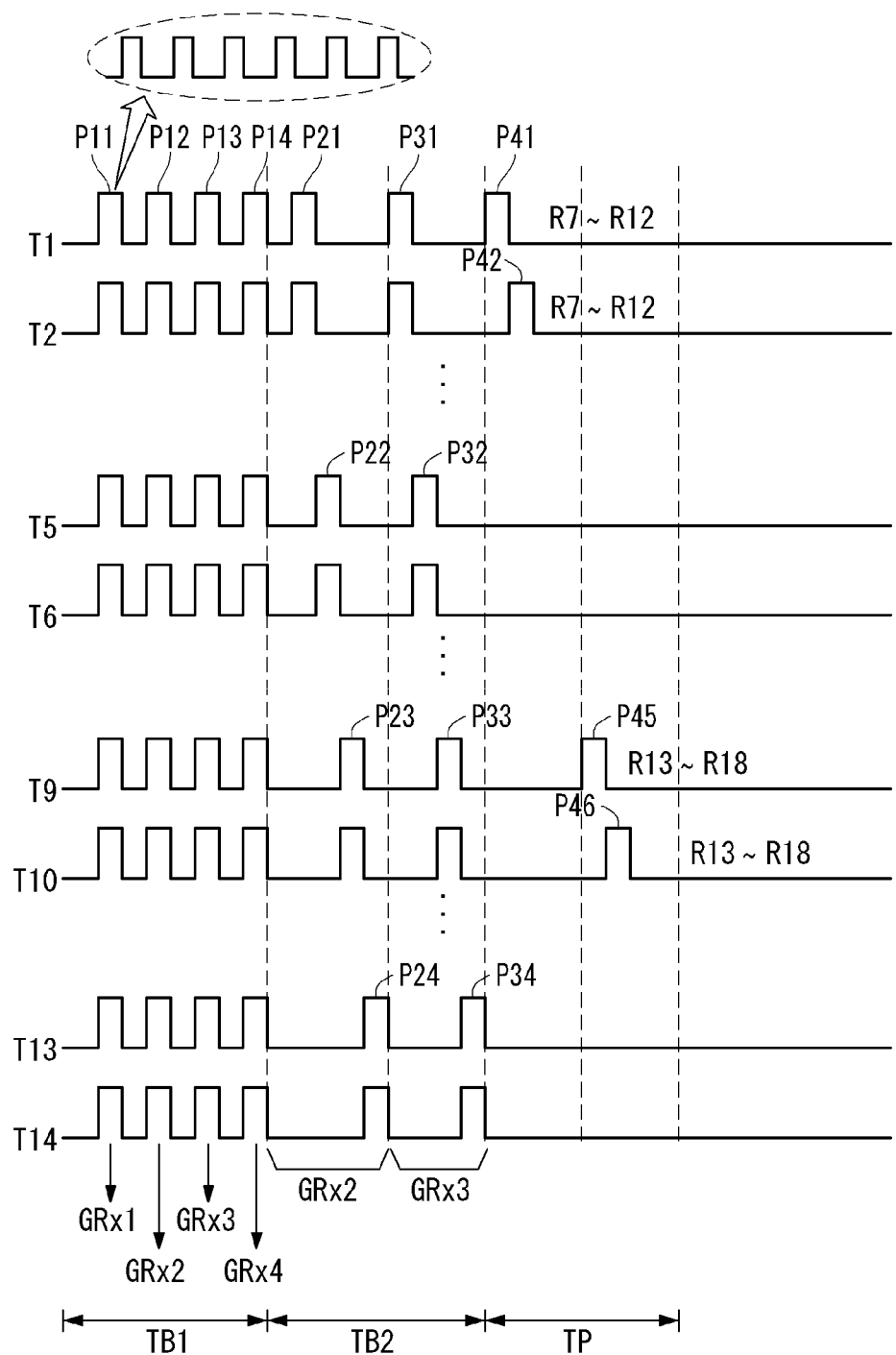
FIG. 40 is a waveform diagram illustrating a block sensing method and a partial sensing method in a multi-touch input shown in FIG. 39.

When a multi-touch (or proximity) input is detected as the first block sensing result as shown in FIG. 39, a second block sensing period TB2 and a partial sensing period TP lengthen as shown in FIG. 40.

FIG. 39 illustrates an example of a multi-touch input, in which a touch input is generated in the two blocks of the first to fourth blocks BL1 to BL4 shown in FIG. 35. FIG. 40 is a waveform diagram illustrating a block sensing method and a partial sensing method in the multi-touch input shown in FIG. 39. In FIGS. 39 and 40, it is assumed that the 16 Tx lines and the 24 Rx lines are arranged on the touch screen TSP. FIGS. 39 and 40 show an example of the touch screen TSP for the sake of brevity and ease of reading. Other block sizes, other numbers of Tx lines, other numbers of Rx lines, etc. may be used for the touch screen TSP.

As shown in FIGS. 39 and 40, the touch screen TSP may be virtually divided into a plurality of first to fourth blocks BL1 to BL4.

As shown in FIG. 39, when a touch (or proximity) input is detected in each of the two blocks BL2 and BL3 as a first block sensing result, the touch screen driving circuit proceeds to a second block sensing step. In the second block sensing step, each of the two blocks BL2 and BL3, in which the touch (or proximity) input is detected, is divided into a plurality of sub-blocks.

More specifically, when the multi-touch (or proximity) input is detected as the first block sensing result as shown in FIG. 39, the Tx driving circuit 32 proceeds to the second block sensing step. As shown in FIG. 40, the Tx driving circuit 32 sequentially supplies driving signals P21 to P24 to the sub-blocks divided form the second block BL2 on a per block basis, and then sequentially supplies driving signals P31 to P34 to the second blocks divided form the third block BL3 on a per block basis.

In the second block sensing step, the Rx driving circuit 34 receives voltages of the touch sensors of the second block BL2 through the Rx lines R7 to R12 of a second Rx block GRx2(R7-R12) connected to the touch sensors of the second block BL2 in synchronization with the driving signals P21 to P24, samples the voltages of the touch sensors, and converts the sampled voltages into digital data. Subsequently, the Rx driving circuit 34 receives voltages of the touch sensors of the third block BL3 through the Rx lines R13 to R18 of a third Rx block GRx3(R13-R18) connected to the touch sensors of the third block BL3 in synchronization with the driving signals P31 to P34, samples the voltages of the touch sensors, and converts the sampled voltages into digital data.

The touch recognition processor 30 compares touch raw data received from the Rx driving circuit 34 as a second block sensing result with a predetermined threshold value and determines the presence or absence of the touch (or proximity) input. It is assumed that the touch (or proximity) input is detected in a first sub-block of the sub-blocks divided form the second block BL2 and in a third sub-block of the sub-blocks divided form the third block BL3 as the second block sensing result. In this instance, the Tx driving circuit 32 proceeds to the partial sensing step. As shown in FIG. 40, in the partial sensing step, the Tx driving circuit 32 sequentially supplies first to fourth driving signals P41 to P44 to the Tx lines T1 to T4 of the first sub-block divided form the second block BL2, and then sequentially supplies fifth to eighth driving signals P45 to P48 to the Tx lines T9 to T12 of the third sub-block divided form the third block BL3. Each of the driving signals P41 to P48 may include a plurality of pulses in the same manner as the driving signals.

In the partial sensing step, the Rx driving circuit 34 sequentially receives voltages of the touch sensors in synchronization with the first driving signal P41 through the second Rx block GRx2(R7-R12), samples the voltages of the touch sensors, and converts the sampled voltages into digital data. Then, the Rx driving circuit 34 sequentially receives voltages of the touch sensors in synchronization with the second driving signal P42 through the second Rx block GRx2(R7-R12), samples the voltages of the touch sensors, and converts the sampled voltages into digital data. Subsequently, the Rx driving circuit 34 sequentially receives voltages of the touch sensors in synchronization with the third driving signal P43 through the second Rx block GRx2(R7-R12), samples the voltages of the touch sensors, and converts the sampled voltages into digital data. Then, the Rx driving circuit 34 sequentially receives voltages of the touch sensors in synchronization with the fourth driving signal P44 through the second Rx block GRx2(R7-R12), samples the voltages of the touch sensors, and converts the sampled voltages into digital data. Subsequently, the Rx driving circuit 34 sequentially receives voltages of the touch sensors in synchronization with the fifth driving signal P45 through the third Rx block GRx3(R13-R18), samples the voltages of the touch sensors, and converts the sampled voltages into digital data. Then the Rx driving circuit 34 sequentially receives voltages of the touch sensors in synchronization with the sixth driving signal P46 through the third Rx block GRx3(R13-R18), samples the voltages of the touch sensors, and converts the sampled voltages into digital data. Subsequently, the Rx driving circuit 34 sequentially receives voltages of the touch sensors in synchronization with the seventh driving signal P47 through the third Rx block GRx3(R13-R18), samples the voltages of the touch sensors, and converts the sampled voltages into digital data. Then, the Rx driving circuit 34 sequentially receives voltages of the touch sensors in synchronization with the eighth driving signal P48 through the third Rx block GRx3(R13-R18), samples the voltages of the touch sensors, and converts the sampled voltages into digital data.

The touch recognition processor 30 compares touch raw data received from the Rx driving circuit 34 as a partial sensing result with a predetermined threshold value and determines a position of the touch (or proximity) input. The touch recognition processor 30 performs a touch recognition algorithm and estimates a coordinate value of each of positions of the multi-touch (or proximity) input. The touch recognition processor 30 outputs coordinate data HIDxy including coordinate information of the multi-touch (or proximity) input positions detected as the partial sensing result.

Figure 41:
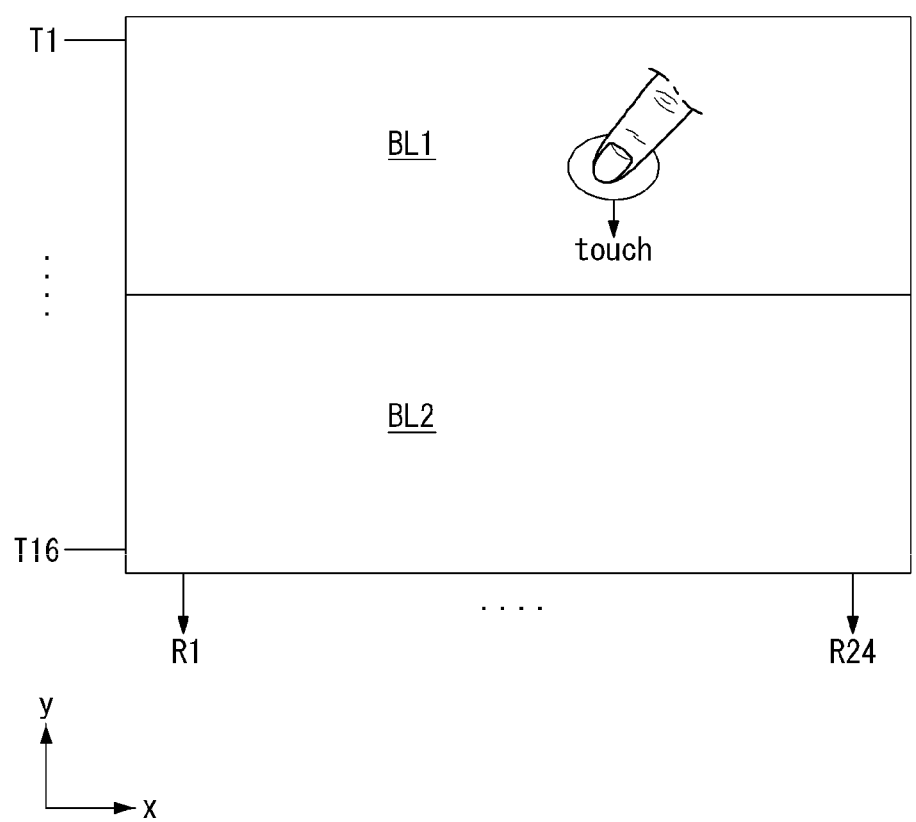
FIG. 41 illustrates another example of a method for dividing a touch screen.
Figure 42:
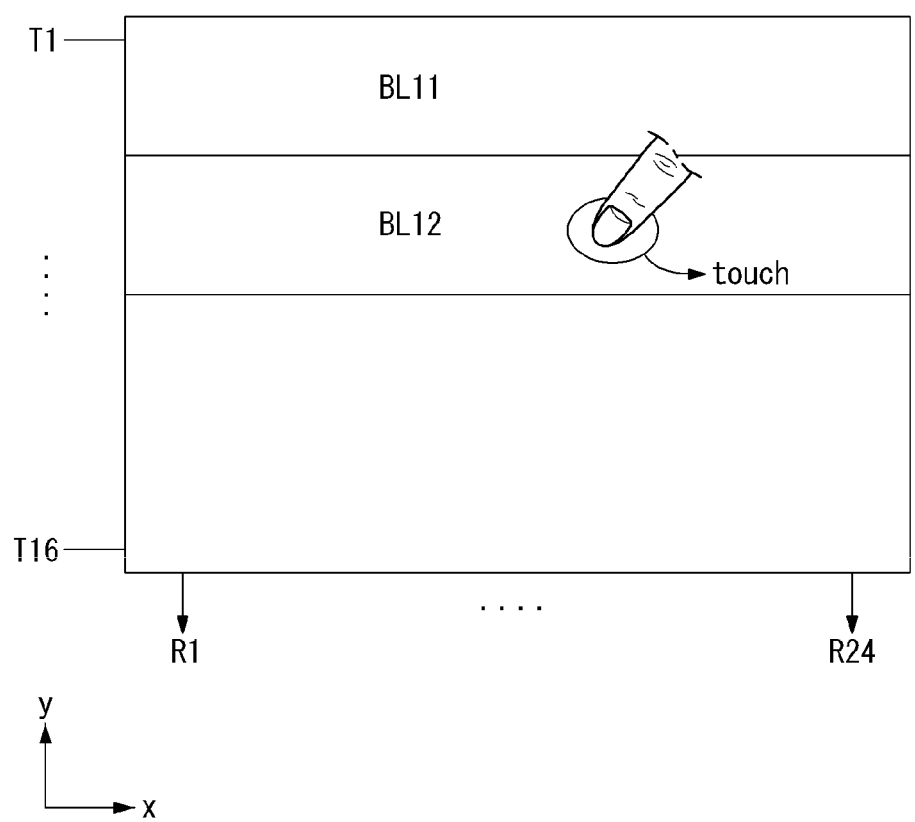
FIG. 42 illustrates an example of sub-blocks divided from a block, in which a touch input is detected among a plurality of blocks shown in FIG. 41.
Figure 43:
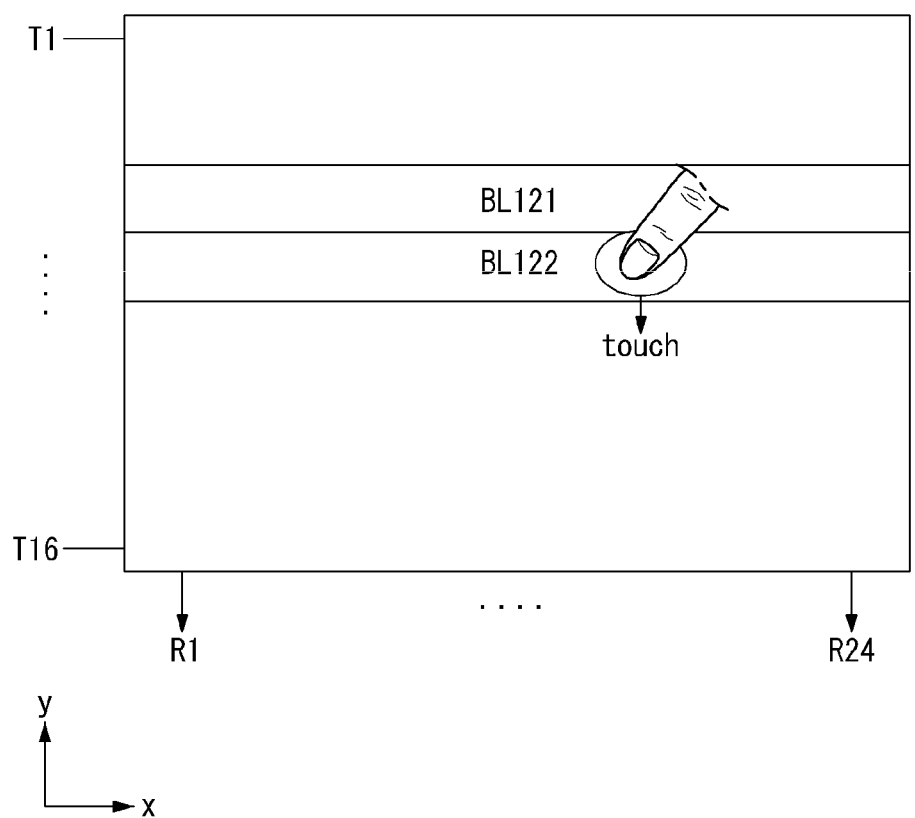
FIG. 43 illustrates an example of re-subdivided blocks divided from a sub-block, in which a touch input is detected among sub-blocks shown in FIG. 42.
Figure 44:
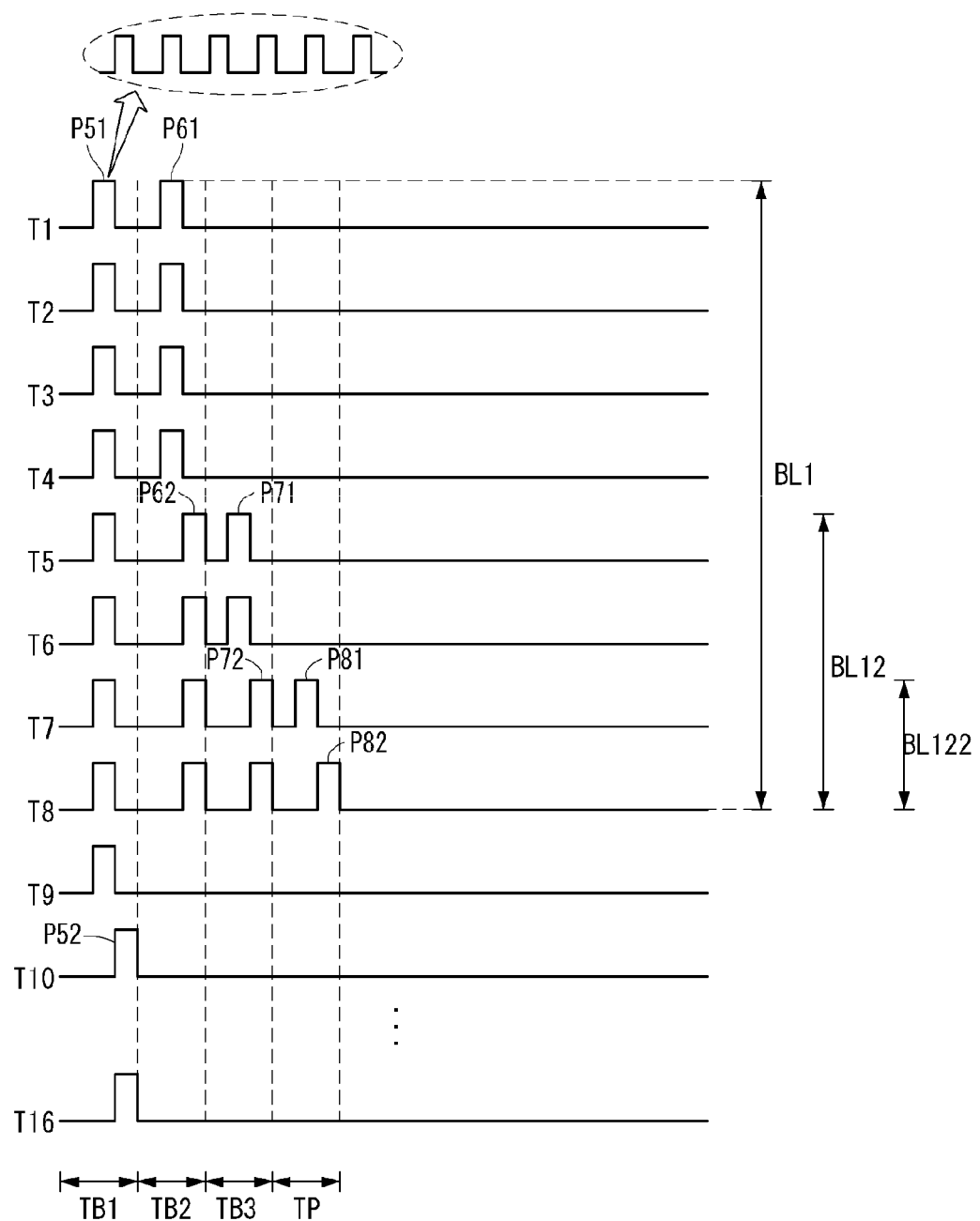
FIG. 44 is a waveform diagram illustrating a block sensing method and a partial sensing method in the case illustrated in FIGS. 41 to 43.

FIG. 41 illustrates another example of a method for dividing the touch screen. FIG. 42 illustrates an example of sub-blocks divided from a block, in which a touch input is detected among a plurality of blocks shown in FIG. 41. FIG. 43 illustrates an example of re-subdivided blocks divided from a sub-block, in which a touch input is detected among sub-blocks shown in FIG. 42. FIG. 44 is a waveform diagram illustrating a block sensing method and a partial sensing method in the case illustrated in FIGS. 41 to 43. In FIGS. 41 to 44, it is assumed that the 16 Tx lines and the 24 Rx lines are arranged on the touch screen TSP. FIGS. 41 to 44 show an example of the touch screen TSP for the sake of brevity and ease of reading. Other block sizes, other numbers of Tx lines, other numbers of Rx lines, etc. may be used for the touch screen TSP.

As shown in FIGS. 41 to 44, the touch screen TSP may be divided into two halves in a vertical direction (or the y-axis direction or the Rx-line direction). In this instance, the touch screen TSP is virtually divided into first and second blocks BL1 and BL2. The size of each of the first and second blocks BL1 and BL2 may be determined to one half of an entire touch recognition area of the touch screen TSP, but is not limited thereto. For example, the sizes of the first and second blocks BL1 and BL2 may be substantially equal to each other or may be different from each other.

As shown in FIGS. 41 and 44, in a first block sensing step, the Tx driving circuit 32 simultaneously supplies a first driving signal P51 to the Tx lines T1 to T8 connected to the touch sensors of the first block BL1, and then simultaneously supplies a second driving signal P52 to the Tx lines T9 to T16 connected to the touch sensors of the second block BL2. Each of the driving signals P51 and 52 may include a plurality of pulses.

As shown in FIGS. 41 and 44, in the first block sensing step, the Rx driving circuit 34 receives voltages of the touch sensors in synchronization with the first driving signal P51 through the Rx lines R1 to R24, samples the voltages of the touch sensors, and converts the sampled voltages into digital data. Subsequently, the Rx driving circuit 34 receives voltages of the touch sensors in synchronization with the second driving signal P52 through the Rx lines R1 to R24, samples the voltages of the touch sensors, and converts the sampled voltages into digital data.

The touch recognition processor 30 compares touch raw data received from the Rx driving circuit 34 as a first block sensing result with a predetermined threshold value and determines the presence or absence of a touch (or proximity) input. When the touch (or proximity) input is detected in the first block BL1 as the first block sensing result as shown in FIG. 41, the first block BL1 is divided into two halves in the vertical direction (or the y-axis direction) as shown in FIG. 42. In this instance, as shown in FIG. 42, the first block BL1 is divided into first and second sub-blocks BL11 and BL12. The size of each of the first and second sub-blocks BL11 and BL12 may be determined to one half of the size of the first block BL1.

When no touch (or proximity) input is detected as the first block sensing result, the touch screen driving circuit is held in an idle sensing mode for a predetermined idle time Tidle in the same manner as the above-described embodiments, so as to reduce the power consumption.

When the touch (or proximity) input is detected as the first block sensing result, the Tx driving circuit 32 proceeds to a second block sensing step. As shown in FIGS. 42 and 44, the Tx driving circuit 32 simultaneously supplies a first driving signal P61 to the Tx lines T1 to T4 connected to the touch sensors of the first sub-block BL11. Subsequently, the Tx driving circuit 32 simultaneously supplies a second driving signal P62 to the Tx lines T5 to T8 connected to the touch sensors of the second sub-block BL12. Each of the driving signals P61 and 62 may include a plurality of pulses in the same manner as the driving signals. In the second block sensing step, the Tx driving circuit 32 does not apply the driving signal to the Tx lines T9 to T16 belonging to the second block BL2, in which no touch (or proximity) input is detected as the first block sensing result.

As shown in FIGS. 42 and 44, in the second block sensing step, the Rx driving circuit 34 receives voltages of the touch sensors of the first sub-block BL11 in synchronization with the first driving signal P61 through the Rx lines R1 to R24, samples the voltages of the touch sensors, and converts the sampled voltages into digital data. Subsequently, the Rx driving circuit 34 receives voltages of the touch sensors of the second sub-block BL12 in synchronization with the second driving signal P62 through the Rx lines R1 to R24, samples the voltages of the touch sensors, and converts the sampled voltages into digital data.

The touch recognition processor 30 compares touch raw data received from the Rx driving circuit 34 as a second block sensing result with a predetermined threshold value and determines the presence or absence of the touch (or proximity) input. When the touch (or proximity) input is detected in the second sub-block BL12 as the second block sensing result as shown in FIG. 42, the second sub-block BL12 is divided into two halves in the vertical direction (or the y-axis direction) as shown in FIG. 43. In this instance, as shown in FIG. 43, the second sub-block BL12 is divided into first and second re-subdivided blocks BL121 and BL122. The size of each of the first and second re-subdivided blocks BL121 and BL122 may be determined to one half of the size of the second sub-block BL12. The touch screen driving circuit is held in an idle sensing mode for a predetermine period of time, in which no touch (or proximity) input is detected as the second block sensing result, and then proceeds to the first block sensing step. The idle sensing mode may be omitted.

When the touch (or proximity) input is detected as the second block sensing result, the Tx driving circuit 32 proceeds to a third block sensing step. As shown in FIGS. 43 and 44, the Tx driving circuit 32 simultaneously supplies a first driving signal P71 to the Tx lines T5 and T6 connected to the touch sensors of the first re-subdivided block BL121. Subsequently, the Tx driving circuit 32 simultaneously supplies a second driving signal P72 to the Tx lines T7 and T8 connected to the touch sensors of the second re-subdivided block BL122. Each of the driving signals P71 and 72 may include a plurality of pulses in the same manner as the driving signals. In the third block sensing step, the Tx driving circuit 32 does not apply the driving signal to the Tx lines T1 to T4 belonging to the first sub-block BL11, in which no touch (or proximity) input is detected as the second block sensing result, and the Tx lines T9 to T16 belonging to the second block BL2, in which no touch (or proximity) input is detected as the first block sensing result.

As shown in FIGS. 43 and 44, in the third block sensing step, the Rx driving circuit 34 receives voltages of the touch sensors of the first re-subdivided block BL121 in synchronization with the first driving signal P71 through the Rx lines R1 to R24, samples the voltages of the touch sensors, and converts the sampled voltages into digital data. Subsequently, the Rx driving circuit 34 receives voltages of the touch sensors of the second re-subdivided block BL122 in synchronization with the second driving signal P72 through the Rx lines R1 to R24, samples the voltages of the touch sensors, and converts the sampled voltages into digital data.

The touch recognition processor 30 compares touch raw data received from the Rx driving circuit 34 as a third block sensing result with a predetermined threshold value and determines the presence or absence of the touch (or proximity) input. When the touch (or proximity) input is detected in the second re-subdivided block BL122 as the third block sensing result as shown in FIG. 43, a partial sensing process is performed on the second re-subdivided block BL122. Because each re-subdivided block is no longer divided, a partial sensing step is performed subsequent to the third block sensing step if the touch (or proximity) input is detected as the third block sensing result. If the touch (or proximity) input of the predetermined size is detected in the second block sensing step or the third block sensing step, the partial sensing step is not performed subsequent to the second block sensing step or the third block sensing step. Immediately, the touch recognition algorithm is performed, and the coordinates of the touch (or proximity) input position maybe estimated.

As shown in FIGS. 43 and 44, the Tx driving circuit 32 proceeds to the partial sensing step. In the partial sensing step, the Tx driving circuit 32 sequentially supplies first and second driving signals P81 and 82 to the Tx lines T7 and T8 connected to the touch sensors of the second re-subdivided block BL122. Each of the driving signals P81 and 82 may include a plurality of pulses in the same manner as the driving signals.

As shown in FIGS. 43 and 44, in the partial sensing step, the Rx driving circuit 34 receives voltages of the touch sensors in synchronization with the first driving signal P81 through the Rx lines R1 to R24, samples the voltages of the touch sensors, and converts the sampled voltages into digital data. Subsequently, the Rx driving circuit 34 receives voltages of the touch sensors in synchronization with the second driving signal P82 through the Rx lines R1 to R24, samples the voltages of the touch sensors, and converts the sampled voltages into digital data.

The touch recognition processor 30 compares touch raw data received from the Rx driving circuit 34 as a partial sensing result with a predetermined threshold value and determines a position of the touch (or proximity) input. The touch recognition processor 30 performs the touch recognition algorithm and estimates a coordinate value of the touch (or proximity) input position. The touch recognition processor 30 outputs coordinate data HIDxy including coordinate information of the touch (or proximity) input position detected as the partial sensing result.

If the sensing area is fixed in the partial sensing step, the touch (or proximity) input position may be inaccurately processed. This is described in detail below with reference to FIGS. 45 to 47.

Figure 45:
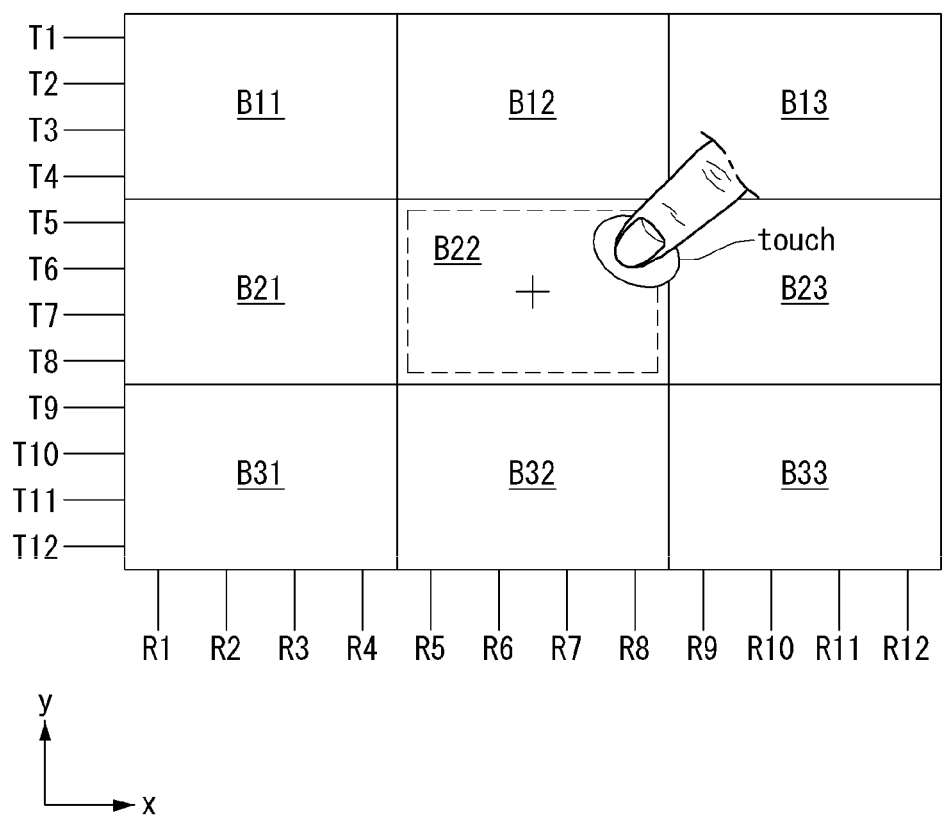
FIG. 45 illustrates an example of sensing only touch sensors inside blocks in a partial sensing step.
Figure 46:
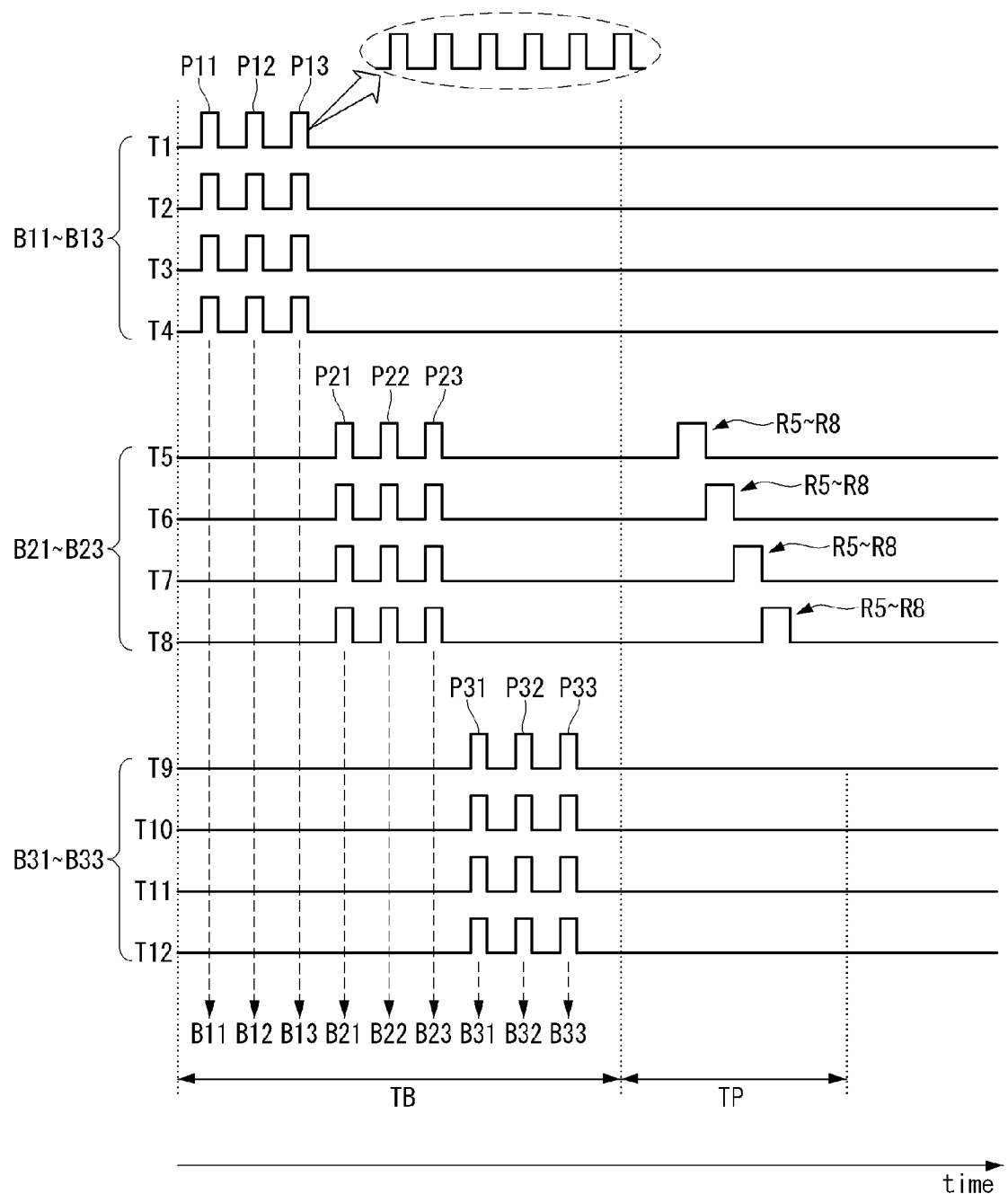
FIG. 46 is a waveform diagram illustrating driving pulses applied to a touch screen in a partial sensing method illustrated in FIG. 45.
Figure 47:
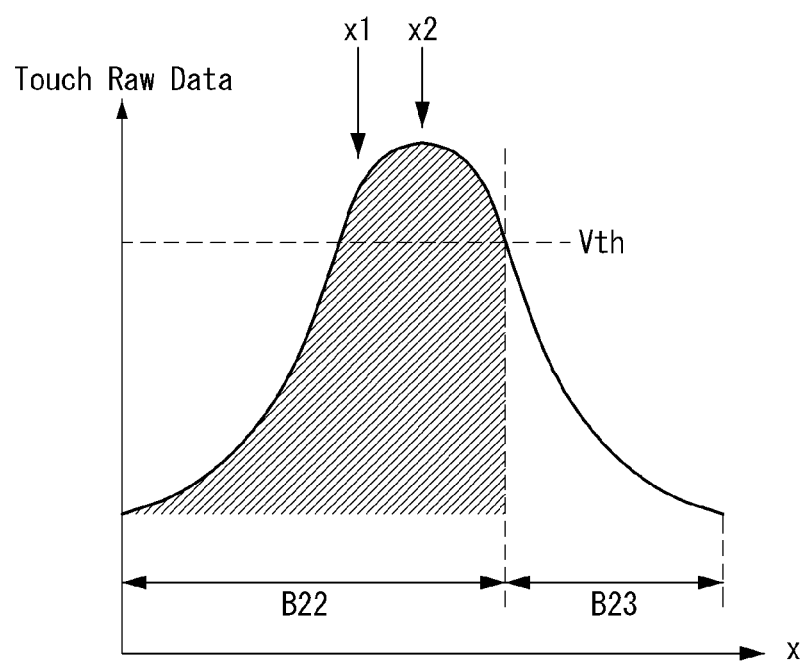
FIG. 47 illustrates a center point shift phenomenon of a touch input caused in a partial sensing method illustrated in FIG. 45.

As shown in FIGS. 45 to 47, each Tx block may be divided into a plurality of Rx blocks. A first Tx block includes first to third blocks B11 to B13 sharing first to fourth Tx lines T1 to T4. A second Tx block includes fourth to sixth blocks B21 to B23 sharing fifth to eighth Tx lines T5 to T8. A third Tx block includes seventh to ninth blocks B31 to B33 sharing ninth to twelfth Tx lines T9 to T12. The first to ninth blocks B11 to B33 have a lattice structure defined by a crossing of the Tx blocks and the Rx blocks.

A block sensing step quickly detects the presence or absence of a touch (or proximity) input based on the Tx blocks. A partial sensing step precisely senses the touch sensors of a block, in which the touch (or proximity) input is detected.

In the block sensing step, the Tx driving circuit 32 simultaneously supplies driving signals P11 to P13 to the first to fourth Tx lines T1 to T4 so as to sense voltages of the touch sensors of the first Tx blocks B11 to B13, and then simultaneously supplies driving signals P21 to P23 to the fifth to eighth Tx lines T5 to T8 so as to sense voltages of the touch sensors of the second Tx blocks B21 to B23. Subsequently, the Tx driving circuit 32 simultaneously supplies driving signals P31 to P33 to the ninth to twelfth Tx lines T9 to T12 so as to sense voltages of the touch sensors of the third Tx blocks B31 to B33.

In the block sensing step, the Rx driving circuit 34 receives voltages of the touch sensors of the first block B11 in synchronization with the driving signal P11 through the first to fourth Rx lines R1 to R4, samples the voltages of the touch sensors, and converts the sampled voltages into digital data. The Rx driving circuit 34 receives voltages of the touch sensors of the second block B12 in synchronization with the driving signal P12 through the fifth to eighth Rx lines R5 to R8, samples the voltages of the touch sensors, and converts the sampled voltages into digital data. The Rx driving circuit 34 receives voltages of the touch sensors of the third block B13 in synchronization with the driving signal P13 through the ninth to twelfth Rx lines R9 to R12, samples the voltages of the touch sensors, and converts the sampled voltages into digital data.

Further, in the block sensing step, the Rx driving circuit 34 receives voltages of the touch sensors of the fourth block B21 in synchronization with the driving signal P21 through the first to fourth Rx lines R1 to R4, samples the voltages of the touch sensors, and converts the sampled voltages into digital data. The Rx driving circuit 34 receives voltages of the touch sensors of the fifth block B22 in synchronization with the driving signal P22 through the fifth to eighth Rx lines R5 to R8, samples the voltages of the touch sensors, and converts the sampled voltages into digital data. The Rx driving circuit 34 receives voltages of the touch sensors of the sixth block B23 in synchronization with the driving signal P23 through the ninth to twelfth Rx lines R9 to R12, samples the voltages of the touch sensors, and converts the sampled voltages into digital data.

Further, in the block sensing step, the Rx driving circuit 34 receives voltages of the touch sensors of the seventh block B31 in synchronization with the driving signal P31 through the first to fourth Rx lines R1 to R4, samples the voltages of the touch sensors, and converts the sampled voltages into digital data. The Rx driving circuit 34 receives voltages of the touch sensors of the eighth block B32 in synchronization with the driving signal P32 through the fifth to eighth Rx lines R5 to R8, samples the voltages of the touch sensors, and converts the sampled voltages into digital data. The Rx driving circuit 34 receives voltages of the touch sensors of the ninth block B33 in synchronization with the driving signal P33 through the ninth to twelfth Rx lines R9 to R12, samples the voltages of the touch sensors, and converts the sampled voltages into digital data.

When the touch (or proximity) input is detected in the fifth block B22 as a block sensing result as shown in FIG. 45, the touch screen driving circuit proceeds to the partial sensing step. In the partial sensing step, the touch screen driving circuit sequentially supplies driving signals to the fifth to eighth Tx lines T5 to T8, thereby sensing the touch sensors of the fifth block B22.

The touch screen driving circuit has to accurately find a center point of a touch (or proximity) input area, so as to accurately calculate the touch (or proximity) input position. For example, as shown in FIG. 45, when a touch (or proximity) input position is present at a right edge of the fifth block B22, a center point of a touch (or proximity) input area may be shifted if the partial sensing step is performed only on the fifth block B22. In this instance, a change amount of the voltage of the touch sensors positioned at the right edge of the fifth block B22 before and after a touch operation increases to a value equal to or greater than a threshold value Vth, and thus the fifth block B22 is recognized as the touch (or proximity) input position. On the other hand, because a change amount of the voltage of some of the touch sensors positioned at a left edge of the sixth block B23 before and after the touch operation is less than the threshold value Vth, some of the touch sensors of the sixth block B22 are recognized as the touch sensors, in which no touch (or proximity) input is detected. When the partial sensing step is performed only on the fifth block B22, the voltage of the touch sensors of the sixth block B23 is not sensed as indicated by a portion having an oblique line pattern shown in FIG. 47.

In the case shown in FIG. 47, a center point of a touch (or proximity) input area is recognized as 'x1' which is shifted to the left from an actual center point 'x2', and thus the touch (or proximity) input position may be wrongly recognized. When the touch (or proximity) input is a line drawing type or a dragging type, the linearity of the touch (or proximity) input is reduced. Hence, a trace of the touch (or proximity) input may be discontinuous at a boundary between the blocks or may be distorted in a zigzag pattern. To prevent the above problem, a fifth embodiment of the invention performs a partial sensing step using a partial sensing area, which varies depending on a touch (or proximity) input position inside a block, as shown in FIGS. 48 to 57. The partial sensing step using the varied partial sensing area may be applied to all the embodiments of the invention.

In a method for driving the touch sensing device according to the fifth embodiment of the invention, a partial sensing method expands a partial sensing area in a block sensing step and precisely senses a block, in which a touch (or proximity) input is detected, and blocks or touch sensors around the touch (or proximity) input block. FIGS. 48 to 57 illustrate the partial sensing method in the method for driving the touch sensing device according to the fifth embodiment of the invention. Since the above-described block sensing step according to the embodiments of the invention may be applied to the driving method illustrated in FIGS. 48 to 57, a further description may be briefly made or may be entirely omitted in FIGS. 48 to 57.

Case 1

Figure 48:
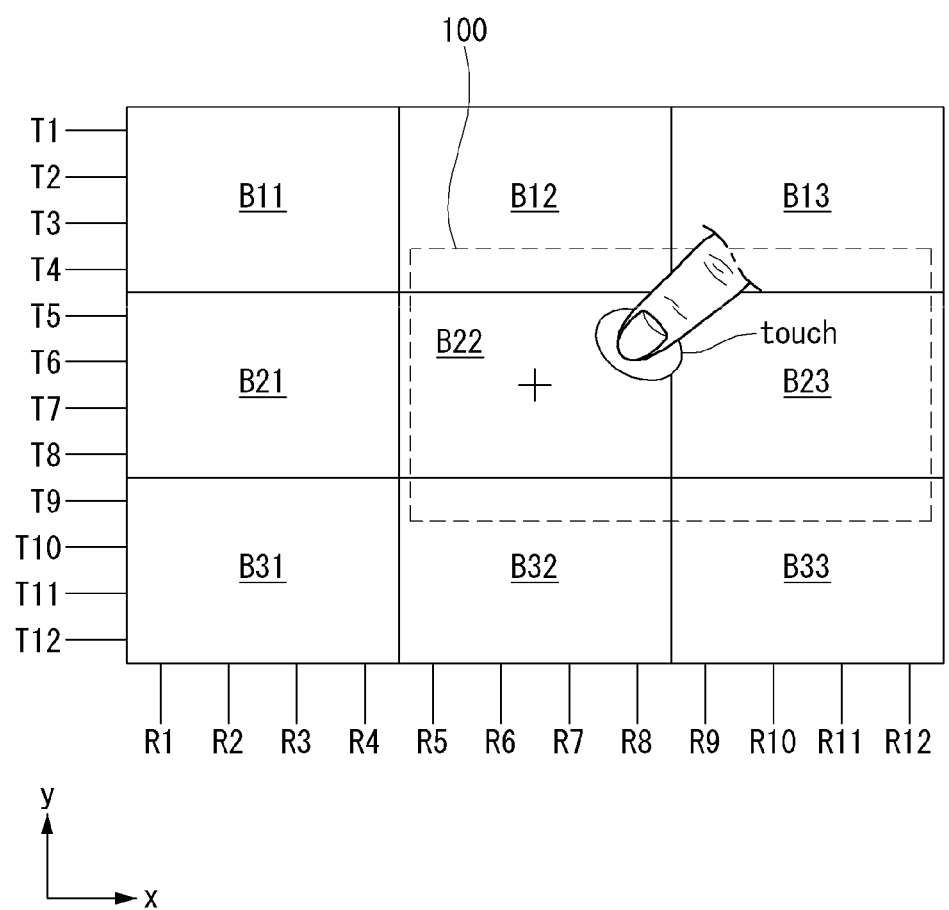
FIG. 48 illustrates a first example CASE 1 where a partial sensing area is expanded in a method for driving a touch sensing device according to a fifth embodiment of the invention.
Figure 49:
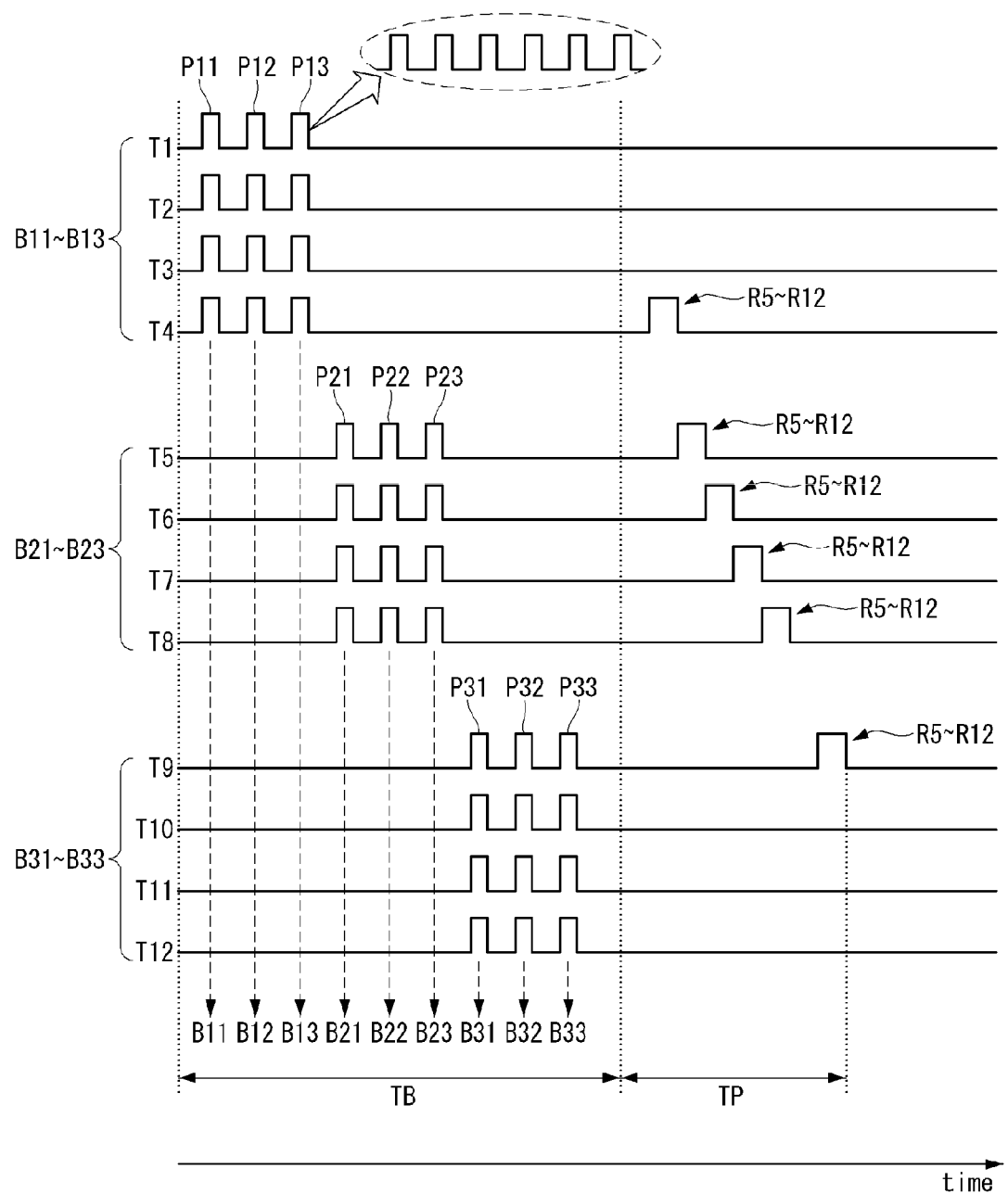
FIG. 49 is a waveform diagram illustrating driving pulses applied to a touch screen in a partial sensing method illustrated in FIG. 48.

FIGS. 48 and 49 illustrate a partial sensing area 100 assigned when a touch (or proximity) input is detected at a right edge of a predetermined block, and driving signals applied to the partial sensing area 100.

As shown in FIGS. 48 and 49, when a touch (or proximity) input is detected at a right edge of a fifth block B22 in a block sensing step, the touch screen driving circuit senses a voltage of touch sensors of the fifth block B22 and a voltage of touch sensors of a sixth block B23 right adjacent to the fifth block B22 in a partial sensing step. The touch screen driving circuit additionally senses a voltage of touch sensors close to the fifth and sixth blocks B22 and B23 among touch sensors positioned outside the fifth and sixth blocks B22 and B23. The touch sensors close to the fifth and sixth blocks B22 and B23 include touch sensors positioned on the fifth and sixth blocks B22 and B23 and touch sensors positioned under the fifth and sixth blocks B22 and B23. The touch sensors positioned on the fifth and sixth blocks B22 and B23 may be touch sensors connected to M Tx lines (where M is a positive integer which is equal to or greater than 1 and less than the number of Tx lines included in one block) close to the fifth and sixth blocks B22 and B23 among touch sensors of second and third blocks B12 and B13 positioned on the fifth and sixth blocks B22 and B23. The touch sensors positioned under the fifth and sixth blocks B22 and B23 may be touch sensors connected to M Tx lines close to the fifth and sixth blocks B22 and B23 among touch sensors of eighth and ninth blocks B32 and B33 positioned under the fifth and sixth blocks B22 and B23. In FIGS. 48 and 49, the fifth embodiment of the invention is described on the assumption that M is 1, but is not limited thereto.

As shown in FIG. 49, the touch screen driving circuit supplies driving signals to Tx lines T5 to T8 connected to the touch sensors of the fifth and sixth blocks B22 and B23 in the partial sensing step. Further, the touch screen driving circuit supplies the driving signals to a fourth Tx line T4 included in the second and third blocks B12 and B13 and a ninth Tx line T9 included in the eighth and ninth blocks B32 and B33, so as to expand the partial sensing area 100. In the partial sensing step, the driving signals may be sequentially supplied to the fourth Tx line T4 to the ninth Tx line T9 in the order named. FIG. 49 shows that one driving signal is supplied to one Tx line in the partial sensing step. However, each driving signal may include a plurality of pulses. The Rx driving circuit 34 receives voltages of the touch sensors through Rx lines R5 to R12 crossing the Tx lines T4 to T9 in the partial sensing area 100 in synchronization with the driving signals supplied to the Tx lines T4 to T9, sequentially samples the voltages of the touch sensors, and converts the voltages of the touch sensors into digital data.

Case 2

Figure 50:
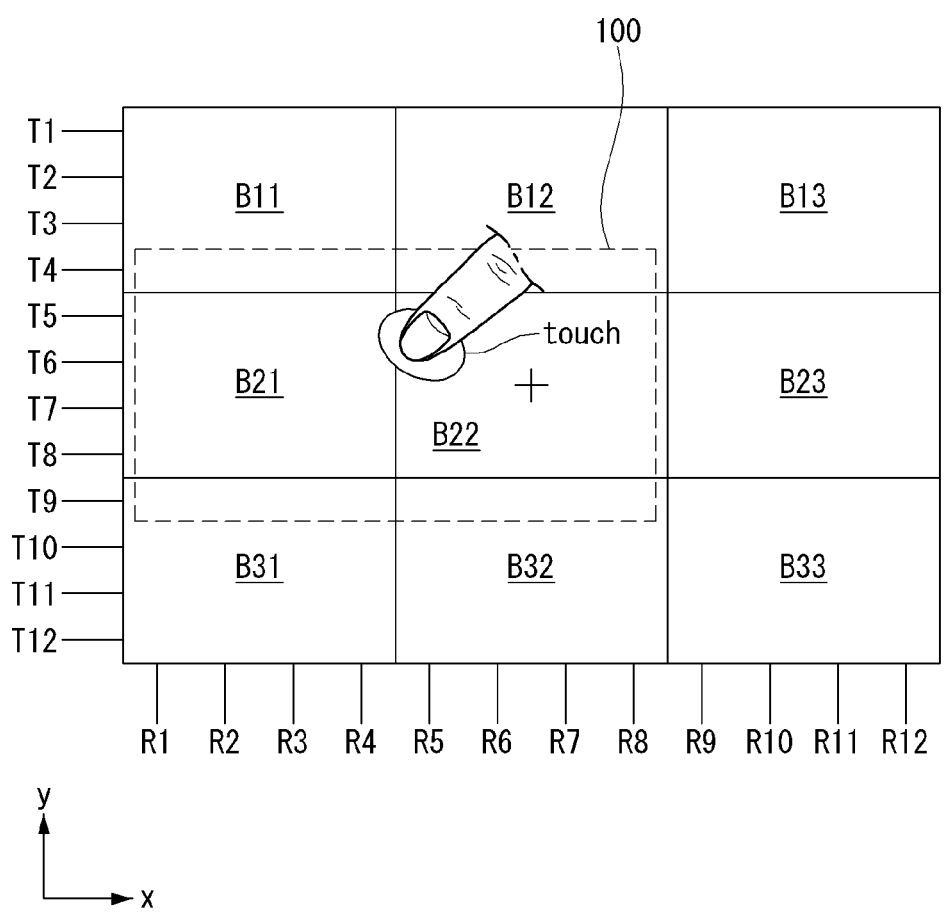
FIG. 50 illustrates a second example CASE 2 where a partial sensing area is expanded in the method for driving the touch sensing device according to the fifth embodiment of the invention.
Figure 51:
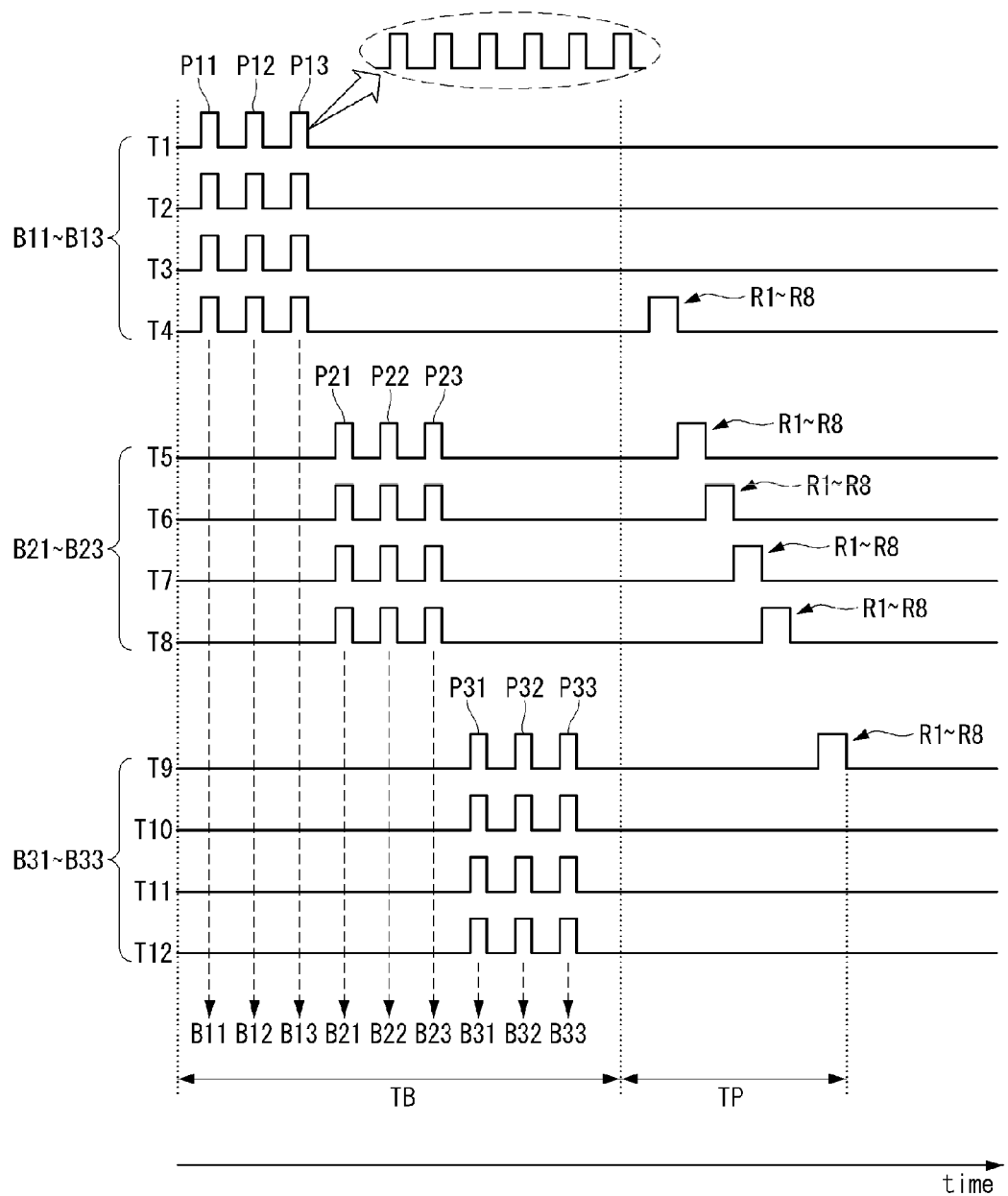
FIG. 51 is a waveform diagram illustrating driving pulses applied to a touch screen in a partial sensing method illustrated in FIG. 50.

FIGS. 50 and 51 illustrate a partial sensing area 100 assigned when a touch (or proximity) input is detected at a left edge of a predetermined block, and driving signals applied to the partial sensing area 100.

As shown in FIGS. 50 and 51, when a touch (or proximity) input is detected at a left edge of a fifth block B22 in a block sensing step, the touch screen driving circuit senses a voltage of touch sensors of the fifth block B22 and a voltage of touch sensors of a fourth block B21 left adjacent to the fifth block B22 in a partial sensing step. The touch screen driving circuit expands the partial sensing area 100 in the partial sensing step and additionally senses a voltage of touch sensors close to the fourth and fifth blocks B21 and B22 among touch sensors positioned outside the fourth and fifth blocks B21 and B22. The touch sensors close to the fourth and fifth blocks B21 and B22 include touch sensors positioned on the fourth and fifth blocks B21 and B22 and touch sensors positioned under the fourth and fifth blocks B21 and B22. The touch sensors positioned on the fourth and fifth blocks B21 and B22 may be touch sensors connected to M Tx lines close to the fourth and fifth blocks B21 and B22 among touch sensors of first and second blocks B11 and B12 positioned on the fourth and fifth blocks B21 and B22. The touch sensors positioned under the fourth and fifth blocks B21 and B22 may be touch sensors connected to M Tx lines close to the fourth and fifth blocks B21 and B22 among touch sensors of seventh and eighth blocks B31 and B32 positioned under the fourth and fifth blocks B21 and B22. In FIGS. 50 and 51, the fifth embodiment of the invention is described on the assumption that M is 1, but is not limited thereto.

As shown in FIG. 51, the touch screen driving circuit supplies driving signals to Tx lines T5 to T8 connected to the touch sensors of the fourth and fifth blocks B21 and B22 in the partial sensing step. Further, the touch screen driving circuit supplies the driving signals to a fourth Tx line T4 included in the first and second blocks B11 and B12 and a ninth Tx line T9 included in the seventh and eighth blocks B31 and B32, so as to expand the partial sensing area 100. During a partial sensing period TP, the driving signals may be sequentially supplied to the fourth Tx line T4 to the ninth Tx line T9 in the order named. FIG. 51 shows that one driving signal is supplied to one Tx line during the partial sensing period TP. However, each driving signal may include a plurality of pulses. The Rx driving circuit 34 receives voltages of the touch sensors through Rx lines R1 to R8 crossing the Tx lines T4 to T9 in the partial sensing area 100 in synchronization with the driving signals supplied to the Tx lines T4 to T9, sequentially samples the voltages of the touch sensors, and converts the voltages of the touch sensors into digital data.

Case 3

Figure 52:
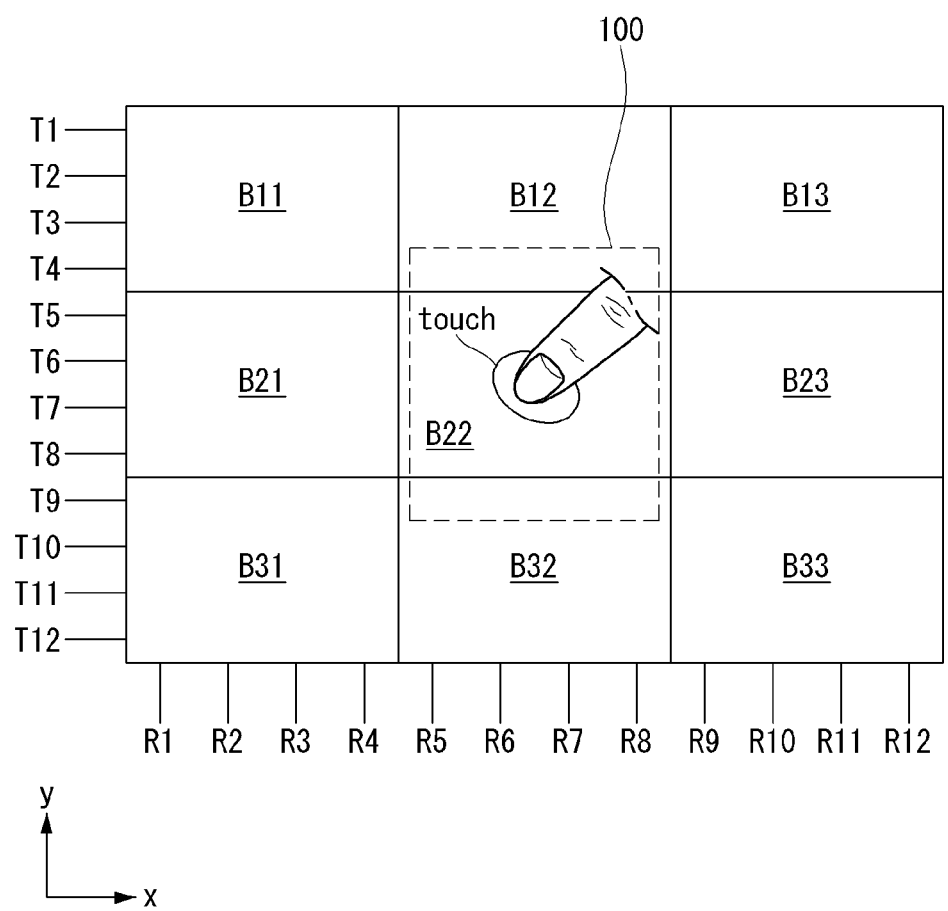
FIG. 52 illustrates a third example CASE 3 where a partial sensing area is expanded in the method for driving the touch sensing device according to the fifth embodiment of the invention.
Figure 53:
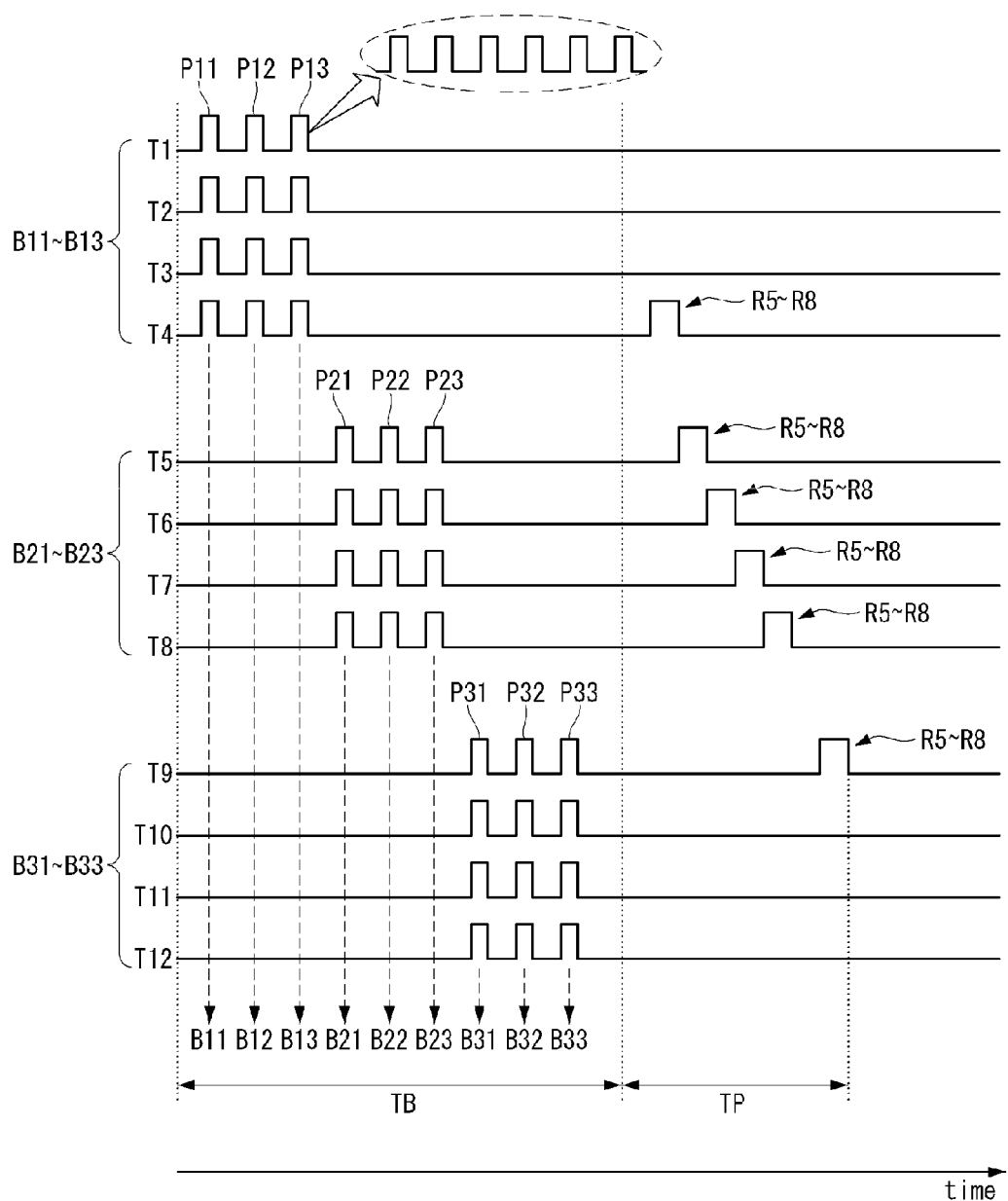
FIG. 53 is a waveform diagram illustrating driving pulses applied to a touch screen in a partial sensing method illustrated in FIG. 52.

FIGS. 52 and 53 illustrate a partial sensing area 100 assigned when a touch (or proximity) input is detected in the center of a predetermined block, and driving signals applied to the partial sensing area 100.

As shown in FIGS. 52 and 53, when a touch (or proximity) input is detected in the center of a fifth block B22 in a block sensing step, the touch screen driving circuit precisely senses a voltage of touch sensors of the fifth block B22 in a partial sensing step. The touch screen driving circuit expands the partial sensing area 100 in the partial sensing step and additionally senses a voltage of touch sensors close to the fifth block B22 among touch sensors positioned outside the fifth block B22. The touch sensors close to the fifth block B22 include touch sensors positioned on the fifth block B22 and touch sensors positioned under the fifth block B22. The touch sensors positioned on the fifth block B22 may be touch sensors connected to M Tx lines close to the fifth block B22 among touch sensors of a second block B12 positioned on the fifth block B22. The touch sensors positioned under the fifth block B22 may be touch sensors connected to M Tx lines close to the fifth block B22 among touch sensors of an eighth block B32 positioned under the fifth block B22. In FIGS. 52 and 53, the fifth embodiment of the invention is described on the assumption that M is 1, but is not limited thereto.

As shown in FIG. 53, the touch screen driving circuit supplies driving signals to Tx lines T5 to T8 connected to the touch sensors of the fifth block B22 in the partial sensing step. Further, the touch screen driving circuit supplies the driving signals to a fourth Tx line T4 included in the second block B12 and a ninth Tx line T9 included in the eighth block B32, so as to expand the partial sensing area 100. During a partial sensing period TP, the driving signals may be sequentially supplied to the fourth Tx line T4 to the ninth Tx line T9 in the order named. FIG. 53 shows that one driving signal is supplied to one Tx line during the partial sensing period TP. However, each driving signal may include a plurality of pulses. The Rx driving circuit 34 receives voltages of the touch sensors through Rx lines R5 to R8 crossing the Tx lines T4 to T9 in the partial sensing area 100 in synchronization with the driving signals supplied to the Tx lines T4 to T9, sequentially samples the voltages of the touch sensors, and converts the voltages of the touch sensors into digital data.

Case 4

Figure 54:
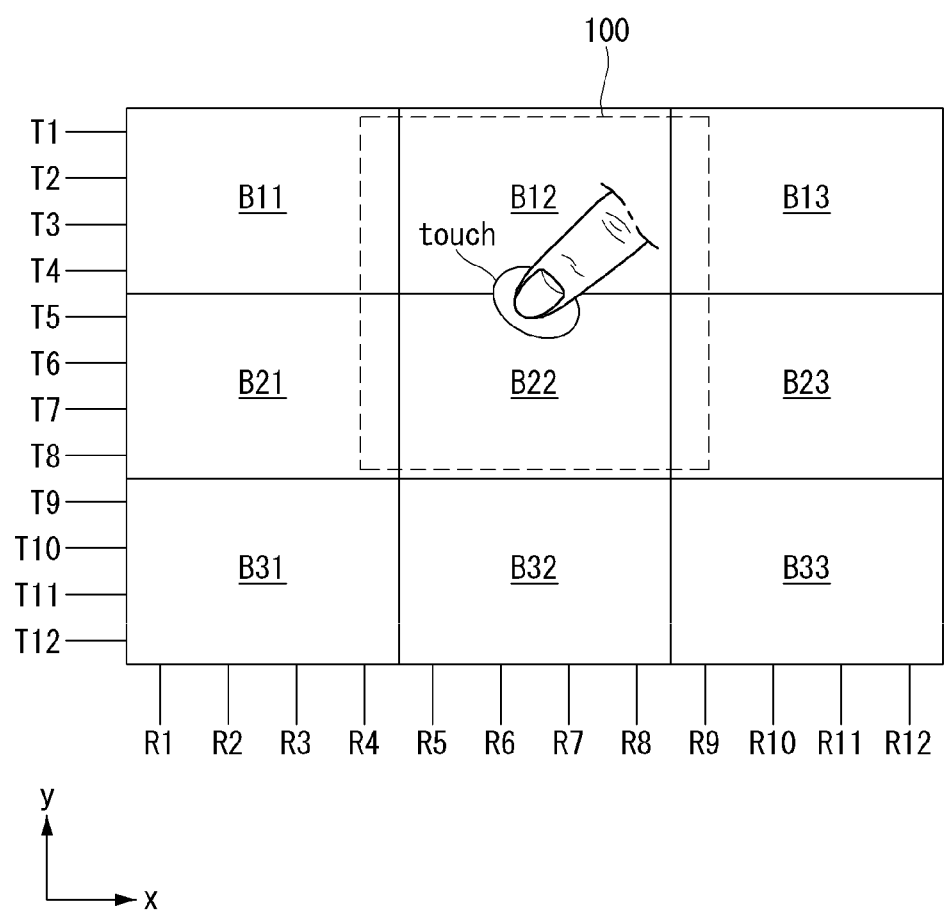
FIG. 54 illustrates a fourth example CASE 4 where a partial sensing area is expanded in the method for driving the touch sensing device according to the fifth embodiment of the invention.
Figure 55:
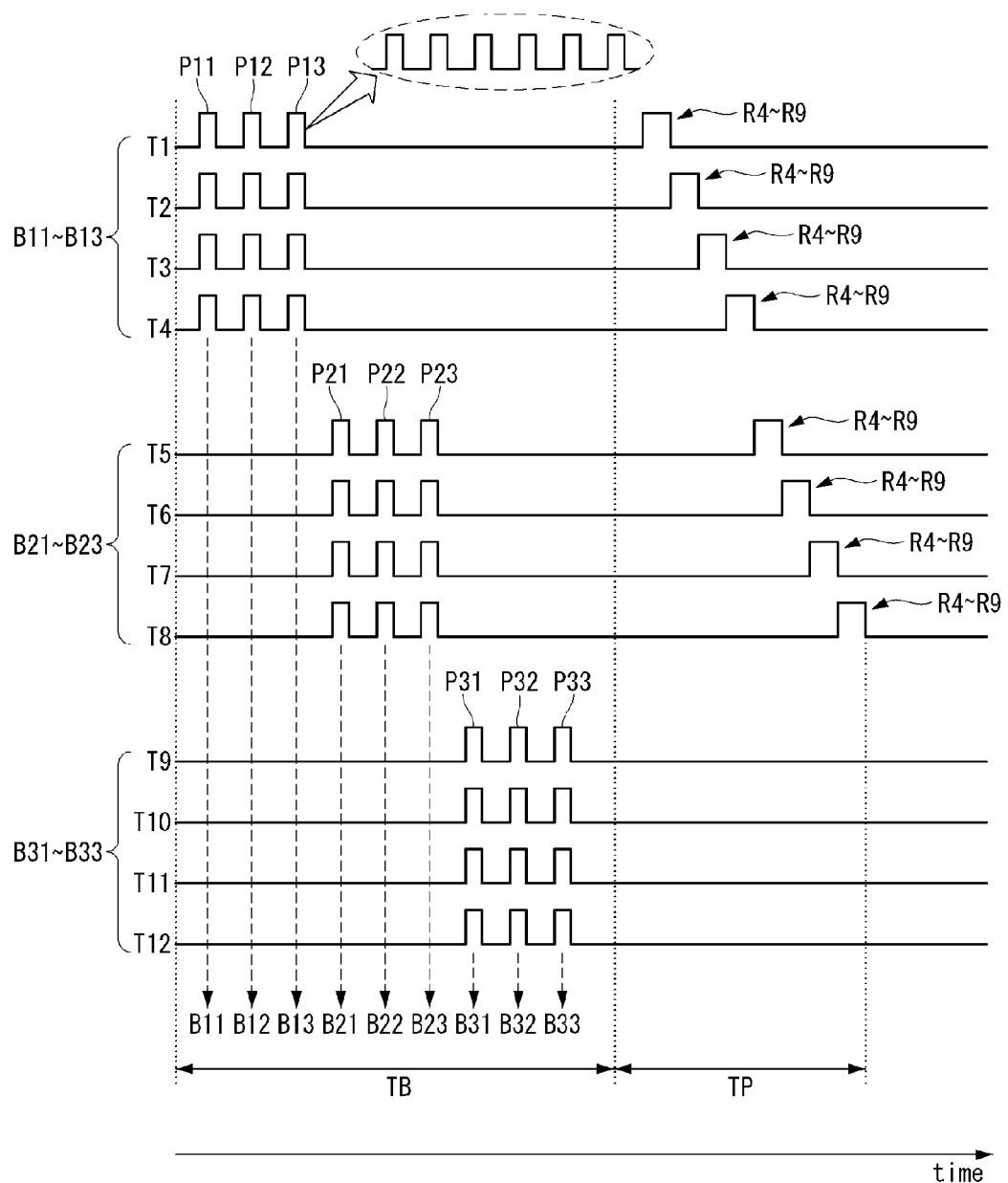
FIG. 55 is a waveform diagram illustrating driving pulses applied to a touch screen in a partial sensing method illustrated in FIG. 54.

FIGS. 54 and 55 illustrate a partial sensing area 100 assigned when a touch (or proximity) input is detected at an upper edge of a predetermined block, and driving signals applied to the partial sensing area 100.

As shown in FIGS. 54 and 55, when a touch (or proximity) input is detected at an upper edge of a fifth block B22 in a block sensing step, the touch screen driving circuit senses a voltage of touch sensors of the fifth block B22 and a voltage of touch sensors of a second block B12 upward adjacent to the fifth block B22 in a partial sensing step. The touch screen driving circuit expands the partial sensing area 100 in the partial sensing step and additionally senses a voltage of touch sensors close to the second and fifth blocks B12 and B22 among touch sensors positioned outside the second and fifth blocks B12 and B22. The touch sensors close to the second and fifth blocks B12 and B22 include touch sensors left adjacent to the second and fifth blocks B12 and B22 and touch sensors right adjacent to the second and fifth blocks B12 and B22. The touch sensors left adjacent to the second and fifth blocks B12 and B22 may be touch sensors connected to M Rx lines close to the second and fifth blocks B12 and B22 among touch sensors of first and fourth blocks B11 and B21 left adjacent to the second and fifth blocks B12 and B22. The touch sensors right adjacent to the second and fifth blocks B12 and B22 may be touch sensors connected to M Rx lines close to the second and fifth blocks B12 and B22 among touch sensors of third and sixth blocks B13 and B23 right adjacent to the second and fifth blocks B12 and B22. In FIGS. 54 and 55, the fifth embodiment of the invention is described on the assumption that M is 1, but is not limited thereto.

As shown in FIG. 55, the touch screen driving circuit sequentially supplies driving signals to Tx lines T1 to T8 connected to the touch sensors of the second and fifth blocks B12 and B22 in the partial sensing step. FIG. 55 shows that one driving signal is supplied to one Tx line during a partial sensing period TP. However, each driving signal may include a plurality of pulses. The Rx driving circuit 34 receives voltages of the touch sensors through Rx lines R4 to R9 crossing the Tx lines T1 to T8 in the partial sensing area 100 in synchronization with the driving signals supplied to the Tx lines T1 to T8, sequentially samples the voltages of the touch sensors, and converts the voltages of the touch sensors into digital data.

Case 5

Figure 56:
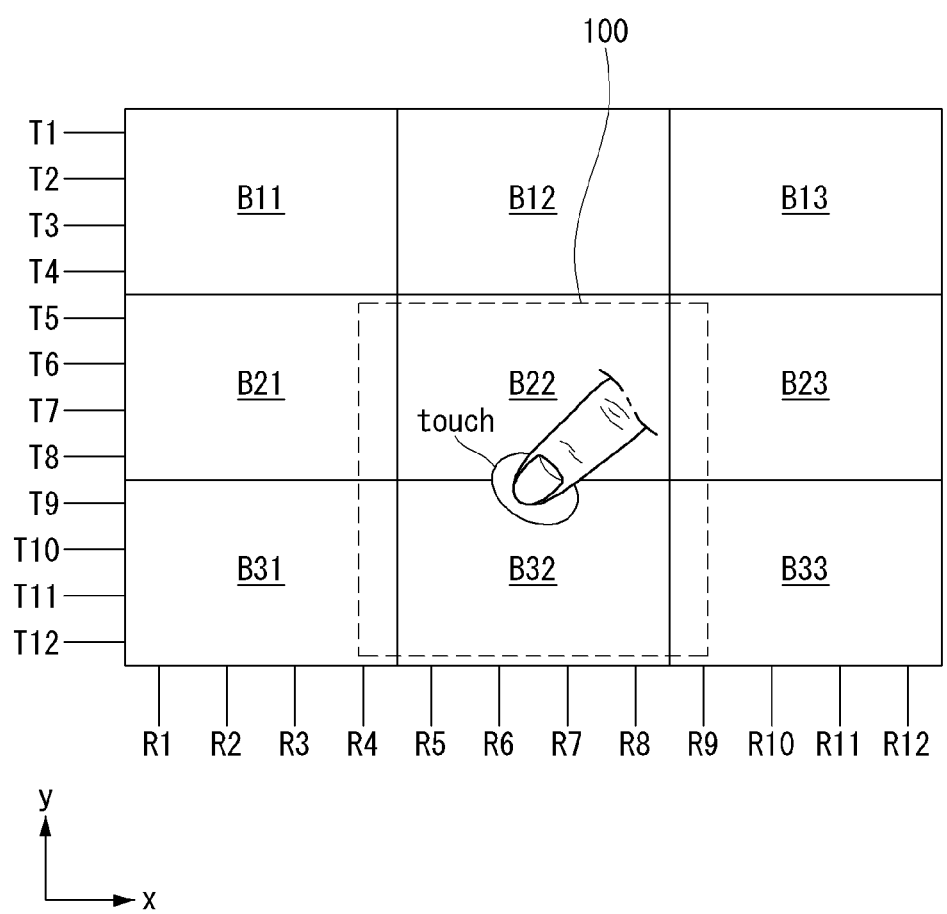
FIG. 56 illustrates a fifth example CASE 5 where a partial sensing area is expanded in the method for driving the touch sensing device according to the fifth embodiment of the invention.
Figure 57:
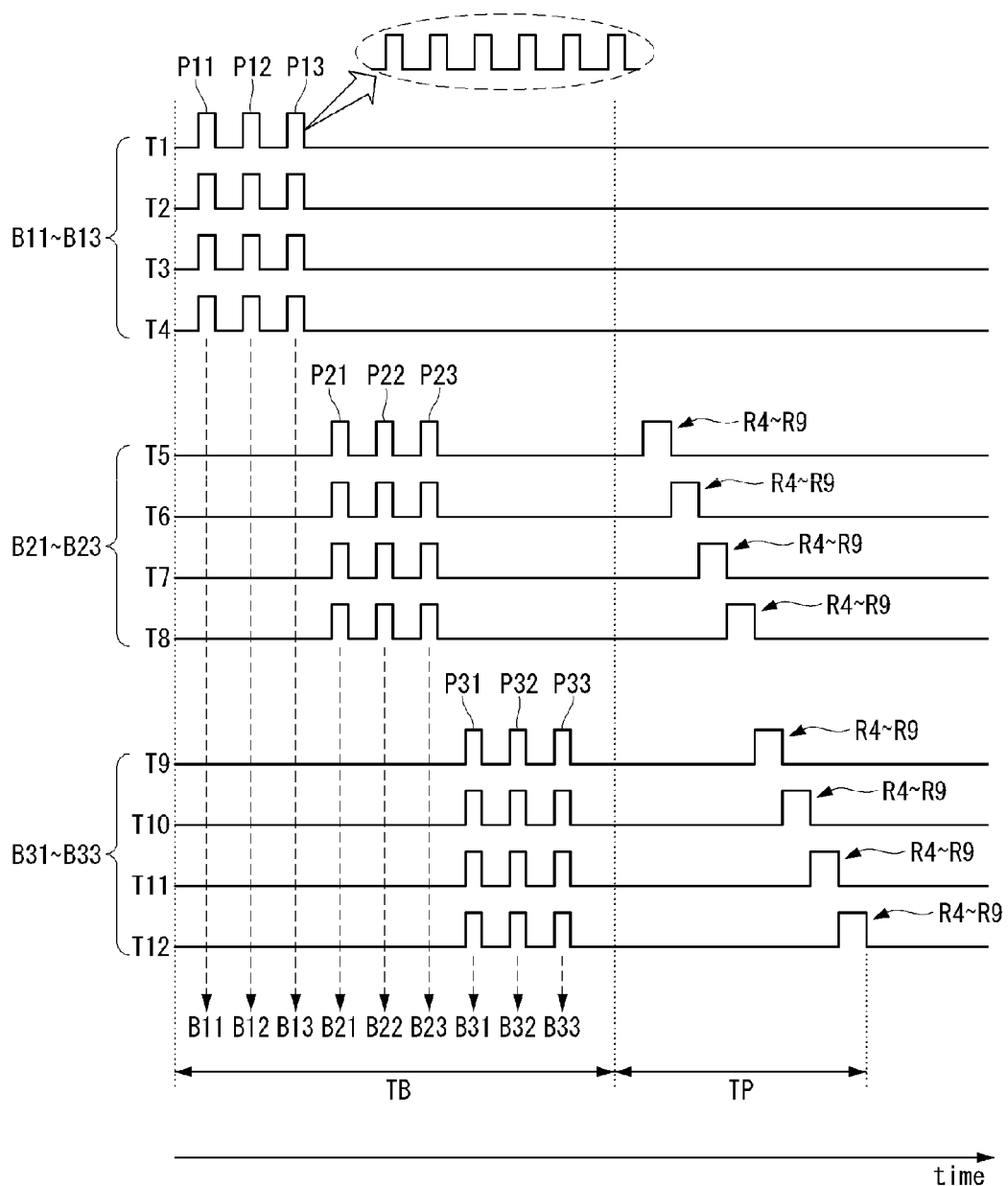
FIG. 57 is a waveform diagram illustrating driving pulses applied to a touch screen in a partial sensing method illustrated in FIG. 56.

FIGS. 56 and 57 illustrate a partial sensing area 100 assigned when a touch (or proximity) input is detected at a lower edge of a predetermined block, and driving signals applied to the partial sensing area 100.

As shown in FIGS. 56 and 57, when a touch (or proximity) input is detected at a lower edge of a fifth block B22 in a block sensing step, the touch screen driving circuit senses a voltage of touch sensors of the fifth block B22 and a voltage of touch sensors of an eighth block B32 downward adjacent to the fifth block B22 in a partial sensing step. The touch screen driving circuit expands the partial sensing area 100 in the partial sensing step and additionally senses a voltage of touch sensors close to the fifth and eighth B22 and B32 among touch sensors positioned outside the fifth and eighth B22 and B32. The touch sensors close to the fifth and eighth B22 and B32 include touch sensors left adjacent to the fifth and eighth B22 and B32 and touch sensors right adjacent to the fifth and eighth B22 and B32. The touch sensors left adjacent to the fifth and eighth B22 and B32 may be touch sensors connected to M Rx lines close to the fifth and eighth B22 and B32 among touch sensors of fourth and seventh blocks B21 and B31 left adjacent to the fifth and eighth B22 and B32. The touch sensors right adjacent to the fifth and eighth B22 and B32 may be touch sensors connected to M Rx lines close to the fifth and eighth B22 and B32 among touch sensors of sixth and ninth blocks B23 and B33 right adjacent to the fifth and eighth B22 and B32. In FIGS. 56 and 57, the fifth embodiment of the invention is described on the assumption that M is 1, but is not limited thereto.

As shown in FIG. 57, the touch screen driving circuit sequentially supplies driving signals to Tx lines T5 to T12 connected to the touch sensors of the fifth and eighth B22 and B32 in the partial sensing step. FIG. 57 shows that one driving signal is supplied to one Tx line during a partial sensing period TP. However, each driving signal may include a plurality of pulses. The Rx driving circuit 34 receives voltages of the touch sensors through Rx lines R4 to R9 crossing the Tx lines T5 to T12 in the partial sensing area 100 in synchronization with the driving signals supplied to the Tx lines T5 to T12, sequentially samples the voltages of the touch sensors, and converts the voltages of the touch sensors into digital data.

As described above, the embodiment of the invention reduces the total sensing time of the touch screen, thereby increasing the touch report rate. Furthermore, the embodiment of the invention reduces an influence of the noise on the touch screen and determines the presence or absence of the touch input, thereby increasing the touch sensitivity. The embodiment of the invention controls the power consumption of the touch screen driving circuit at a minimum level for a predetermined idle time when no touch (or proximity) input is detected in the first bock sensing step.

The embodiment of the invention expands the partial sensing area depending on the touch (or proximity) input position. As a result, the embodiment of the invention prevents or reduces the shift of the center point of the touch (or proximity) input area in the partial sensing step, thereby accurately detecting the touch (or proximity) input position at the boundary between the blocks.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensing device comprising:
a touch screen including Tx lines, Rx lines crossing the Tx lines, and touch sensors formed between the Tx lines and the Rx lines; and
a touch screen driving circuit which senses all the touch sensors of the touch screen in a first sensing step to detect the presence or absence of a touch input, and then again senses the touch sensors, in which the touch input is detected as a first sensing result, in a second sensing step to detect a position of the touch input,
wherein when there is no touch sensor, in which the touch input is detected as the first sensing result, the touch screen driving circuit repeats the first sensing step,
wherein the first sensing step includes:
a first block sensing step for sensing a voltage of touch sensors of at least two blocks divided from the touch screen and detecting the presence or absence of the touch input;
a second block sensing step for dividing the block, in which the touch input is detected in the first block sensing step, into at least two sub-blocks and detecting the presence or absence of the touch input in the at least two sub-blocks; and
a third block sensing step for dividing the sub-block, in which the touch input is detected in the second block sensing step, into at least two re-subdivided blocks and detecting the presence or absence of the touch input in the at least two re-subdivided blocks.

2. The touch sensing device of claim 1, wherein the touch screen driving circuit divides the touch screen into at least two Tx blocks,
wherein in the first sensing step, the touch screen driving circuit simultaneously supplies a driving signal to Tx lines of a first Tx block to simultaneously sense touch sensors of the first Tx block, and then simultaneously supplies the driving signal to Tx lines of a second Tx block to simultaneously sense touch sensors of the second Tx block,
wherein each of the first and second Tx blocks is divided along a long-axis direction of the Rx lines,
wherein each of the first and second Tx blocks includes at least two Tx lines and at least two Rx lines.

3. The touch sensing device of claim 2, wherein in the second sensing step, the touch screen driving circuit sequentially supplies the driving signal only to Tx lines present in a Tx block, in which the touch input is detected, to precisely sense touch sensors of the Tx block, in which the touch input is detected.

4. The touch sensing device of claim 3, wherein the touch screen driving circuit divides the touch screen into at least two Rx blocks,
wherein in the first sensing step, the touch screen driving circuit simultaneously or sequentially samples a voltage of touch sensors received through Rx lines of a first Rx block to convert the voltage of the touch sensors into touch raw data, and then simultaneously or sequentially samples a voltage of touch sensors received through Rx lines of a second Rx block to convert the voltage of the touch sensors into touch raw data,
wherein in the second sensing step, the touch screen driving circuit receives a voltage of touch sensors only through Rx lines of an Rx block, in which the touch input is detected, simultaneously or sequentially samples the voltage of the touch sensors, and converts the voltage of the touch sensors into touch raw data,
wherein each of the first and second Rx blocks is divided along a long-axis direction of the Tx lines,
wherein each of the first and second Rx blocks includes at least two Tx lines and at least two Rx lines.

5. The touch sensing device of claim 3, wherein the touch screen driving circuit stores the first sensing result obtained in the first sensing step in a memory,
wherein the touch screen driving circuit adds the first sensing result obtained in the first sensing step to a second sensing result obtained in the second sensing step and estimates the position of the touch input based on touch raw data produced as an addition result.

6. The touch sensing device of claim 5, wherein the touch screen driving circuit divides the touch screen into at least two Rx blocks,
wherein in the first sensing step, the touch screen driving circuit simultaneously or sequentially samples a voltage of touch sensors received through Rx lines of a first Rx block to convert the voltage of the touch sensors into touch raw data, and then simultaneously or sequentially samples a voltage of touch sensors received through Rx lines of a second Rx block to convert the voltage of the touch sensors into touch raw data,
wherein in the second sensing step, the touch screen driving circuit receives a voltage of touch sensors only through Rx lines of an Rx block, in which the touch input is detected, simultaneously or sequentially samples the voltage of the touch sensors, and converts the voltage of the touch sensors into touch raw data,
wherein each of the first and second Rx blocks is divided along a long-axis direction of the Tx lines,
wherein each of the first and second Rx blocks includes at least two Tx lines and at least two Rx lnes.

7. The touch sensing device of claim 1, wherein in the first sensing step, the touch screen driving circuit sequentially supplies a driving signal to the Tx lines to sense the touch sensors,
wherein in the second sensing step, the touch screen driving circuit sequentially supplies the driving signal only to Tx lines in which the touch input is detected, to precisely sense touch sensors, in which the touch input is detected,
wherein the touch screen driving circuit stores the first sensing result obtained in the first sensing step in a memory,
wherein the touch screen driving circuit adds the first sensing result obtained in the first sensing step to a second sensing result obtained in the second sensing step and estimates the position of the touch input based on touch raw data produced as an addition result.

8. The touch sensing device of claim 7, wherein the touch screen driving circuit divides the touch screen into at least two Rx blocks,
wherein in the first sensing step, the touch screen driving circuit simultaneously or sequentially samples a voltage of touch sensors received through Rx lines of a first Rx block to convert the voltage of the touch sensors into touch raw data, and then simultaneously or sequentially samples a voltage of touch sensors received through Rx lines of a second Rx block to convert the voltage of the touch sensors into touch raw data,
wherein in the second sensing step, the touch screen driving circuit receives a voltage of touch sensors only through Rx lines of an Rx block, in which the touch input is detected, simultaneously or sequentially samples the voltage of the touch sensors, and converts the voltage of the touch sensors into touch raw data,
wherein each of the first and second Rx blocks is divided along a long-axis direction of the Tx lines,
wherein each of the first and second Rx blocks includes at least two Tx lines and at least two Rx lines.

9. The touch sensing device of claim 1, wherein the touch screen driving circuit includes:
a Tx driving circuit configured to supply a driving signal to the Tx lines;
an Rx driving circuit configured to sample a voltage of the touch sensors received through the Rx lines, convert the voltage of the touch sensors into the touch raw data, and output the touch raw data,
a touch screen timing controller configured to synchronize an operation timing of the Tx driving circuit with an operation timing of the Rx driving circuit and control a channel setup of each of the Tx and Rx driving circuits, a sampling timing of the Rx driving circuit, and an analog-to-digital conversion timing of the Rx driving circuit; and
a touch recognition processor configured to compare the touch raw data with the threshold value and estimate touch raw data, which is equal to or greater than the threshold value, as touch input data.

10. The touch sensing device of claim 1, wherein the first sensing step includes:
a first block sensing step for sensing a voltage of touch sensors of at least two blocks divided from the touch screen and detecting the presence or absence of the touch input; and
a second block sensing step for dividing the block, in which the touch input is detected in the first block sensing step, into at least two sub-blocks and detecting the presence or absence of the touch input in the at least two sub-blocks, when the touch input is detected in the first block sensing step,
wherein in the first block sensing step, a driving signal is simultaneously applied to Tx lines of a first block, and then the driving signal is simultaneously applied to Tx lines of a second block,
wherein in the second block sensing step, the driving signal is simultaneously applied to Tx lines of a first sub-block divided in one of the first and second blocks, in which the touch input is detected, and then the driving signal is simultaneously applied to Tx lines of a second sub-block divided in one of the first and second blocks, in which the touch input is detected,
wherein a size of each of the at least two sub-blocks is less than a size of each of the at least two blocks.

11. The touch sensing device of claim 10, wherein the touch screen driving circuit proceeds to the second sensing step when the touch input is detected in the second block sensing step, sequentially supplies the driving signal only to Tx lines present in the sub-block, in which the touch input is detected in the second block sensing step, and precisely senses touch sensors of the sub-block, in which the touch input is detected.

12. The touch sensing device of claim 10, wherein when no touch input is detected in the first block sensing step, the touch screen driving circuit is disabled for a previously determined idle time and then repeats the first block sensing step,
wherein when no touch input is detected in the second block sensing step, the touch screen driving circuit repeats the first block sensing step.

13. The touch sensing device of claim 12, wherein the touch screen driving circuit proceeds to the second sensing step when the touch input is detected in the second block sensing step, sequentially supplies the driving signal only to Tx lines present in the sub-block, in which the touch input is detected in the second block sensing step, and precisely senses touch sensors of the sub-block, in which the touch input is detected.

14. The touch sensing device of claim 1,
wherein in the first block sensing step, a driving signal is simultaneously applied to Tx lines of a first block, and then the driving signal is simultaneously applied to Tx lines of a second block,
wherein in the second block sensing step, the driving signal is simultaneously applied to Tx lines of a first sub-block divided in one of the first and second blocks, in which the touch input is detected, and then the driving signal is simultaneously applied to Tx lines of a second sub-block divided in one of the first and second blocks, in which the touch input is detected,
wherein in the third block sensing step, the driving signal is simultaneously applied to Tx lines of a first re-subdivided block of the at least two re-subdivided blocks, and then the driving signal is simultaneously applied to Tx lines of a second re-subdivided block of the at least two re-subdivided blocks,
wherein a size of each of the at least two sub-blocks is less than a size of each of the at least two blocks,
wherein a size of each of the at least two re-subdivided blocks is less than a size of each of the at least two sub-blocks.

15. The touch sensing device of claim 14, wherein the touch screen driving circuit proceeds to the second sensing step when the touch input is detected in the third block sensing step, sequentially supplies the driving signal only to Tx lines present in the re-subdivided block, in which the touch input is detected in the third block sensing step, and precisely senses touch sensors of the re-subdivided block, in which the touch input is detected.

16. The touch sensing device of claim 14, wherein when no touch input is detected in the first block sensing step, the touch screen driving circuit is disabled for a previously determined idle time and then repeats the first block sensing step,
wherein when no touch input is detected in the second block sensing step, the touch screen driving circuit repeats the first block sensing step.

17. The touch sensing device of claim 16, wherein the touch screen driving circuit proceeds to the second sensing step when the touch input is detected in the third block sensing step, sequentially supplies the driving signal only to Tx lines present in the re-subdivided block, in which the touch input is detected in the third block sensing step, and precisely senses touch sensors of the re-subdivided block, in which the touch input is detected.

18. The touch sensing device of claim 1, wherein the touch screen driving circuit divides the touch screen into blocks in a lattice pattern,
wherein in the first sensing step, the touch screen driving circuit simultaneously supplies a driving signal to Tx lines of a first Tx block of the touch screen to simultaneously sense touch sensors of the first Tx block, and then simultaneously supplies the driving signal to Tx lines of a second Tx block of the touch screen to simultaneously sense touch sensors of the second Tx block,
wherein each of the first and second Tx blocks is divided along a long-axis direction of the Rx lines,
wherein each of the first and second Tx blocks includes at least two Tx lines and at least two Rx lines,
wherein the first Tx block includes blocks belonging to a first group sharing the Tx lines of the first Tx block among the blocks of the lattice pattern,
wherein the second Tx block includes blocks belonging to a second group sharing the Tx lines of the second Tx block among the blocks of the lattice pattern.

19. The touch sensing device of claim 18, wherein the touch screen driving circuit precisely senses touch sensors of a partial sensing area greater than a block, in which the touch input is detected, in the second sensing step.

20. The touch sensing device of claim 19, wherein in the second sensing step, the touch screen driving circuit supplies the driving signal to Tx lines passing through the block, in which the touch input is detected, and supplies the driving signal to Tx lines crossing a block left or right adjacent to the block, in which the touch input is detected,
wherein the partial sensing area includes touch sensors of the block in which the touch input is detected, touch sensors of the block left or right adjacent to the block in which the touch input is detected, and some of touch sensors of blocks close to the block, in which the touch input is detected, and the block left or right adjacent to the block, in which the touch input is detected.

21. The touch sensing device of claim 19, wherein in the second sensing step, the touch screen driving circuit supplies the driving signal to Tx lines crossing the block, in which the touch input is detected, and supplies the driving signal to M Tx lines close to the block, in which the touch input is detected, in other blocks adjacent to the block, in which the touch input is detected, where M is a positive integer which is equal to or greater than 1 and less than the number of Tx lines included in one block,
wherein the partial sensing area includes touch sensors of the block in which the touch input is detected, and touch sensors connected to the M Tx lines.

22. The touch sensing device of claim 19, wherein in the second sensing step, the touch screen driving circuit supplies the driving signal to Tx lines passing through the block, in which the touch input is detected, and supplies the driving signal to Tx lines crossing a block upward or downward adjacent to the block, in which the touch input is detected,
wherein the partial sensing area includes touch sensors of the block in which the touch input is detected, touch sensors of the block upward or downward adjacent to the block in which the touch input is detected, and some of touch sensors of blocks close to the block, in which the touch input is detected, and the block upward or downward adjacent to the block, in which the touch input is detected.

* * * * *